US008557921B2

(12) United States Patent
Arriola et al.

(10) Patent No.: US 8,557,921 B2
(45) Date of Patent: *Oct. 15, 2013

(54) PRODUCTION OF META-BLOCK COPOLYMERS BY POLYMER SEGMENT INTERCHANGE

(75) Inventors: Daniel J. Arriola, Midland, MI (US); Francis J. Timmers, Midland, MI (US); Brian A. Jazdzewski, Midland, MI (US); Paul C. Vosejpka, Midland, MI (US); Nicole L. Wagner, Midland, MI (US); Brian G. Landes, Midland, MI (US); Guenter A. Jueptner, Hammah (DE); David H. Bank, Midland, MI (US); Timothy T. Wenzel, Midland, MI (US)

(73) Assignee: Dow Global Technologies LLC

( * ) Notice: Subject to any disclaimer, the term of this patent is extended or adjusted under 35 U.S.C. 154(b) by 607 days.

This patent is subject to a terminal disclaimer.

(21) Appl. No.: 12/377,034

(22) PCT Filed: Aug. 23, 2007

(86) PCT No.: PCT/US2007/018659
§ 371 (c)(1),
(2), (4) Date: Feb. 10, 2009

(87) PCT Pub. No.: WO2008/027283
PCT Pub. Date: Mar. 6, 2008

(65) Prior Publication Data
US 2010/0069573 A1 Mar. 18, 2010

Related U.S. Application Data

(60) Provisional application No. 60/840,301, filed on Aug. 25, 2006.

(51) Int. Cl.
*C08F 8/00* (2006.01)
*C08F 4/72* (2006.01)
*C08F 4/80* (2006.01)

(52) U.S. Cl.
USPC ........... 525/195; 525/192; 526/171; 526/170; 526/172

(58) Field of Classification Search
USPC .......................................... 525/192, 215, 232
See application file for complete search history.

(56) References Cited

U.S. PATENT DOCUMENTS

| 3,692,872 A | 9/1972 | Calderon et al. |
| 3,821,328 A | 6/1974 | Streck et al. |
| 3,860,675 A | 1/1975 | Pampus et al. |
| 3,891,816 A | 6/1975 | Scott et al. |
| 4,010,224 A * | 3/1977 | Scott et al. .................... 525/289 |
| 4,049,616 A | 9/1977 | Scott et al. |
| 4,994,535 A | 2/1991 | Endo et al. |
| 5,312,940 A | 5/1994 | Grubbs et al. |
| 5,342,909 A | 8/1994 | Grubbs et al. |
| 5,446,102 A | 8/1995 | Oziomek et al. |
| 5,539,060 A * | 7/1996 | Tsunogae et al. ............. 525/338 |
| 5,559,190 A | 9/1996 | Nubel et al. |
| 5,603,985 A | 2/1997 | Kent et al. |
| 5,710,298 A | 1/1998 | Grubbs et al. |
| 5,728,917 A | 3/1998 | Grubbs et al. |
| 5,731,383 A | 3/1998 | Nubel et al. |
| 5,750,815 A | 5/1998 | Grubbs et al. |
| 5,840,820 A | 11/1998 | DeSimone et al. |
| 5,917,071 A | 6/1999 | Grubbs et al. |
| 5,977,393 A | 11/1999 | Grubbs et al. |
| 6,313,332 B1 | 11/2001 | Grubbs et al. |
| 6,410,110 B1 | 6/2002 | Warner et al. |
| 6,624,265 B2 | 9/2003 | Grubbs et al. |
| 6,806,325 B2 | 10/2004 | Grubbs et al. |
| 6,818,586 B2 | 11/2004 | Grubbs et al. |
| 6,838,489 B2 | 1/2005 | Bell et al. |
| 6,867,274 B2 | 3/2005 | Maughon et al. |
| 6,872,792 B2 * | 3/2005 | Kendall et al. ................ 526/161 |
| 7,022,789 B2 | 4/2006 | Maughon et al. |
| 8,048,961 B2 * | 11/2011 | Arriola et al. ................. 525/192 |
| 2003/0013825 A1 * | 1/2003 | Grubbs et al. ................ 526/171 |
| 2009/0105423 A1 * | 4/2009 | Pawlow et al. ................ 525/288 |

FOREIGN PATENT DOCUMENTS

| DE | 2131355 | 1/1973 |
| DE | 2242794 | 3/1974 |
| DE | 146052 | 1/1981 |
| DE | 146053 | 1/1981 |
| WO | WO 01/44315 | 6/2001 |
| WO | WO 2008/027267 | 3/2008 |
| WO | WO 2008/027268 | 3/2008 |
| WO | WO 2008/027269 | 3/2008 |

OTHER PUBLICATIONS

Bruzzone et al, Ethylene-Butadiene, Makromol. Chem, 179, 2173-2185 (1978).*
Ishihara et al., "Communications to the Editor", Macromolecules, Dec. 30, 2003, pp. 9675-9677,vol. 36, American Chemical Society.
O'Gara et al., "Acyclic Diene Metathesis (ADMET) Polymerization. Synthesis of Unsaturated Polythioethers", Macromolecules, 1993, pp. 2837-2841, vol. 26, American Chemical Society.
Streck, "Some Applications of the Olefin Metathesis Reaction to Polymer Synthesis*", Journal of Molecular Catalysis, 1982, pp. 3-19, vol. 15, Elsevier Sequoia.

(Continued)

Primary Examiner — Irina Krylova

(57) ABSTRACT

Meta-block copolymers and a process for preparing a product mixture comprising meta-block copolymers by contacting a metathesis catalyst under metathesis conditions with a composition comprising two or more ethylenically unsaturated polymers, said unsaturation defining one or more polymer segments in each ethylenically unsaturated polymer, at least one polymer segment in at least one ethylenically unsaturated polymer being chemically distinguishable from at least one polymer segment in at least one other ethylenically unsaturated polymer, characterized in that each meta-block copolymer in the product mixture comprises a random distribution of said chemically distinguishable polymer blocks.

12 Claims, 13 Drawing Sheets

(56) References Cited

OTHER PUBLICATIONS

Tindall et al., "Acyclic Diene Metathesis (ADMET) Segmented Copolymers", Macromolecules, 2004, pp. 3328-3336, vol. 37, No. 9, American Chemical Society.

Trzaska et al., "Synthesis of Narrow-Distribution "Perfect" Polyethylene and Its Block Copolymers by Polymerization of Cyclopentene", Macromolecules, 2000, pp. 9215-9221, vol. 33, No. 25, American Chemical Society.

Wagener et al., "Well Phase Separated Segmented Copolymers via Acyclic Diene Metathesis (ADMET) Polymerization", Journal of Polymer Science: Part A: Polymer Chemistry, 1997, vol. 35, pp. 3441-3449, John Wiley & Sons, Inc.

Watson et al., "Solvent-Free Olefin Metathesis Depolymerization of 1,4-Polybutadiene", Macromolecules, 2000, pp. 1494-1496, vol. 33, American Chemical Society.

Database WPI Week 200542, Thompson Scientific, London GB; AN 2005-410252, XP002498676.

* cited by examiner

PRODUCTION OF META-BLOCK COPOLYMERS BY POLYMER SEGMENT INTERCHANGE

CROSS-REFERENCE TO RELATED APPLICATIONS

This application is a National Stacie Entry of PCT/US07/18659 filed on Aug. 23, 2007 and claims the benefit of U.S. Provisional Patent Application Ser. 60/840,301, filed Aug. 25, 2006.

BACKGROUND OF THE INVENTION

The present invention relates in one aspect to a process for preparing block copolymers by metathesis of two or more polymers containing ethylenic unsaturation and in another aspect to metal-block copolymer compositions derived therefrom. Numerous olefin metathesis processes are previously known in the art. In general, olefin metathesis involves catalytic cleavage of one or more olefins at a point of unsaturation and recombination of the resulting cleavage products to form different olefin containing reaction products. Often, low molecular weight olefins and cyclic olefins are employed as reagents in the foregoing reaction mixtures in order to provide low viscosity reaction mixtures, well defined reaction products, reduced polymer product molecular weight, and/or mixtures suitable for reaction injection molding (RIM) compositions. Examples of the foregoing processes are disclosed in U.S. Pat. Nos. 5,731,383, 4,994,535, 4,049,616, 3,891,816, 3,692,872, and elsewhere.

Metathesis involving polymeric olefins is also known. In *Macromol.*, 33, 1494-1496 (2000), solid polymers were depolymerized by surface contact with a metathesis catalyst. Reaction products of polymer metathesis can include random or block copolymers, functionalized polymers obtained through functionalization of resulting terminal unsaturation, ring opened metathesis products, and even cross-linked solids. Metathesis of two or more different olefins is referred to as a "cross-metathesis". Examples of such processes are disclosed by U.S. Pat. Nos. 6,867,274, 6,410,110, 5,603,985, 5,559,190, 5,446,102, 4,049,616, and other references. Suitable unsaturated polymers for the foregoing processes include diene homopolymers and copolymers or partially hydrogenated derivatives thereof. Use of cyclic olefins can result in the formation of polymers having narrow molecular weight distributions. For example, preparations of linear polyethylene and poly(ethylidene-norbornene)/polycyclopentene diblock copolymers by ring opening metathesis of polycyclopentene or sequential polymerization of mixtures of ethylidene-norbornene and polycyclopentene were disclosed in *Macromol.*, 33(25), 9215-9221 (2000).

In U.S. Pat. Nos. 3,692,872, 3,891,816 and 4,010,224 graft and block copolymers and interpolymers were prepared by metathesis of two polymers containing olefinic unsaturation, such as polybutadiene or polyisoprene. Monomers such as cyclooctene or dimers such as cyclooctadiene-cyclopentadiene dimer could be included in the polymerization as well. Similar processes involving the cross-metathesis of polybutadiene with polycyclooctene or polycyclododecene as well as grafting of EPDM polymers via metathesis were disclosed in DE 2,131,355 and DE 2,242,794. In the former process, "thermoplastic properties were imparted to the elastomer". A summary of the work appeared in *J. Mol. Catal.*, 15, 3-19 (1982).

Similarly, in U.S. Pat. Nos. 3,692,872, 3,891,816 and 4,010,224 graft and block copolymers and interpolymers were prepared by metathesis of two polymers containing olefinic unsaturation, such as polybutadiene and polyisoprene. Monomers and dimers such as cyclooctene or cyclooctadiene-cyclopentadiene dimer could be included in the polymerization as well. Exemplified polymer pairs included partially polymerized cements of polycyclooctene and polycyclooctadiene (Ex. I), EPDM/polybutadiene (Ex. II and V), and two EPDM/cyclooctadiene copolymers having differing cyclooctadiene contents (Ex. III).

In *Macromol.*, 36, 9675-96777 (2003) the ethenolysis of polypropylene/1,3-butadiene copolymers to prepare polymers having slightly increased melting temperature for the isotactic polymer segments due to improved packing of shorter chain segments was disclosed. In German Democratic Republic patents DD 146,052 and DD 146,053, 1,4-cis-polybutadiene and copolymers such as ABS rubber or SB rubber were subjected to metathetic depolymerization optionally in the presence of a functionalizing agent, especially an unsaturated carboxylic acid ester. According to U.S. Pat. No. 7,022,789, the products were polydisperse rubbers indicating the presence of cross-linking due to undesirable quantities of vinyl groups in the product.

Disadvantageously, the foregoing known polymeric olefin metathesis products are lacking in desirable physical properties due to the fact that at equilibrium, the individual block lengths, which approach the lengths of the unsaturated segments in the starting polymer reagents, are undesirably short and lacking in polymeric character. Moreover, the individual blocks do not differ significantly from one another in chemical properties. For example, segment properties of polycyclooctene and polycyclododecene or of polybutadiene and polyisoprene, are nearly chemically equivalent. Copolymers comprised of such polymer segments do not possess advantaged properties. Conventional block copolymers, such as those prepared by anionic polymerization techniques readily incorporate dissimilar, immiscible, lengthy segments in the same polymer chain. Because the segments are of sufficient molecular weight to possess measurable physical properties, such as glass transition temperature (Tg), crystalline melting point (Tm), dielectric constant or solubility parameter the resulting polymers possess enhanced properties. For example, the presence of crystalline polymer segments having a relatively high melting point and elastomeric polymer segments within the same polymer chain gives thermoplastic materials having improved elastomeric and mechanical properties, such as high tensile strength, hysteresis, and tear properties.

The previously discussed processes utilized polybutadiene or similar polymers prepared by free radical techniques which possess undesirably high quantities of pendant vinyl groups (instead of terminal or internal unsaturation) due to uncontrolled 1,2-addition of the conjugated diene. This results in undesirably high levels of pendant vinyl functionality in the metathesis products unless extensive hydrogenation of the polymer is employed to first reduce the level of such pendant unsaturation. Polymer hydrogenation however is expensive and can result in loss of terminal unsaturation as well. Moreover, polybutadiene is known to be subject to rapid metathetical degradation and ring formation under metathesis conditions, resulting in formation of low molecular weight by-products of little commercial value.

It would be desirable if there were provided a process for the metathesis of unsaturated polymers that is specifically adapted for the formation of differentiated, commercially valuable meta-block copolymer products, having many of the properties of conventional, non-random block copolymers. It would further be desirable if the resulting polymer products were suitable for use as molding resins, adhesives, sealants, compatibilizers, and impact modifiers. Finally, it would be desirable to provide a process for converting readily available, inexpensive, unsaturated polymers into meta-block copolymers having differentiated, commercially valuable properties.

SUMMARY OF THE INVENTION

According to the present invention there is now provided a process for preparing a product mixture comprising meta-block copolymers by contacting a metathesis catalyst under metathesis conditions with a composition comprising two or more ethylenically unsaturated polymers, said unsaturation defining one or more polymer segments in each ethylenically unsaturated polymer, at least one polymer segment in at least one ethylenically unsaturated polymer being chemically distinguishable from at least one polymer segment in at least one other ethylenically unsaturated polymer, characterized in that each meta-block copolymer in the product mixture comprises a random distribution of said chemically distinguishable polymer blocks.

In another embodiment of the invention, there is provided a meta-block copolymer comprising two or more polymer blocks, each block comprising one or more uniform segments, at least one polymer block being chemically distinguishable from at least one other polymer block, further characterized in that the meta-block copolymer comprises a random distribution of said chemically distinguishable polymer blocks. Suitable unsaturated polymers employed in the present metathesis are polymers prepared by addition polymerization, condensation polymerization, ring opening cycloaddition, anionic polymerization, or other process or combination of processes capable of forming polymers containing ethylenic unsaturation. At least some of the ethylenic unsaturation in the reagent polymers is located in the main chain or backbone (internal unsaturation) of the unsaturated polymer. Such internal ethylenic unsaturation desirably results in formation of segments of the unsaturated polymer reagent that are of sufficient length so as to possess measurable physical properties, especially Tg, Tm, tacticity, dielectric constant, solubility parameter, or crystallinity as determined by DSC melt point, NMR spectroscopic analysis, or other analytical technique. Preferred polymers for use herein are those containing up to 40 weight percent ethylenic carbon content, more preferably up to 35 weight percent ethylenic carbon content. Highly desirably, the ethylenic content of each of the two or more unsaturated polymers is from 0.001 to less than 10 mole percent, more preferably from 0.01 to 5 mole percent, even more preferably from 0.1 to 3.0 mole percent. The quantity of ethylenic unsaturation in the polymer reagents may be adjusted prior to metathesis by partial hydrogenation, in order to attain the aforementioned desired polymer segment lengths. Desirably, however the ethylenic unsaturation is naturally low due to the use of small quantities of diene monomer in the copolymerization with ethylene and optional α-olefin monomers. Moreover, the distribution of the ethylenic content in the reagent polymers is substantially random. More preferably, at least 99 percent of multiple unsaturations remaining in the polymers, especially at least 99.9 percent thereof are separated by at least 4 methylene or substituted methylene units, most preferably at least 6 such units.

Preferably, the unsaturated polymers contain segments having lengths of greater than 10 atoms, more preferably at least 20, and most preferably at least 40 carbon atoms. It will be appreciated by the skilled artisan that by using unsaturated polymer reagents with higher unsaturation content, shorter polymer blocks in the resulting polymeric product result. Desirably, the resulting polymer blocks are of sufficient length so as to possess chemically distinguishable polymer properties. Accordingly, use of unsaturated polymer reagents with chemically distinguishable polymer segments of adequate length to possess identifiable polymer properties in the resulting meta-block copolymer, is requisite.

Examples of unsaturated polymers for use as reagents or components of the reaction mixture herein include random copolymers, block copolymers, or pseudo-block copolymers, preferably of one or more olefin monomers and one or more diolefins; random-, block-, or pseudo-block-copolymers of one or more olefin monomers and one or more alkynes; random-, block- or pseudo-block-copolymers of one or more olefin monomers, one or more diolefins, and one or more alkynes; conjugated diene homopolymers; condensation polymers formed by condensation of two or more condensable monomers at least one of which comprises ethylenic unsaturation; free radically polymerized homopolymers and copolymers of at least one conjugated diene and a copolymerizable comonomer, and partially hydrogenated derivatives of the foregoing, so long as the polymers possess the previously identified unsaturation content. Most preferred reagents are substantially random copolymers of one or more conjugated dienes and one or more copolymerizable comonomers, especially copolymers of one or more olefins with a conjugated diene, such as 1,4-butadiene, containing up to 10 percent, preferably up to 5 mole percent, more preferably up to 1 mole percent polymerized diene, and partially hydrogenated derivatives thereof. Examples include copolymers of ethylene, optionally one or more $C_{3-8}$ comonomers, and 1,4-butadiene; copolymers of propylene and 1,4-butadiene; or copolymers of styrene and 1,4-butadiene. Because techniques for hydrogenation of polymers are relatively expensive and inconvenient due to the fact that the polymer normally needs to be dissolved or liquefied, preferred reagent polymers are those possessing limited quantities of polymerized diene and not hydrogenated derivatives of diene homopolymers or copolymers.

In one embodiment of the invention, at least one of the unsaturated polymer reagents is incompatible with at least one other unsaturated polymer reagent and the meta-block copolymer product is compatibilized due to formation of a quantity of the present metathesis product sufficient to form a compatibilized mixture. The resulting meta-block copolymer product comprises segments from both incompatible reagent polymers, one or more of which form the various blocks of the meta-block copolymer. Examples of polymers that commonly are incompatible with one another include polymers comprising a polar functionality in one or more polymer segments thereof, including grafted or ionomeric polymers, and polymers lacking in polar functionality; highly crystalline polymers and amorphous or elastomeric polymers; highly isotactic or syndiotactic polymers and polymers lacking tacticity; highly isotactic polymers and highly syndiotactic polymers; aromatic polymers and aliphatic polymers; organic polymers and inorganic polymers such as silicon or boron containing polymers; and cross-linked polymers and uncrosslinked polymers. Evidence of improved compatibility of meta-block copolymers or mixtures comprising meta-block copolymers according to the invention include decreased crystallite size, improved clarity, increased impact strength, improved ductility, and/or increased tensile properties of the resulting polymer product compared to the initial polymer mixture before undergoing metathesis.

The preparation, especially in the melt, of a compatibilized product mixture according to the foregoing embodiment of the invention is often expedited by addition to the initially incompatible polymers of a small quantity of preformed meta-block copolymer, prepared by solution techniques, by copolymerization of representative monomers, or obtained from previous operation of the present invention. This initial "seed" of previously formed compatibilizer can substantially reduce the time required to achieve formation of a homogeneous meta-block copolymer product under melt blending conditions. Additionally, an olefin, especially ethylene, can be employed to reduce the viscosity of the reaction mixture, especially in the initial stages of the process. It can be removed at later stages of the reaction by heating the reaction mixture in the absence of added olefin but in the presence of the metathesis catalyst, optionally under reduced pressure. Stoichiometric amounts of added olefin, such as a cyclic olefin or ethylene, can also be used to adjust the molecular weight of the resulting meta-block copolymer.

In another embodiment of the invention, the metathesis is conducted by contacting a mixture comprising two or more unsaturated polymers and a metathesis catalyst at a temperature above the crystalline melting point of at least one polymer of the reaction mixture in the substantial absence of a solvent. Preferably the reaction mixture is in molten form. In a particularly preferred embodiment, the metathesis reaction is conducted in a melt mixing device, such as an extruder, and optionally, the meta-block copolymer according to the invention is formed into strands or other shapes, cooled and/or pelletized. In an additional embodiment, the product of the metathesis is contacted with a source of hydrogen and a hydrogenation catalyst, including separately added, independently formed catalysts or hydrogenation catalysts derived from the metathesis catalyst, and partially or fully hydrogenated. Highly desirably, the foregoing process as well as inactivation or "killing" of the metathesis catalyst are conducted while the polymer product is in a molten or dissolved state, preferably prior to exiting the melt mixing device or solution reactor. If both a hydrogenation and catalyst deactivation are performed, either step may precede the other or both may be performed simultaneously or subsequently, optionally with intervening recovery and remelting of the product, without departing from the scope of the present invention. Thus, the invention may comprise forming the present metathesis product in the melt or in a solution, optionally hydrogenating, and/or optionally killing the catalyst, and forming shaped or molded articles from the product in a single unified process.

Additional desirable embodiments of the present invention include meta-block copolymers wherein at least two of the polymer blocks (or the parent polymers from which the blocks are formed) have an expected Tg difference of at least 40° C.

Additional desirable embodiments of the present invention include meta-block copolymers wherein at least two of the polymer blocks (or the parent polymers from which the blocks are formed) have an expected dielectric constant difference of at least 0.1.

Additional desirable embodiments of the present invention include meta-block copolymers wherein at least two of the polymer blocks (or the parent polymers from which the blocks are formed) have an expected solubility parameter difference of at least 1.0.

Additional desirable embodiments of the present invention include meta-block copolymers wherein at least two of the polymer blocks (or the parent polymers from which the blocks are formed) have an expected refractive index difference of at least 0.02.

Additional desirable embodiments of the present invention include meta-block copolymers wherein at least one of the polymer blocks (or the parent polymer from which the block is formed) has either a Tm or expected Tg value of at least 80° C., preferably at least 100° C., highly preferably at least 105° C., and most preferably at least 120° C.

Additional desirable embodiments of the present invention include meta-block copolymers wherein at least two of the polymer blocks (or the parent polymers from which the blocks are formed) phase separate in the absence of a compatibilizing additive when cooled from the melt to the solid phase.

Additional desirable embodiments of the present invention include meta-block copolymers wherein at least one of the polymer blocks (or the parent polymer and/or the segments thereof from which the block is formed) is (are) amorphous and one other polymer block (or the parent polymer and/or the segments thereof from which the block is formed) is (are) crystallizable. Preferably the difference between expected Tg for the amorphous polymer block and Tm for the crystallizable polymer block is at least 40° C., more preferably at least 80° C., and most preferably at least 100° C. Highly desirably, Tm for the crystallizable polymer block is higher than the expected Tg for the amorphous polymer block. Even more preferably, at least one block (or the parent polymer and/or the segments thereof from which the block is formed) is (are) crystalline or semicrystalline, having a crystalline melting point of at least 100° C., highly preferably at least 105° C., and most preferably at least 120° C. and at least one block (or the parent polymer and/or the segments thereof from which the block is formed) is (are) amorphous or non-crystalline. Further desirably, the heat of fusion associated with the melting point of any crystalline polymer block is at least 20 J/g, preferably at least 40 J/g, more preferably at least 50 J/g, as determined by DSC analysis. Included are polymers in which crystallinity is induced or enhanced by the use of nucleating agents, thermal annealing, and/or strain.

Even more preferred embodiments of the present invention include meta-block copolymers wherein at least two of the polymer blocks (or the parent polymers from which the blocks are formed) possess more than one of the foregoing distinguishing features.

In another embodiment of the invention, there are provided novel mixtures of copolymers prepared or preparable by any of the foregoing processes, said copolymers comprising random distributions of blocks comprising one or more chemically distinguishable segments derived from two or more unsaturated polymers as previously disclosed. Examples include polymer segments separated by at least one additional polymer segment having a lower Tg or lower expected Tg. Additional examples include crystalline or semi-crystalline polymer segments (hard segments) separated by at least one amorphous polymer segment (soft segments). Examples of suitable hard segments include tactic polymer segments, especially isotactic polypropylene or syndiotactic polystyrene segments, and linear or substantially linear polyethylene segments. Examples of suitable soft segments include copolymers of ethylene and a $C_{3-20}$ α-olefin and/or a $C_{4-20}$ diolefin, or any other branched (including long chain branched) ethylene homopolymer or copolymer.

Another embodiment of the invention provides for a meta-block copolymer comprising two or more polymer blocks, wherein at least one of said two or more polymer blocks is chemically distinguishable from at least one other of said two or more polymer blocks by a difference in an expected solubility parameter ($\delta_2$) of at least 1.0 and at least one of said two or more polymer blocks is comprised of a polymerized monomer that is not an addition polymerizable monomer, the meta-block copolymer further comprising:
  a) a random distribution of said chemically distinguishable polymer blocks; and
  b) a microphase separation of said chemically distinguishable polymer blocks as indicated by a small angle x-ray scattering (SAXS) peak that persists at temperatures above the glass transition temperature ($T_g$) of said meta-block copolymer, wherein if said meta-block copolymer contains a crystalline domain, the SAXS peak also persists at temperatures above the melt temperature ($T_m$) of said crystalline-domained meta-block copolymer.

In a narrower embodiment, the SAXS peak persists at temperatures at least 30° C. above the glass transition temperature ($T_g$) of said meta-block copolymer, wherein if said meta-block copolymer contains a crystalline domain, the SAXS peak also persists at temperatures at least 30° C. above the melt temperature ($T_m$) of said crystalline-domained meta-block copolymer; the SAXS peak persists at temperatures at least 80° C. above the glass transition temperature ($T_g$) of said meta-block copolymer, wherein if said meta-block copolymer contains a crystalline domain, the SAXS peak also persists at temperatures at least 80° C. above the melt temperature ($T_m$) of said crystalline-domained meta-block copolymer; the SAXS peak persists at temperatures at least 150° C. above the glass transition temperature ($T_g$) of said meta-block copolymer, wherein if said meta-block copolymer contains a crystalline domain, the SAXS peak also persists at temperatures at least 150° C. above the melt temperature ($T_m$) of said crystalline-domained meta-block copolymer. In another narrower embodiment, the chemically distinguishable blocks possess a difference in the expected solubility parameter ($\delta_2$) of at least 1.5; or the chemically distinguishable blocks possess a difference in the expected solubility parameter ($\delta_2$) of at least 2.0. In another narrower embodiment, one polymer block comprises a partially hydrogenated polybutadiene and another polymer block comprises a partially hydrogenated butadiene nitrile rubber; one polymer block comprises an unsaturated polyurethane and another polymer block comprises a poly(ethylene-co-butadiene); one polymer block comprises an unsaturated polycarbonate and another polymer block comprises a poly(ethylene-co-butadiene) or a poly(ethylene-co-octene-co-butadiene); one polymer block comprises an unsaturated polycarbonate and another polymer block comprises an unsaturated polysiloxane, fluoro polymer, a chlorinated polyolefin, a polytetrahydrofuran, or poly(ethylene propylene diene); one polymer block comprises a poly(ethylene oxide) and another polymer block comprises a poly(ethylene-co-butadiene); or one polymer block comprises an unsaturated polyester and another polymer block comprises a poly(ethylene-co-butadiene)

The meta-block copolymers of the embodiments immediately above can be prepared by conventional polymer preparative methods including free radical polymerization, addition polymerization, anionic polymerization, ring opening polymerization, metathesis polymerization, and condensation or step growth polymerization. Partial or complete hydrogenation may also be employed.

With respect to all of the foregoing polymers or polymeric compositions constituting embodiments of the invention, processes for forming the same and methods of using them as molding resins, adhesives, and components of blended compositions are also included within the present invention.

Because the addition polymer formed by polymerization of ethylene, optionally one or more $C_{3-20}$ α-olefins, and a conjugated diene or alkyne is inherently low in pendant vinyl functional groups, even prior to hydrogenation, the resulting metathesis products inherently possess high α,ω-unsaturation and are highly linear. Through selection of appropriate coordination catalysts and reaction conditions, the vinyl functionality in the copolymer may be reduced to as low as 5 percent or less, even 2 percent or less, and even 1 percent or less of the total ethylenic groups, and with hydrogenation, even lower. The resulting metathesis products and functionalized derivatives thereof accordingly have a significantly reduced proclivity to form cross-links or pendant branches. Desirably, functionalities from 1.9 to 2.5, preferably from 2.0 to 2.2 are attainable.

In addition, because the diene remnant in the polymer reagents is not necessarily employed for purposes of imparting elastomeric properties to the resulting meta-block copolymers, and desirably isn't so employed, a wide variety of polymer properties and combinations of properties can be introduced into the resulting products. Especially preferred meta-block copolymers are aliphatic hydrocarbon polymers prepared by cross-metathesis of two or more polyunsaturated polymers containing in polymerized form no more than 5, preferably no more than 3, more preferably no more than 2, and most preferably no more than 1 mole percent butadiene, isoprene, or 2-chloro-1,3-butadiene. By use of polymer reagents with greater segment length between unsaturations thereof, destructive metathetic depolymerization of the unsaturated polymer reagent into low molecular weight byproducts is substantially reduced.

DRAWINGS

FIG. 10 (upper graph) illustrates an $^1$H NMR spectrum of a control composition prepared as described in Comparative Experiment D.

FIG. 18 (lower graph) illustrates an $^1$H NMR spectrum of a control composition prepared as described in Comparative Experiment G.

DETAILED DESCRIPTION OF THE INVENTION

Figure 1:
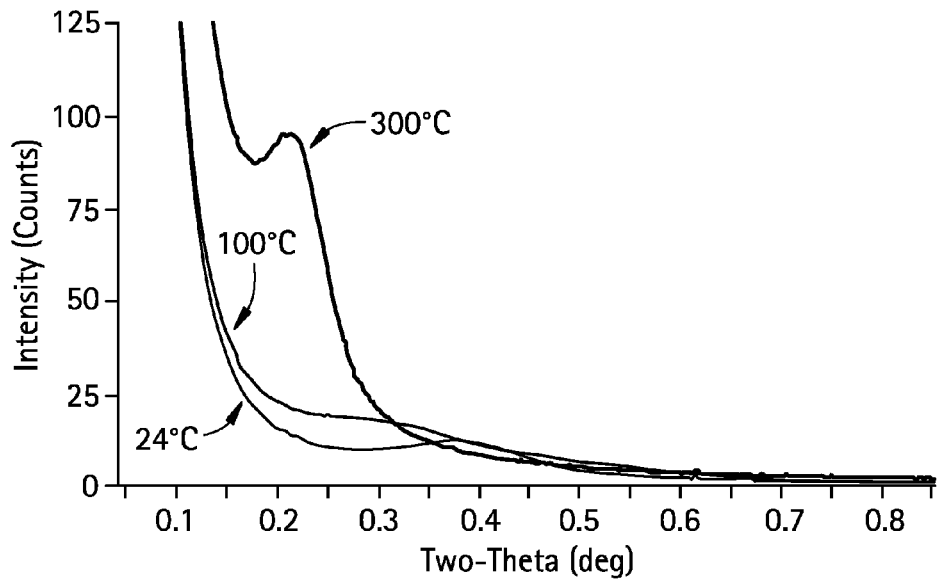
FIG. 1 illustrates SAXS plots at three temperatures of a composition of this invention prepared as described in Example 1.

All references to the Periodic Table of the Elements herein shall refer to the Periodic Table of the Elements, published and copyrighted by CRC Press, Inc., 2003. Also, any references to a Group or Groups shall be to the Group or Groups reflected in this Periodic Table of the Elements using the IUPAC system for numbering groups disclosed in, *Nomenclature of Inorganic Chemistry: Recommendations* 1990, G. J. Leigh, Editor, Blackwell Scientific Publications (1990). Unless stated to the contrary, implicit from the context, or customary in the art, all parts and percents are based on weight. For purposes of United States patent practice, the contents of any patent, patent application, or publication referenced herein are hereby incorporated by reference in their entirety (or the equivalent US version thereof is so incorporated by reference) especially with respect to the disclosure of synthetic techniques, definitions (to the extent not inconsistent with any definitions provided herein) and general knowledge in the art.

The term "comprising" and derivatives thereof is not intended to exclude the presence of any additional component, step or procedure, whether or not the same is disclosed herein. In order to avoid any doubt, all compositions claimed herein through use of the term "comprising" may include any additional additive, adjuvant, or compound whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed. The term "or", unless stated otherwise, refers to the listed members individually as well as in any combination.

As used herein with respect to a chemical compound, unless specifically indicated otherwise, the singular includes all isomeric forms and vice versa (for example, "hexane", includes all isomers of hexane individually or collectively). The terms "compound" and "complex" are used interchangeably herein to refer to organic-, inorganic- and organometal compounds. The term, "atom" refers to the smallest constituent of an element regardless of ionic state, that is, whether or not the same bears a charge or partial charge or is bonded to another atom. The term "heteroatom" refers to an atom other than carbon or hydrogen. Preferred heteroatoms include: F, Cl, Br, N, O, P, B, S, Si, Sb, Al, Sn, As, Se and Ge.

The term, "hydrocarbyl" refers to univalent substituents containing only hydrogen and carbon atoms, including branched or unbranched, saturated or unsaturated, cyclic, polycyclic or noncyclic species. Examples include alkyl-, cycloalkyl-, alkenyl-, alkadienyl-, cycloalkenyl-, cycloalkadienyl-, aryl-, and alkynyl-groups. "Substituted hydrocarbyl" refers to a hydrocarbyl group that is substituted with one or more non-hydrocarbyl substituent groups. The term "heterocarbyl" refers to groups containing one or more carbon atoms and one or more heteroatoms and no hydrogen atoms. The bond between the carbon atom and any heteroatom as well as the bonds between any two heteroatoms, may be a single or multiple covalent bond or a coordinating or other donative bond. Examples include trichloromethyl-, perfluorophenyl-, cyano- and isocyanato-groups. The terms "heteroatom containing hydrocarbyl" or "hetero-hydrocarbyl" refer to univalent groups in which at least one atom other than hydrogen or carbon is present along with one or more carbon atoms and one or more hydrogen atoms. Thus, an alkyl group substituted with a halo-, heterocycloalkyl-, aryl-substituted heterocycloalkyl-, heteroaryl-, alkyl-substituted heteroaryl-, alkoxy-, aryloxy-, dihydrocarbylboryl-, dihydrocarbylphosphino-, dihydrocarbylamino-, trihydrocarbylsilyl-, hydrocarbylthio-, or hydrocarbylseleno-group is within the scope of the term heterohydrocarbyl. Examples of suitable heteroalkyl groups include chloromethyl-, 2-cyanoethyl-, hydroxymethyl-, benzoylmethyl-, (2-pyridyl)methyl-, chlorobenzyl-, and trifluoromethyl-groups.

As used herein the term "aromatic" refers to a polyatomic, cyclic, conjugated ring system containing (4δ+2) π-electrons, wherein δ is an integer greater than or equal to 1. The term "fused" as used herein with respect to a ring system containing two or more polyatomic, cyclic rings means that with respect to at least two rings thereof, at least one pair of adjacent atoms is included in both rings. The term "aryl" refers to a monovalent aromatic substituent which may be a single aromatic ring or multiple aromatic rings which are fused together, linked covalently, or linked to a common group such as a methylene or ethylene moiety. Examples of aromatic ring(s) include phenyl, naphthyl, anthracenyl, and biphenyl, among others.

"Substituted aryl" refers to an aryl group in which one or more hydrogen atoms bound to any carbon is replaced by one or more functional groups such as alkyl, alkenyl, substituted alkyl, substituted alkenyl, cycloalkyl, substituted cycloalkyl, heterocycloalkyl, substituted heterocycloalkyl, halo, haloalkyl (for example, $CF_3$), hydroxy, amino, phosphido, alkoxy, amino, thio, nitro, and both saturated and unsaturated hydrocarbylene groups, including those which are fused to the aromatic ring(s), linked covalently or linked to a common group such as a methylene or ethylene moiety. The common linking group may also be carbonyl as in benzophenone-, oxygen as in diphenylether- or nitrogen as in diphenylamine-groups.

"Ethylenic unsaturation" or "ethylenic group" refers to adjacent aliphatic carbon atoms bound together by double bonds (non-aromatic sp$^2$ electronic hybridization), preferably of the formula: —CR*=CR*—, or —CR*=CR*$_2$, where R* independently each occurrence is hydrogen, halo, nitrile, hydrocarbyl, or substituted hydrocarbyl containing up to 20 atoms not counting hydrogen. Percent ethylenic unsaturation as used herein is calculated based on total carbon-carbon bond content of the polymer. The term "pendant" refers to groups or substituents attached to secondary or tertiary substituted carbons of the polymer. The term "terminal" refers to groups or substituents attached to a primary carbon of the polymer.

The term "polymer" as used herein refers to a macromolecular compound comprising multiple repeating units and a molecular weight of at least 100, preferably at least 1000. Preferably, at least one repeating unit occurs, consecutively or non-consecutively, 6 or more times, more preferably 20 or more times, on average. Molecules containing less than 6 such repeating units on average are referred to herein as oligomers. The term includes homopolymers, copolymers, terpolymers, interpolymers, and so on. The term "interpolymer" is used herein interchangeably with the term copolymer to refer to polymers incorporating in polymerized form at least two differentiated repeating units, usually obtained from separate copolymerizable monomers. The least prevalent monomer in the resulting copolymer or interpolymer is generally referred to by the term "comonomer".

The term, "segment(s)" refers to portions of an unsaturated polymer having a uniform composition and a carbon chain length of at least 12 carbons, preferably at least 20 carbons, more preferably at least 30 carbons, separated by ethylenic unsaturations or, in the case of a polymer comprising a single terminal unsaturation, terminated by the ethylenic unsaturation. Unsaturation occurring within a cyclic moiety, such as an alicyclic or aromatic group does not result in segment formation. Desirably, the segments in the present meta-block copolymers are substantially free of internal rings or cyclic moieties. The term "uniform composition" as used herein refers to segments that are derived from the same (co)monomer stream(s), the sequence and stereo-regularity in each segment being governed by the relative reactivity of each (co)monomer. Accordingly, the monomer sequence and stereo-regularity in any two or more segments may range from essentially identical to each other to substantially different from each other and any degree of variation in between these extremes.

The term "block copolymer" refers to a polymer having two or more identifiable sections thereof (blocks) that are chemically distinguishable from one another. The term "meta-block copolymer" refers to a block copolymer comprising a random distribution of polymer blocks. In some meta-block copolymers at least one of the blocks is joined to at least one other of the blocks by means of ethylenic unsaturation. The term "random" as used herein refers to an outcome falling within the metes and bounds of this invention that follows and/or arises from no describable deterministic pattern. Meta-block copolymers may be formed through metathesis processes, which are random processes in that where ethylenic bonds in an unsaturated polymer cleave and how the resulting molecular fragments reform into new ethylenic bonds are not predictable and do not follow predetermined rules. It is noted that such processes lead to compositions having a random distribution of polymer segments, which consequentially leads to compositions having a random distribution of polymer blocks.

Meta-block copolymers in general are preparable by metathesis of two or more unsaturated polymers containing chemically distinguishable segments. Copolymers comprising blocks lacking in significant chemical or physical differences, even if separated by ethylenic unsaturations, are not included within the term "meta-block copolymer". For example, copolymers prepared by metathesis of mixtures of cyclooctene and cyclododecene, the polymeric derivatives of which differ only with respect to molecular weight, specifically triethylene versus pentaethylene units, are not included within the present invention. Meta-block copolymers generally possess a molecular weight distribution or polydispersity of at least 1.8, often at least 2.0. Highly desirably, meta-block copolymers comprise a most probable distribution of block lengths and compositions. One notable characteristic of meta-block copolymers is the fact that transition of polymer properties between adjacent blocks occurs at the ethylenic unsaturation(s).

Further desirably, the present meta-block copolymers exhibit the properties of thermoplastic elastomers (TPE) characterized by the presence of "soft" or elastomeric block segments connecting "hard" either crystallizable or glassy blocks in the same polymer. At temperatures up to the melt temperature or glass transition temperature of the hard segments, the polymers demonstrate elastomeric character. At temperatures higher than the crystalline melting point of the hard segments, the polymers become flowable, exhibiting thermoplastic behavior.

The term "unsaturated block copolymer" refers to a block copolymer that comprises ethylenic unsaturation either between blocks or within one or more blocks thereof. An unsaturated polymer or an unsaturated block within a block copolymer may comprise one or more segments. The term "amorphous" refers to a polymer, polymer block or polymer segment (collectively referred to here-in-after as polymeric entities) that is not crystalline or semi-crystalline. The term "crystalline" refers to a polymeric entity possessing a crystalline melting point of 30° C. or higher. The term "semi-crystalline" refers to a polymeric entity possessing a crystalline melting point of at least 30° C. or higher but lower than that of a fully crystalline or more fully crystalline polymer entity of the same chemical composition. More specifically, semi-crystalline as used herein, refers to polymer entities possessing crystallinity that is less than 90 percent of the maximum attainable crystallinity for that polymer entity. For the avoidance of doubt, the term crystalline includes semi-crystalline polymer entities.

The term "backbone" refers to the longest continuous polymeric chain of a polymer. All other polymer chains are referred to as side chains, branches, or grafted polymer chains. Short chains or short chain branching refers to branches from the backbone resulting from polymerization of monomers containing three or more carbons. Polymerization of such monomers containing two or more ethylenic unsaturations can result in the formation of unsaturated branches (pendant unsaturation) in the resulting polymer. Metathesis of polymers containing such unsaturated branches can result in formation of "comb" type meta-block copolymers, that is, polymers having multiple chemically distinguishable polymer chains pendant from a central backbone chain and random chain length distribution. Alternatively, the resulting polymer product may be cross-linked.

The chemical properties of a polymer segment herein may be determined by ethenolysis of the unsaturated polymer according to known procedures, and analysis of the residual segment properties by standard analytical techniques. Separation of differing segments by elutriation, chromatography, or other fractionation technique may be necessary prior to analysis.

A "monomer that is not an addition polymerizable monomer" refers to a monomer that cannot be polymerized using addition polymerization methods. The term "addition polymerizable" refers to repeat units that are joined end-to-end with respect to polymerized ethylene functionality.

As used herein, the term "chemically distinguishable" refers to polymeric entities containing an identifiable chemical property or characteristic that allows the polymer, block or segment to be distinguished from another polymer, block or segment. Specifically excluded are polymeric entities differing from one another only by molecular weight or molecular weight distribution such as products that may be formed upon metathesis of a single unsaturated polymer. Examples of chemically distinguishable polymeric entities include those differing in composition, tacticity, density, crystallinity, crystallite size, crystalline melt point, glass transition temperature, dielectric constant, interaction parameter (chi), or solubility parameter ($\delta_2$). The foregoing values may be either expected or actually measured. The presence of chemically distinguishable polymer entities is readily determined by standard analytic techniques, such as identifiable melt point, by NMR techniques, JR analysis for polar group containing polymers, CRYSTAF, ATREF, TREF, or by other methods.

Preferred, chemically distinguishable polymer blocks in the present meta-block copolymers are those characterized by the interaction parameter chi or a difference in crystalline melting point, polarity ($\chi$), tacticity (rrr or mmm triad), expected glass transition temperature (Tg), or expected solubility parameter. Highly preferably, one polymeric entity is incompatible with at least one other in the meta-block copolymers. That is, the chemically distinguishable polymeric entities are sufficiently incompatible that a mixture of individual samples of the subject polymers in the absence of a compatibilizing additive or technique, phase separates when cooled from the melt to the solid phase, thereby forming identifiable domains when analyzed by X-ray spectrographic, TREF, ATREF, CRYSTAF, or other suitable analytical technique. Also desirably, the present meta-block copolymers are aliphatic.

Identification of monomer and comonomer, comonomer amount, unsaturation levels, branching and tacticity in polymeric entities in the present meta-block copolymers may be accomplished using NMR techniques such as those disclosed in, *NMR and Macromolecules; sequence, dynamic and domain structure*, James C. Randall, ed.; ACS Symposium Series, 247; American Chemical Society, Washington, D.C. (1984) (here-in-after, Randall).

As used herein the term "expected" when used in reference to the properties of polymer entities are those properties predicted by the method for infinite molecular weight, room temperature (25° C.), atactic, polymer calculation disclosed in Jozef Bicerano, *Prediction of Polymer Properties*, 2nd ed., Marcel Dekker, Inc., New York (here-in-after, Bicerano). The technique is also incorporated into software, including SYNTHIA™, available from Molecular Simulations Inc., a subsidiary of Pharmacopeia, Inc. The expected properties of certain representative polymers calculated according to the Bicerano technique are found in Table 1.

TABLE 1

Calculated Expected Polymer Properties

| Polymer | Repeat Unit Formula | Refractive Index (n) | Dielectric Constant ($\epsilon$) | Glass Transition, Tg (° C.) | Solubility Parameter $\delta_2$ ((J/cc)$^{1/2}$) |
|---|---|---|---|---|---|
| polyethylene | $CH_2$ | 1.4648 | 2.33 | −86 | 16.8 |
| polypropylene | $C_3H_6$ | 1.4713 | 2.26 | −38 | 16.1 |
| poly(1-butene) | $C_4H_8$ |  | 2.28 | −57 | 16.3 |
| poly(1-hexene) | $C_6H_{12}$ | 1.466 | 2.30 | −77 | 16.5 |
| poly(1-octene) | $C_8H_{16}$ | 1.466 | 2.31 | −86 | 16.6 |
| polyisobutylene | $C_4H_8$ | 1.4795 | 2.22 | −83 | 15.4 |
| polystyrene | $C_8H_8$ | 1.6037 | 2.57 | 106 | 19.5 |
| polychloroprene | $C_4H_5Cl$ | 1.5673 |  | −36 | 19.5 |
| poly(1,2-butadiene) | $C_4H_6$ | 1.5055 |  | 13 | 16.8 |
| poly(1,4-butadiene) | $C_4H_6$ | 1.5188 | 2.32 | −99 | 17.7 |
| polyisoprene | $C_5H_8$ | 1.5159 | 2.28 | −72 | 17.2 |
| polycyclooctene (ROMP)* | $C_8H_{14}$ | 1.4918 | 2.32 | −90 | 17.3 |
| polycyclodecene (ROMP)* | $C_{10}H_{18}$ | 1.4864 | 2.32 | −88 | 17.2 |
| polycyclododecene (ROMP)* | $C_{12}H_{22}$ | 1.4828 | 2.32 | −87 | 17.1 |
| poly(methyl methacrylate) | $C_5H_7O_2$ | 1.4846 | 3.07 | 84 | 17.7 |
| poly(acrylonitrile) | $C_3H_3N$ | 1.5425 | 3.99 | 91 | 24.6 |
| poly(vinyl chloride) | $C_2H_3Cl$ | 1.5560 | 2.93 | 20 | 19.4 |
| poly(vinylidene chloride) | $C_2H_2Cl_2$ | 1.6080 | 2.86 |  | 21.0 |
| bisphenol-A polycarbonate | $C_{10}H_{14}O_3$ | 1.5870 | 2.90 | 146 | 19.3 |
| poly(ethylene terephthalate) | $C_{10}H_8O_4$ | 1.5558 | 3.28 | 100 | 19.8 |
| poly($\epsilon$-caprolactam) | $C_6H_{11}ON$ | 1.5130 | 3.47 | 57 | 25.1 |
| poly($\epsilon$-caprolactone) | $C_6H_{10}O_2$ | 1.475 | 2.91 | −44 | 17.8 |
| polyoxyethylene | $C_2H_4O$ | 1.4648 | 2.77 | −68 | 19.1 |
| polyoxymethylene | $CH_2O$ | 1.465 | 3.11 | −60 | 20.6 |

*ROMP means ring opening metathesis polymerization

Expected properties for the individual blocks of meta-block copolymer are the properties calculated according to the Bicerano technique of a hypothetical polymer of the same composition as identified by the method of Randall. The term, "solubility parameter" refers to Van Krevelin solubility parameter ($\delta_{VKH}$) as defined in Bicerano. The term "elastomeric" refers to polymeric entities having Tg less than 25° C., preferably less than 0° C., and elastic recovery of at least 90 percent when tested according to ASTM D-1708 at 21° C. Crystalline melting point (Tm) refers to the peak melting point determined by DSC according to ASTM D-3418 test method.

The unsaturated polymer reagents are desirably prepared by addition polymerization of one or more olefin monomers preferably one or more α-olefin monomers and a diene, suitably employing a Ziegler/Natta, metallocene, post-metallocene, or other coordination polymerization catalyst, suitable processes for preparation of which are disclosed in more detail here-in-after. By the term "Ziegler/Natta polymerization catalyst" is meant a catalyst composition suited for polymerization of olefins comprising an organometallic compound in which the metal is from groups 2, 12 or 13 of the Periodic Table of the Elements in combination with at least one other compound, especially a halide, oxide or oxyhalide, of a metal selected from groups 4, 5 or 6 of the Periodic Table of the Elements.

Due to the relative low unsaturation content of the polymer reagents, the segments participating in the present cross-metathesis desirably have a segment length, or SL, expressed as the average number of monomeric repeating units, from 20 to 1000, preferably from 40 to 100, which corresponds to copolymers containing from about 0.1 to 5 mole percent polymerized diene, preferably from 1 to 2.5 mole percent diene. Further desirably, the remaining comonomer in one of the polymer reagents forms "hard segments" due to crystallinity, tacticity, high Tm, or high Tg. Examples of comonomers tending to give crystalline polymers are symmetric comonomers such as ethylene, tetrafluoroethylene, vinylidene chloride, and vinylidene fluoride. Examples of monomers giving tactic polymer are asymmetric monomers such as propylene, styrene and 4-methyl-1-pentene. Examples of monomers giving polymers having a high glass transition temperature include methacrylic acid, methyl methacrylate, styrene, and p-methylstyrene.

In a preferred embodiment, one unsaturated polymeric reagent is a copolymer of butadiene with either ethylene or propylene, thereby forming aliphatic polymer segments that are crystalline or isotactic. The other polymeric reagent desirably is a copolymer of butadiene with a mixture of ethylene and a $C_{3-8}$ α-olefin, thereby forming ethylene/α-olefin copolymer segments that are amorphous (referred to as "soft segments"). The resulting meta-block copolymers comprise random combinations of such hard and soft segments in the same polymer, thereby producing a product having thermoplastic elastomeric properties.

The amount of ethylenic unsaturation in the reagent polymers can be determined by any suitable technique, such as iodine monochloride titration (ICI), NMR analysis or other technique. When appropriate, a combination of these techniques can be used. ICI titration is a well known technique for determining the level of carbon-carbon unsaturation in a wide variety of polymers wherein iodine monochloride is used to react with any unsaturations present in the polymer. The method does not distinguish between internal and terminal or vinyl unsaturation.

NMR spectroscopic analysis has particular utility for use with homopolymers and copolymers of conjugated dienes, due to the fact that the amount of internal unsaturation in the polymers (resulting from 1,4-addition of the diene) as opposed to vinyl unsaturation (resulting from 1,2-addition of the diene) may be determined using this technique. NMR techniques of polymer analysis include especially those of Randall.

Preferred combinations of unsaturated polymer reagents for use herein are those containing one or more segments having high crystallinity, especially segments that are tactic, and at least one other unsaturated polymer containing one or more segments that are amorphous or elastomeric. Highly desired are unsaturated polymers containing one or more hard segments having a high Tg, especially segments that are isotactic, syndiotactic, or crystalline, and unsaturated polymers containing one or more soft, or low Tg, segments. In a further embodiment, each unsaturated reagent polymer is comprised of only one type of polymeric segment. Highly desirably, only two unsaturated polymers having chemically distinguishable polymer segments are employed.

Suitable unsaturated polymers for use herein preferably contain non-terminal ethylenic unsaturation in the polymer backbone or in one or more branches thereof. Terminal or vinyl unsaturation may also be present, without departing from the scope of the present invention, so long as some non-terminal unsaturation is present in at least one of the unsaturated polymer reagents. One suitable unsaturated polymer reagent comprises segments of an ethylene or propylene homopolymer and/or copolymer segments of ethylene and one or more $C_{3-8}$ olefins, or copolymer segments of propylene with ethylene or one or more $C_{4-8}$ olefins. Generally, the ethylene or propylene homopolymer segments are crystalline and the copolymer segments are amorphous or even elastomeric. The foregoing polymer segments may be in the same or, preferably, in separate polymers. Preferred are ethylenically unsaturated copolymers formed by polymerization of ethylene with a diene, propylene with a diene, or propylene and one or more of ethylene, butene or octene in an amount from 0 to 15 percent, especially 0-10 percent, and a diene. Highly desirably, the ethylene homopolymer segments are crystalline and the propylene homopolymer segments are isotactic, having a crystalline melt point of 130° C. or greater. Ethylenic unsaturation is provided by the diene, especially butadiene, present in an amount to provide, after polymerization, the desired level of non-terminal ethylenic unsaturation(s) per molecule.

Additional suitable polymers include those containing functionality, including hydroxyl, acid, especially carboxylic acid, ester, especially carboxylic acid ester, amine, halide, nitrile, anhydride, or thiol functionality. Generally, the presence of polar functional groups such as the foregoing, may require the use of metathesis catalysts that are stable and unaffected. Suitable catalysts include homogeneous ruthenium catalysts including first-generation Grubbs catalysts, exemplified by bis(tricyclohexylphosphine)-benzylidene ruthenium dichloride, and second-generation Grubbs catalysts, exemplified by tricyclohexylphosphine[1,3-bis(2,4,6-trimethylphenyl)-4,5-dihydroimidazol-2-ylidene][benzylidene]ruthenium dichloride. "First-generation and second-generation Grubbs catalysts," named for their principle inventor Robert H. Grubbs, are disclosed in WO 96/04289, WO 02/083742, and elsewhere. First-generation and second-generation Grubbs catalysts tend to be relatively tolerant towards air, moisture, and a wide array of polar functional groups, such as acid and ester functionalities.

The unsaturated reagent polymers may be readily prepared using standard polymerization techniques, such as by polymerizing an olefin mixture comprising one or more olefins in combination with at least one conjugated or non-conjugated diene using free radical-, addition-, ring opening-, anionic-, cationic-, condensation, step growth, or metathesis polymerization techniques. The method by which the unsaturated reagent polymer is produced may affect the resulting metathesis product. For example, larger length blocks will generally result where the reagent polymer is a simple diblock or triblock copolymer prepared, for example, by anionic polymerization of an olefin and a conjugated diene. More detailed description of the various methods of preparing the unsaturated polymer reagents follows.

A. Free Radical Polymerization

Free-radical polymerization of comonomers is amenable to use with a large variety of comonomers to produce a wide variety of unsaturated polymers comprising, for example, combinations of a high $T_g$, crystalline or semi-crystalline hard block segments, and low $T_g$ soft blocks. Free-radical polymerization is also compatible with polar and non-polar monomers, and the resulting polymers may be subjected to grafting with additional functionalized polymer segments. The final polymer may be hydrogenated to reduce the level of unsaturation and/or eliminate terminal unsaturation, if desired. Suitable techniques include free-radical copolymerization of one or more copolymerizable monomers with a diene and/or an ethynyl compound, such as an acetylene derivative, and optionally grafting, to form linear or branched polymers with pendant and/or backbone unsaturations as well as polymerization under free radical polymerization conditions of one or more monomers and optionally grafting, followed by introduction of unsaturation through treatment at high temperatures, dehydrogenation, dehalohydrogenation or other procedure.

Monomers suitable for use in free radical polymerization include practically any ethylenically unsaturated monomer. Examples of suitable monomers and details regarding such processes are found in "Polymer Handbook", 4th Ed, Brandrup, Immergut, and Grulke, Eds., Wiley, 1999; and "Copolymerization", G. E. Ham, Ed., *High Polymers*, Vol. XVIII, Interscience, 1964.

Preferred monomers suitably polymerized by free radical polymerization techniques include aliphatic and aromatic α-olefins and substituted olefins, conjugated and non-conjugated dienes, and cyclic olefins and polyolefins. Examples include: ethylene, propylene, 1-butene, 1-hexene, 1-octene, 4-methyl-1-pentene, acrylonitrile, methylmethacrylate, butylacrylate, styrene, vinylcyclohexane, α-methylstyrene, p-vinyltoluene, vinyl chloride, vinylidene chloride, vinylidene fluoride, tetrafluoroethylene, 1,3-butadiene, isoprene, 2,3-dimethyl-1,3-butadiene, 1,3-pentadiene, 1,3-hexadiene, 1,4-hexadiene, 1,5-hexadiene, 2,4-hexadiene, 2-methyl-3-ethyl-1,3-butadiene, 3-methyl-1,3-pentadiene, 2-methyl-3-ethyl-1,3-pentadiene, 2-ethyl-1,3-pentadiene, 3-methyl-1,3-heptadiene, 3-octadiene, 3-butyl-1,3-octadiene, 3,4-dimethyl-1,3-hexadiene, 3-n-propyl-1,3-pentadiene, 4,5-diethyl-1,3-octadiene, 2-phenyl-1,3-butadiene, 2,3-diethyl-1,3-butadiene, 2,3-di-n-propyl-1,3-butadiene, 2-methyl-3-isopropyl-1,3-butadiene, chloroprene, fluoroprene, 2-methoxy-1,3-butadiene, 2-ethoxy-3-ethyl-1,3-butadiene, 2-ethoxy-3-methyl-1,3-hexadiene, decadiene, divinylbenzene, cyclohexene, vinylcyclohexene, benzocyclobutene, norbornene, norbornadiene, dicyclopentadiene, ethylidene norbornene and mixtures thereof.

B. Addition Polymerization

Addition polymerization processes, such as transition metal catalyzed polymerizations more fully disclosed herein-after, are compatible with a large number of monomers, normally excluding unprotected polar group containing monomers. Certain monomers can yield crystalline polymers with high melting points or polymers with very low glass transition temperatures. Polymers made by polymerizing one or more addition polymerizable monomers along with a diene, preferably a conjugated alkadiene, especially 1,4-butadiene, and/or an alkyne compound, especially an acetylene derivative, form branched or linear polymers with pendant and/or backbone unsaturation(s). Additionally, chain end unsaturation may result due to beta-hydride elimination and/or a small quantity of backbone unsaturation(s) may result from a random spontaneous dehydrogenation during the polymerization process. Parent unsaturated polymers made by addition polymerization processes can be partially hydrogenated to limit the amount of ethylenic unsaturation to the afore-mentioned preferred range and/or control the type of unsaturation, for example, by preferentially hydrogenating terminal and/or pendant unsaturation.

A partial list of monomers suitably polymerized by addition polymerization techniques includes aliphatic and aromatic α-olefins and substituted olefins, conjugated and non-conjugated dienes, and cyclic olefins and polyolefins. Examples include: ethylene, propylene, 1-butene, 1-hexene, 1-octene, 4-methyl-1-pentene, acrylonitrile, methylmethacrylate, butylacrylate, styrene, vinylcyclohexane, α-methylstyrene, p-vinyltoluene, 1,3-butadiene, isoprene, 2,3-dimethyl-1,3-butadiene, 1,3-pentadiene, 1,3-hexadiene, 1,4-hexadiene, 1,5-hexadiene, 2,4-hexadiene, 2-methyl-3-ethyl-1,3-butadiene, 3-methyl-1,3-pentadiene, 2-methyl-3-ethyl-1,3-pentadiene, 2-ethyl-1,3-pentadiene, 3-methyl-1,3-heptadiene, 3-octadiene, 3-butyl-1,3-octadiene, 3,4-dimethyl-1,3-hexadiene, 3-n-propyl-1,3-pentadiene, 4,5-diethyl-1,3-octadiene, 2-phenyl-1,3-butadiene, 2,3-diethyl-1,3-butadiene, 2-methyl-3-isopropyl-1,3-butadiene, chloroprene, fluoroprene, 2-methoxy-1,3-butadiene, 2-ethoxy-3-ethyl-1,3-butadiene, 2-ethoxy-3-methyl-1,3-hexadiene, decadiene, divinylbenzene, cyclohexene, vinylcyclohexene, benzocyclo-butene, norbornene, norbornadiene, dicyclopentadiene, ethylidene norbornene, and mixtures thereof.

C. Anionic Polymerization

Anionic polymerization is often very useful in making block copolymers containing ethylenic unsaturation, such as by consecutive monomer addition schemes or coupling processes. Conjugated dienes or multifunctional monomers are used to introduce backbone and/or pendant unsaturation in the polymers. Polymers, especially, those containing butadiene or isoprene, may be partially hydrogenated to control the amount and type of unsaturation. Suitable monomers for polymerization under anionic polymerization conditions include:

ethylene, styrene, α-methylstyrene, and p-vinyltoluene, conjugated dienes such as 1,3-butadiene, isoprene, 2,3-dimethyl-1,3-butadiene, 1,3-pentadiene, 1,5-hexadiene, 2,4-hexadiene, 1,3-hexadiene, 2-methyl-3-ethyl-1,3-butadiene, 3-methyl-1,3-pentadiene, 2-methyl-3-ethyl-1,3-pentadiene, 2-ethyl-1,3-pentadiene, 3-methyl-1,3-heptadiene, 3-octadiene, 3-butyl-1,3-octadiene, 3,4-dimethyl-1,3-hexadiene, 3-n-propyl-1,3-pentadiene, 4,5-diethyl-1,3-octadiene, 2-phenyl-1,3-butadiene, 2,3-diethyl-1,3-butadiene, 2,3-di-n-propyl-1,3-butadiene, 2-methyl-3-isopropyl-1,3-butadiene, divinylbenzene and divinyltoluene, methylmethacrylate, cyanoacrylate, and butylacrylate, acrylonitrile.

D. Ring Opening Polymerization

Ring-opening polymerizations can result in polymers and copolymers with backbone or pendant unsaturation if functional comonomers are employed. Unsaturations can also be incorporated into the polymer through the choice of initiating group, such as unsaturated alcohols. A partial list of suitable compounds subject to ring opening polymerization includes:

ethylene oxide, propylene oxide, tetrahydrofuran, and trioxane, lactams, such as caprolactam, cyclic thioethers, epichlorohydrin and derivatives thereof, oxepans and oxetanes, lactones, lactides, cyclic anhydrides, and cyclic amines.

E. Metathesis Polymerization

Metathesis of unsaturated monomers or monomer mixtures can be used to produce one or all unsaturated polymers for use according to the present invention. Such polymers and copolymers naturally contain ethylenic unsaturation along the polymer backbone. Additional pendant double bonds can be introduced through use of multifunctional monomers. A partial list of suitable monomers for use in such a metathesis polymerization includes:

acyclic dienes, such as 1,3-butadiene, isoprene, 2,3-dimethyl-1,3-butadiene, 1,3-pentadiene, 1,5-hexadiene, 2,4-hexadiene, 1,3-hexadiene, 2-methyl-3-ethyl-1,3-butadiene, 3-methyl-1,3-pentadiene, 2-methyl-3-ethyl-1,3-pentadiene, 2-ethyl-1,3-pentadiene, 3-methyl-1,3-heptadiene, 3-octadiene, 3-butyl-1,3-octadiene, 3,4-dimethyl-1,3-hexadiene, 3-n- propyl-1,3-pentadiene, 4,5-diethyl-1,3-octadiene, 2-phenyl-1,3-butadiene, 2,3-diethyl-1,3-butadiene, 2,3-di-n-propyl-1,3-butadiene, 2-methyl-3-isopropyl-1,3-butadiene, chloroprene, fluoroprene, 2-methoxy-1,3-butadiene, 2-ethoxy-3-ethyl-1,3-butadiene, and 2-ethoxy-3-methyl-1,3-hexadiene, cyclic olefins such as cyclopentene, cyclohexene, and cyclooctene, cyclic dienes such as cyclopentadiene, dicyclopentadiene, ethylidene norbornene, norbornene, norbornadiene, and cyclooctadiene.

F. Condensation or Step Growth Polymerization

Condensation polymers and copolymers may be produced using co-monomers having pendant or backbone unsaturation thereby preparing unsaturated polymers suitable for use as one or all of the unsaturated polymer reagents of the present metathesis process. In addition, polymers containing ester functionality may be exposed to transesterification with molecules containing backbone or pendant unsaturation to produce unsaturated polymers suitable for use in the present process. Examples of compounds suitable for use in such transesterification processes (and the present invention) include: polyesters, polyanhydrides, polyacetals, polyacrylamide, polyamides, polyurethanes, polyureas, silk fibroin, cellulose, phenol-formaldehyde resins, urea-formaldehyde resins, polysulfides, polysiloxanes, polycarbonates, polyethers, polyimides, polyimines, polysaccharides, proteins, fluoro polymers, chlorinated polyolefins, polytetrahydrofurans, and EPDM. Preferred condensation or step-growth polymers for use in the present invention include ethylenically unsaturated polyamides, polycarbonates, polyurethanes and polyethers.

It is to be understood that while all of the foregoing processes for preparing unsaturated polymers suitable for use in the present process provided that the previously disclosed requirements regarding ethylenic unsaturation content and distribution and chemical differences between polymer pairs are observed. Most preferred unsaturated polymers for use in the present invention are polyolefinic hydrocarbons of relatively uniform composition, having polydispersity from about 1.8 to 5.0, prepared by addition polymerization, especially coordination polymerization, of one or more $C_{2-20}$ aliphatic α-olefins with a conjugated diene, especially butadiene or isoprene.

Metathesis Process Description

Suitable metathesis conditions for use herein include sequential or simultaneous contacting of one or more metathesis catalysts with the respective unsaturated polymer reagents. The metathesis may take place in the liquid phase, such as by use of solvents or in melts of one or more polymers, or in a solid state process, and does not require that polymers be completely miscible or soluble at all times during the process. The unsaturated polymer reagents can be synthesized in parallel or series with the present metathesis in one or more bulk, solution, slurry, suspension, gas phase, or other polymerization reactors, either as one unit operation of the present process or separately. In one embodiment, the parent polymers for the present metathesis are co-produced prior to metathesis, and subjected to the present process prior to recovery or isolation, thereby avoiding the need for remelting, dissolution and/or blending of the unsaturated polymer reagents. Highly desirably, the temperature and reaction medium are chosen so that at least one component of the reaction mixture is molten or sufficiently solubilized to provide a fluid reaction medium.

The molecular weight of the resulting polymer products may range from as low as 5000 g/mole, and as high as $1 \times 10^7$ g/mole. The polydispersity (Mw/Mn) is dependent on the polydispersity and functionality of the parent polymers. Suitable ranges of Mw/Mn for the resulting polymer products are from close to 1.0 to 100, and preferably are from 1.8 to 10.

Since the product of the present process is a random distribution of polymer blocks, the meta-block copolymer product comprises a portion of unattached polymer segments. The fraction of unattached segments in the meta-block copolymer mixture may be characterized by any suitable analytical technique, such as CRYSTAF, TREF or ATREF. In general, the quantity of unattached segments ranges from 2 to 98 percent, preferably from 5 to 95 percent. The fraction of unattached sequences may be varied depending on the nature of the unsaturated polymer reagents and the intended end use of the resulting polymer product.

Metathesis Products

The meta-block copolymers of the invention comprise a random distribution of polymer blocks and block lengths with at least one block being chemically distinguishable from at least one other block by the foregoing difference in Tg, Tm, or other enumerated property. Preferred meta-block copolymers possess Tg difference of at least 80° C., more preferably at least 100° C. The length distribution of the blocks is dependent on the length distribution of the segments in the initial polymer reagents and the extent of metathesis conducted. The polymers of the invention are distinguished from pure diblock, triblock, or other multi-block copolymers due to the presence of random polymer block connectivity and a statistical distribution of block lengths.

The polymer architecture is related to the parent polymer architecture in the following manner. In one embodiment, the parent polymers possess a distribution of backbone unsaturation, giving monoconnective segments (constituting the polymer termini, $A_1$) and diconnective segments (internal polymer segments between ethylenic unsaturations, $A_2$). Similar, chemically distinguishable segments in a second unsaturated polymer may be identified as $B_1$ and $B_2$. For the simplest case of two dissimilar unsaturated polymers the initial polymer structures may be depicted as, $A_1$-$(A_2)_m$-$A_1$ and $B_1$—$(B_2)_n$—$B_1$, where m and n, independently each occurrence, are integers greater than or equal to zero.

Upon metathesis of these two parent polymers, the resulting polymer product comprises a random assemblage of the foregoing polymer segments thereby forming random polymer blocks. In addition, saturated segments ($A_0$, $B_0$) may be present as well as quantities of the initial polymers. The polymer products comprise various numbers and sizes of blocks depending on the parent unsaturated polymer architectures and extent of metathesis, including the following structures:

Linear Homopolymers $A_0$, $B_0$, $A_1$-$(A_2)_m$-$A_1$, $B_1$—$(B_2)_n$—$B_1$, where n and m, independently each occurrence, are integers greater than or equal to zero.

Linear Di-Blocks $A_1$-$(A_2)_m$-$(B_2)_n$—$B_1$, where m and n, independently each occurrence, are integers greater than or equal to zero.

Linear Tri-Blocks $B_1$—$(B_2)_n$-$(A_2)_q$-$(B_2)_n$-$\alpha_1$ and $A_1$-$(A_2)_m$-$(B_2)_r$-$(A_2)_m$-$A_1$, where m and n independently each occurrence are integers greater than or equal to zero, and q and r, independently each occurrence, are integers greater than or equal to 1.

Linear Tetra-Blocks $A_1$-$(A_2)_m$-$(B_2)_r$-$(A_2)_q$-$(B_2)_n$-$\alpha_1$, where m and n independently each occurrence are integers greater than or equal to zero, and q and r are integers greater than or equal to 1.

Higher block copolymers are also formed with additional repetitions of $A_2$ and $B_2$ units, terminated with $A_1$-$(A_2)_m$- and -(B$_2$)$_n$-α$_1$ functionality. All of the foregoing are included in the product mixture of the invention.

If more than two segment types are present and/or pendant chain unsaturations are present initially, or generated during the metathesis process, additional polymer types, such as comb polymers will be present in the meta-block copolymer. The random connectivity of segment types A and B is most simply characterized by the probabilities $p_{ab}$, $p_{aa}$, and $p_{bb}$ which sum to one and are proportional to the numbers of the corresponding segment junctures. For unsaturated polymers having several classes of double bonds of different reactivities, additional probabilities are required to describe the random segment connectivity. These probabilities may be generalized for each segment type.

For an unreacted (non-metathesized) blend of two polymers, the probability of random connectivity of segment types A and B is zero ($p_{ab}$=0), with $p_{aa}$ and $p_{bb}$ dependent on the unsaturation levels in the parent polymers. Upon metathesis, a random distribution of polymers with various numbers of random blocks is formed. The population and distribution of the various blocky species is dependent on the connectivity distribution and extent of metathesis reactivity of the segments.

For the special case when each of the parent polymers (A and B) has a single backbone unsaturation, metathesis according to the invention results in a copolymer mixture comprised of homopolymers, $A_1A_1$ and $B_1B_1$, as well as AB di-block copolymer, $A_1B_1$. If the molar levels and reactivity of $A_1$ and $B_1$, are equal, then the equilibrium molar distribution of polymers will be: $A_1A_1$=25%, $B_1B_1$=25%, $A_1B_1$=50%. For arbitrary starting levels of $A_1A_1$, and $B_1B_1$ the equilibrium molar distribution of polymer products is:

$A_1A_1 = p_{aa} = f_a^2$
$B_1B_1 = p_{bb} = f_b^2$
$A_1B_1 = p_{ab} = 2f_af_b$, where $f_a$ is the starting mole fraction of $A_1A_1$ and $f_b$ is the starting mole fraction of $B_1B_1$. Of course, some quantity of meta-block copolymer product is formed under even non-equilibrium metathesis conditions.

In another embodiment of the invention, one of the unsaturated parent polymers (A) has at most a single backbone unsaturation and the other parent polymer (B) has randomly distributed backbone unsaturation. Upon metathesis the resulting meta-block copolymer mixture is comprised of homopolymers, AB di-block copolymers, and ABA tri-block polymers.

The length distribution of the segments in the unsaturated parent polymers is dependent on the synthesis method used and can vary from monodisperse or very narrow for polymers made by a living polymerization method (anionic or cationic polymerization) to broad for unsaturated parent polymers made in continuous reactors by, for example, addition polymerization techniques. If the parent unsaturated polymers have branching, the resulting polymer products from the metathesis reaction likewise possess branching. A diverse range of branched architectures is possible for the resulting copolymers, including stars, combs, random tri-functional branches, random tetra-functional branches, and so forth.

Linear Versus Branched Polymer Products

Linear polymers result when linear unsaturated polymers having one or more backbone unsaturations are metathesized. Branching in polymer products results when unsaturated polymers having a combination of backbone unsaturation and pendant unsaturation, including unsaturated long-chain branches, are metathesized. Comb polymers are formed when one or more unsaturated parent polymers has predominantly pendant unsaturation and at least one other unsaturated parent polymer has predominantly backbone unsaturation. For the special case where one unsaturated parent polymer contains predominantly pendant vinyl functionality, a cross-linked network may result, giving polymers including lightly cross-linked or fully vulcanized products. Terminal, unsaturation, on the other hand, has no net effect on the present process and simply generates a relatively long terminal block in the meta-block copolymer. Preferably most or substantially all of the ethylenic unsaturation in the reagent polymers is non-terminating unsaturation.

Specific non-limiting polymer products obtainable according to the present invention include those resulting from metathesis of the following combination or unsaturated reagent polymers. In all cases the value Tm or Tg may be actual or expected.

A. Unsaturated Polyethylene+Unsaturated Ethylene Based Rubber

1. The meta-block copolymer product preferably is comprised of segments of crystalline or semicrystalline polyethylene (hard segments) with a melting transition having an associated Tm and segments of an elastomeric ethylene copolymer (soft segments) having an associated $T_g$.

2. The mass fraction of polyethylene hard segments in the polymer product, desirably varies from 4 to 96 percent. The mass fraction of unattached polyethylene ($A_0$) desirably is less than 50 percent, preferably less than or equal to 25 percent.

In the foregoing embodiments:

Tm is greater than 100° C., more preferably greater than 115° C., and most preferably greater than 128° C. and Tg is less than 0° C., more preferably less than −50° C., most preferably less than −100° C.

B. Unsaturated Polypropylene+Unsaturated Ethylene-Based Rubber

1. The meta-block copolymer preferably is comprised of segments of polypropylene (hard segments) with a melting transition having an associated Tm and segments of an elastomeric ethylene copolymer, preferably copolymers of ethylene/propylene, ethylene/1-butene, ethylene/1-hexene or ethylene/1-octene, said copolymer having an associated Tg.

2. The polymer can optionally contain crystalline or semi-crystalline polyethylene segments with associated crystalline melting point that is lower than the Tm of the melting transition for the polypropylene hard segments.

3. The mass fraction of polypropylene hard segments desirably is from 4 to 96 percent. Further desirably, the mass fraction of unattached polypropylene, $A_0$, is less than 50 percent, preferably less than or equal to 25 percent.

In the foregoing embodiments:

Tm is greater than 100° C., more preferably greater than 130° C., and most preferably greater than 150° C.;

Tg is less than 0° C., more preferably less than −50° C., and most preferably less than −100° C.

C. Unsaturated Non-crystalline Vinylaromatic Polymer+Unsaturated Ethylene-Based Rubber 1. The meta-block copolymer product preferably is comprised of hard segments of a non-crystalline vinylaromatic polymer with an associated Tg and segments an ethylene-based rubber with an associated Tg less than the Tg of the hard segments.

2. The mass fraction of non-crystalline vinylaromatic polymer hard segments desirably is from 4 to 96 percent. Preferably, the mass fraction of unattached non-crystalline vinylaromatic polymer hard segments is less than 50 percent, more preferably less than or equal to 25 percent.

In the foregoing embodiments,

The Tg of the hard segments is preferably greater than 90° C., more preferably greater than 100° C., highly preferably greater than 105° C., and most preferably greater than 120° C., the Tg of the soft segments is preferably less than 0° C., more preferably less than −50° C., and most preferably less than −100° C.

D. Unsaturated Crystalline Vinylaromatic Polymer+Unsaturated Ethylene-Based Rubber 1. The meta-block copolymer product preferably is comprised of segments of a crystalline polyvinylaromatic polymer (hard segments) with an associated Tm and segments of an elastomeric ethylene-copolymer with an associated Tg.

2. The mass fraction of polyvinylaromatic polymer hard segments desirably is from 2 to 98 percent. Preferably, the mass fraction of unattached crystalline vinylaromatic polymer hard segments is less than 50 percent, more preferably less than or equal to 25 percent.

In the foregoing embodiments:

The Tm of the hard segments is preferably greater than 120° C., more preferably greater than 150° C., most preferably greater than 200° C., The Tg of the elastomeric ethylene-copolymer segments is less than 0° C., more preferably less than −50° C., most preferably less than −100° C.

E. Unsaturated Polyethylene+Unsaturated Polar Group Containing Rubber

1. The meta-block copolymer product preferably is comprised of segments of crystalline or semicrystalline polyethylene (hard segments) with a melting transition having an associated Tm and segments comprising a polar group containing elastomer, chloride, fluoride or nitrile, having a Tg.

2. The mass fraction of polyethylene hard segments in the meta-block copolymer product desirably varies from 4 to 96 percent. The mass fraction of unattached polyethylene hard segments ($A_O$) desirably is less than 50 percent, preferably less than or equal to 25 percent.

In the foregoing embodiments:

The Tm of the hard segments preferably greater than 100° C., more preferably greater than 115° C., most preferably greater than 128° C., The Tg of the elastomer is less than −20° C., more preferably less than −50° C., most preferably less than −100° C.

F. Unsaturated Ethylene/Cycloolefin Copolymer+Unsaturated Ethylene Copolymer Rubber 1. The meta-block copolymer product preferably is comprised of segments of ethylene/cycloolefin copolymer (hard segments) with a melting transition having an associated Tm and segments of an ethylene copolymer elastomer having an associated Tg.

2. The mass fraction of ethylene/cycloolefin copolymer hard segments in the meta-block copolymer product desirably varies from 4 to 96 percent. The mass fraction of unattached ethylene/cycloolefin copolymer hard segments ($A_O$) desirably is less than 50 percent, preferably less than or equal to 25 percent.

In the foregoing embodiments:

The Tm is preferably greater than 120° C., more preferably greater than 130° C., most preferably greater than 135° C., and the Tg of the elastomer segments is less than 0° C., more preferably less than −50° C., most preferably less than −100° C.

G. Unsaturated Polar Group Containing Crystalline Polymer+Unsaturated Ethylene-Based Rubber 1. The meta-block copolymer product preferably is comprised of segments of polar group containing crystalline polymer (hard segments) with a melting transition having an associated Tm and segments of an ethylene copolymer elastomer having an associated Tg.

2. The mass fraction of polar group containing crystalline polymer hard segments in the meta-block copolymer product desirably varies from 4 to 96 percent. The mass fraction of unattached polar group containing crystalline polymer hard segments ($A_O$) desirably is less than 50 percent, preferably less than or equal to 25 percent.

In the foregoing embodiments:

The Tm is greater than 100° C., more preferably greater than 115° C., most preferably greater than 128° C., and the Tg is less than 0° C., more preferably less than −50° C., most preferably less than −100° C.

H. Unsaturated Polar Group Containing Crystalline Polymer+Unsaturated Polar Group Containing Elastomer 1. The meta-block copolymer product preferably is comprised of segments of polar group containing crystalline polymer (hard segments) with a melting transition having an associated Tm and segments of a polar group containing elastomer having a Tg.

2. The mass fraction of polar group containing crystalline polymer hard segments in the meta-block copolymer product desirably varies from 4 to 96 percent. The mass fraction of unattached polar group containing crystalline polymer hard segments ($A_O$) desirably is less than 50 percent, preferably less than or equal to 25 percent.

In the foregoing embodiments:

The Tm is greater than 100° C., more preferably greater than 115° C., most preferably greater than 125° C., and the Tg is less than 30° C., more preferably less than −20° C., most preferably less than 0° C.

Identification of the various polymer segments is conducted by use of CRYSTAF, TREF, ATREF, DSC, IR or NMR techniques, or combinations thereof.

Unsaturated Reagent Polymer Synthesis by Addition Polymerization

A preferred process for preparing unsaturated reagent polymers for use herein is the addition polymerization of one or more olefins and a diolefin. Suitable catalysts for such copolymerization include the well known transition metal based coordination catalysts previously disclosed for use in polymerizations of olefin monomers. Especially preferred catalysts comprise a Group 4 metal, especially zirconium or hafnium, and a heteroatom containing donor ligand. Desirable catalysts produce interpolymer products that are low in terminal unsaturation. The presence of unsaturation in the polymer, especially terminal unsaturation, may be further reduced by hydrogenation of the resulting interpolymer prior to contact with the metathesis catalyst. Desirably, the incidence of olefinic unsaturation in the unsaturated polymer is adjusted to between 0.01 and 0.1 percent, with the terminal unsaturation being not more than 0.001 percent, preferably less than 0.0001 percent. In determining such values, the ethylene units and any substituents on either carbon thereof are included in the theoretical weights of the ethylenic unit.

Examples of suitable Group 4 metal complexes useful as coordination catalyst components include complexes of transition metals selected from Groups 3 to 15 of the Periodic Table of the Elements containing one or more delocalized, π-bonded ligands or polyvalent Lewis base ligands. Examples include metallocene, half-metallocene, constrained geometry, and polyvalent pyridylamine-, polyether-, or other polychelating base complexes. The complexes are generically depicted by the formula: $MK_kX_xZ_z$, or a dimer thereof, wherein M is a metal selected from Groups 3-15, preferably 3-10, more preferably 4-8, and most preferably Group 4 of the Periodic Table of the Elements;

K independently each occurrence is a group containing delocalized π-electrons or one or more electron pairs through which K is bound to M, said K group containing up to 50 atoms not counting hydrogen atoms, optionally two or more K groups may be joined together forming a bridged structure, and further optionally one or more K groups may be bound to Z, to X or to both Z and X;

X independently each occurrence is a monovalent, anionic moiety having up to 40 non-hydrogen atoms, optionally one or more X groups may be bonded together thereby forming a divalent or polyvalent anionic group, and, further optionally, one or more X groups and one or more Z groups may be bonded together thereby forming a moiety that is both covalently bound to M and coordinated thereto;

Z independently each occurrence is a neutral, Lewis base donor ligand of up to 50 non-hydrogen atoms containing at least one unshared electron pair through which Z is coordinated to M;

k is an integer from 0 to 3;
x is an integer from 1 to 4;
z is a number from 0 to 3; and
the sum, k+x, is equal to the formal oxidation state of M.

Suitable metal complexes include those containing from 1 to 3 π-bonded anionic or neutral ligand groups, which may be cyclic or non-cyclic delocalized π-bonded anionic ligand groups. Exemplary of such π-bonded groups are conjugated or nonconjugated, cyclic or non-cyclic diene and dienyl groups, allyl groups, boratabenzene groups, phosphole, and arene groups. By the term "π-bonded" is meant that the ligand group is bonded to the transition metal by a sharing of electrons from a partially delocalized π-bond.

Each atom in the delocalized π-bonded group may independently be substituted with a radical selected from the group consisting of hydrogen, halogen, hydrocarbyl, halohydrocarbyl, hydrocarbyl-substituted heteroatoms wherein the heteroatom is selected from Group 14-16 of the Periodic Table of the Elements, and such hydrocarbyl-substituted heteroatom radicals further substituted with a Group 15 or 16 hetero atom containing moiety. In addition two or more such radicals may together form a fused ring system, including partially or fully hydrogenated fused ring systems, or they may form a metallocycle with the metal. Included within the term "hydrocarbyl" are $C_{1-20}$ straight, branched and cyclic alkyl radicals, $C_{6-20}$ aromatic radicals, $C_{7-20}$ alkyl-substituted aromatic radicals, and $C_{7-20}$ aryl-substituted alkyl radicals. Suitable hydrocarbyl-substituted heteroatom radicals include mono-, di- and tri-substituted radicals of boron, silicon, germanium, nitrogen, phosphorus or oxygen wherein each of the hydrocarbyl groups contains from 1 to 20 carbon atoms. Examples include N,N-dimethylamino, pyrrolidinyl, trimethylsilyl, trimethylsilyl, t-butyldimethylsilyl, methyldi(t-butyl)silyl, triphenylgermyl, and trimethylgermyl groups. Examples of Group 15 or 16 hetero atom containing moieties include amino, phosphino, alkoxy, or alkylthio moieties or divalent derivatives thereof, for example, amide, phosphide, alkyleneoxy or alkylenethio groups bonded to the transition metal or Lanthanide metal, and bonded to the hydrocarbyl group, π-bonded group, or hydrocarbyl-substituted heteroatom.

Examples of suitable anionic, delocalized π-bonded groups include cyclopentadienyl, indenyl, fluorenyl, tetrahydroindenyl, tetrahydrofluorenyl, octahydrofluorenyl, pentadienyl, cyclohexadienyl, dihydroanthracenyl, hexahydroanthracenyl, decahydroanthracenyl groups, phosphole, and boratabenzyl groups, as well as inertly substituted derivatives thereof, especially $C_{1-10}$ hydrocarbyl-substituted or tris($C_{1-10}$ hydrocarbyl)silyl-substituted derivatives thereof. Preferred anionic delocalized π-bonded groups are cyclopentadienyl, pentamethylcyclopentadienyl, tetramethylcyclopentadienyl, tetramethylsilylcyclopentadienyl, indenyl, 2,3-dimethylindenyl, fluorenyl, 2-methylindenyl, 2-methyl-4-phenylindenyl, tetrahydrofluorenyl, octahydrofluorenyl, 1-indacenyl, 3-pyrrolidinoinden-1-yl, 3,4-(cyclopenta(l)phenanthren-1-yl, and tetrahydroindenyl.

The boratabenzyl ligands are anionic ligands which are boron containing analogues to benzene. They are previously known in the art having been described by G. Herberich, et al., in *Organometallics,* 14, 1, 471-480 (1995). Preferred boratabenzenyl ligands correspond to the formula:

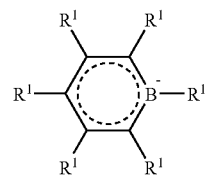

wherein $R^1$ is an inert substituent, preferably selected from the group consisting of hydrogen, hydrocarbyl, silyl, halo or germyl, said $R^1$ having up to 20 atoms not counting hydrogen, and optionally two adjacent $R^1$ groups may be joined together. In complexes involving divalent derivatives of such delocalized π-bonded groups one atom thereof is bonded by means of a covalent bond or a covalently bonded divalent group to another atom of the complex thereby forming a bridged system.

Phospholes are anionic ligands that are phosphorus containing analogues to a cyclopentadienyl group. They are previously known in the art having been described by WO 98/50392, and elsewhere. Preferred phosphole ligands correspond to the formula:

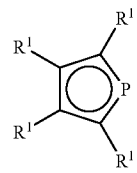

wherein $R^1$ is as previously defined.

Preferred transition metal complexes for use herein correspond to the formula: $MK_kX_xZ_z$, or a dimer thereof, wherein:

M is a Group 4 metal;

K is a group containing delocalized n-electrons through which K is bound to M, said K group containing up to 50 atoms not counting hydrogen atoms, optionally two K groups may be joined together forming a bridged structure, and further optionally one K may be bound to X or Z;

X each occurrence is a monovalent, anionic moiety having up to 40 non-hydrogen atoms, optionally one or more X and one or more K groups are bonded together to form a metallocycle, and further optionally one or more X and one or more Z groups are bonded together thereby forming a moiety that is both covalently bound to M and coordinated thereto;

Z independently each occurrence is a neutral, Lewis base donor ligand of up to 50 non-hydrogen atoms containing at least one unshared electron pair through which Z is coordinated to M;

k is an integer from 0 to 3;

x is an integer from 1 to 4;

z is a number from 0 to 3; and the sum, k+x, is equal to the formal oxidation state of M.

Preferred complexes include those containing either one or two K groups. The latter complexes include those containing a bridging group linking the two K groups. Preferred bridging groups are those corresponding to the formula $(ER'_2)_e$ wherein E is silicon, germanium, tin, or carbon, R' independently each occurrence is hydrogen or a group selected from silyl, hydrocarbyl, hydrocarbyloxy and combinations thereof, said R' having up to 30 carbon or silicon atoms, and e is 1 to 8. Preferably, R' independently each occurrence is methyl, ethyl, propyl, benzyl, tert-butyl, phenyl, methoxy, ethoxy or phenoxy.

Examples of the complexes containing two K groups are compounds corresponding to the formula:

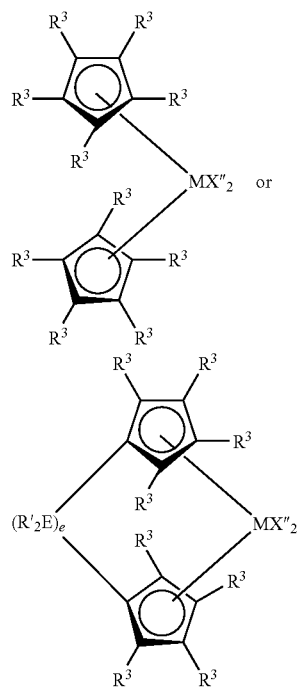

wherein:

M is titanium, zirconium or hafnium, preferably zirconium or hafnium, in the +2 or +4 formal oxidation state;

$R^3$ in each occurrence independently is selected from the group consisting of hydrogen, hydrocarbyl, silyl, germyl, cyano, halo and combinations thereof, said $R^3$ having up to 20 non-hydrogen atoms, or adjacent $R^3$ groups together form a divalent derivative (that is, a hydrocarbadiyl, siladiyl or germadiyl group) thereby forming a fused ring system, and X" independently each occurrence is an anionic ligand group of up to 40 non-hydrogen atoms, or two X" groups together form a divalent anionic ligand group of up to 40 non-hydrogen atoms or together are a conjugated diene having from 4 to 30 non-hydrogen atoms bound by means of delocalized π-electrons to M, whereupon M is in the +2 formal oxidation state, and R', E and e are as previously defined.

Exemplary bridged ligands containing two π-bonded groups are: dimethylbis(cyclopentadienyl)silane, dimethylbis(tetramethylcyclopentadienyl)silane, dimethylbis(2-ethylcyclopentadien-1-yl)silane, dimethylbis(2-t-butylcyclopentadien-1-yl)silane, 2,2-bis(tetramethylcyclopentadienyl) propane, dimethylbis(inden-1-yl)silane, dimethylbis(tetrahydroinden-1-yl)silane, dimethylbis(fluoren-1-yl) silane, dimethylbis(tetrahydrofluoren-1-yl)silane, dimethylbis(2-methyl-4-phenylinden-1-yl)-silane, dimethylbis(2-methylinden-1-yl)silane, dimethyl(cyclopentadienyl) (fluoren-1-yl)silane, dimethyl(cyclopentadienyl)(octahydrofluoren-1-yl)silane, dimethyl(cyclopentadienyl) (tetrahydrofluoren-1-yl)silane, (1,1,2,2-tetramethy)-1,2-bis (cyclopentadienyl)disilane, (1,2-bis(cyclopentadienyl) ethane, and dimethyl(cyclopentadienyl)-1-(fluoren-1-yl) methane.

Preferred X" groups are selected from hydride, hydrocarbyl, silyl, germyl, halohydrocarbyl, halosilyl, silylhydrocarbyl and aminohydrocarbyl groups, or two X" groups together form a divalent derivative of a conjugated diene or else together they form a neutral, π-bonded, conjugated diene. Most preferred X" groups are $C_{1-20}$ hydrocarbyl groups.

Examples of metal complexes of the foregoing formula suitable for use in the present invention include:

bis(cyclopentadienyl)zirconiumdimethyl, bis(cyclopentadienyl)zirconium dibenzyl, bis(cyclopentadienyl)zirconium methyl benzyl, bis(cyclopentadienyl)zirconium methyl phenyl, bis(cyclopentadienyl)zirconiumdiphenyl, bis(cyclopentadienyl)titanium-allyl, bis(cyclopentadienyl)zirconiummethylmethoxide, bis(cyclopentadienyl) zirconiummethylchloride, bis (pentamethylcyclopentadienyl)zirconiumdimethyl, bis (pentamethylcyclopentadienyl)titaniumdimethyl, bis (indenyl)zirconiumdimethyl, indenylfluorenylzirconiumdimethyl, bis(indenyl)zirconiummethyl(2-(dimethylamino)benzyl), bis(indenyl)zirconiummethyltrimethylsilyl, bis(tetrahydroindenyl)zirconiummethyltrimethylsilyl, bis(pentamethylcyclopentadienyl) zirconiummethylbenzyl, bis(pentamethylcyclopentadienyl) zirconiumdibenzyl, bis(pentamethylcyclopentadienyl) zirconiummethylmethoxide, bis (pentamethylcyclopentadienyl)zirconiummethylchloride, bis(methylethylcyclopentadienyl)zirconiumdimethyl, bis (butylcyclopentadienyl)zirconiumdibenzyl, bis(t-butylcyclopentadienyl)zirconiumdimethyl, bis(ethyltetramethylcyclopentadienyl)zirconiumdimethyl, bis (methylpropylcyclopentadienyl)zirconiumdibenzyl, bis (trimethylsilylcyclopentadienyl)zirconiumdibenzyl, dimethylsilylbis(cyclopentadienyl)zirconiumdichloride, dimethylsilylbis(cyclopentadienyl)zirconiumdimethyl, dimethylsilylbis(tetramethylcyclopentadienyl)titanium (III) allyl dimethylsilylbis(t-butylcyclopentadienyl)zirconiumdichloride, dimethylsilylbis(n-butylcyclopentadienyl)zirconiumdichloride, (dimethylsilyibis(tetramethylcyclopentadienyptitanium(III) 2-(dimethylamino)benzyl, (dimethylsilylbis(n-butylcyclopentadienyptitanium(III) 2-(dimethylamino) benzyl, dimethylsilylbis(indenyl)zirconiumdichloride, dimethylsilylbis(indenyl)zirconiumdimethyl, dimethylsilylbis(2-methylindenyl)zirconiumdimethyl, dimethylsilylbis (2-methyl-4-phenylindenyl)zirconiumdimethyl, dimethylsilylbis(2-methylindenyl)zirconium-1,4-diphenyl-1,3-butadiene, dimethylsilylbis(2-methyl-4-phenylindenyl) zirconium (II) 1,4-diphenyl-1,3-butadiene, dimethylsilylbis (4,5,6,7-tetrahydroinden-1-yl)zirconiumdichloride, dimethylsilylbis(4,5,6,7-tetrahydroinden-1-yl)zirconiumdimethyl, dimethylsilylbis(tetrahydroindenyl)zirconium(II) 1,4-diphenyl-1,3-butadiene, dimethylsilyibis(tetramethylcyclopentadienyl)zirconium dimethyl dimethylsilylbis(fluorenyl)zirconiumdimethyl, dimethylsilylbis(tetrahydrofluorenyl)zirconium bis(trimethylsilyl), ethylenebis(indenyl)

zirconiumdichloride, ethylenebis(indenyl)zirconiumdimethyl, ethylenebis(4,5,6,7-tetrahydroindenyl)zirconiumdichloride, ethylenebis(4,5,6,7-tetrahydroindenyl)zirconiumdimethyl, (isopropylidene)(cyclopentadienyl)(fluorenyl)zirconiumdibenzyl, and dimethylsilyl(tetramethylcyclopentadienyl)(fluorenyl)zirconium dimethyl.

A further class of metal complexes utilized in the present invention corresponds to the preceding formula: $MKZ_zX_x$, or a dimer thereof, wherein M, K, X, x and z are as previously defined, and Z is a substituent of up to 50 non-hydrogen atoms that together with K forms a metallocycle with M.

Preferred Z substituents include groups containing up to 30 non-hydrogen atoms comprising at least one atom that is oxygen, sulfur, boron or a member of Group 14 of the Periodic Table of the Elements directly attached to K, and a different atom, selected from the group consisting of nitrogen, phosphorus, oxygen or sulfur that is covalently bonded to M.

More specifically this class of Group 4 metal complexes used according to the present invention includes "constrained geometry catalysts" corresponding to the formula:

wherein:

M is titanium or zirconium, preferably titanium in the +2, +3, or +4 formal oxidation state;

$K^1$ is a delocalized, π-bonded ligand group optionally substituted with from 1 to 5 $R^2$ groups, $R^2$ in each occurrence independently is selected from the group consisting of hydrogen, hydrocarbyl, silyl, germyl, cyano, halo and combinations thereof, said $R^2$ having up to 20 non-hydrogen atoms, or adjacent $R^2$ groups together form a divalent derivative (that is, a hydrocarbadiyl, siladiyl or germadiyl group) thereby forming a fused ring system, each X is a halo, hydrocarbyl, hydrocarbyloxy or silyl group, said group having up to 20 non-hydrogen atoms, or two X groups together form a neutral $C_{5-30}$ conjugated diene or a divalent derivative thereof;

x is 1 or 2;

Y is —O—, —S—, —NR'—, —PR'—; and

X' is $SiR'_2$, $CR'_2$, $SiR'_2SiR'_2$, $CR'_2CR'_2$, $CR'$=$CR'$, $CR'_2SiR'_2$, or $GeR'_2$, wherein R' independently each occurrence is hydrogen or a group selected from silyl, hydrocarbyl, hydrocarbyloxy and combinations thereof, said R' having up to 30 carbon or silicon atoms.

Specific examples of the foregoing constrained geometry metal complexes include compounds corresponding to the formula:

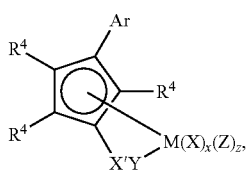

wherein,

Ar is an aryl group of from 6 to 30 atoms not counting hydrogen;

$R^4$ independently each occurrence is hydrogen, Ar, or a group other than Ar selected from hydrocarbyl, trihydrocarbylsilyl, trihydrocarbylgermyl, halide, hydrocarbyloxy, trihydrocarbylsiloxy, bis(trihydrocarbylsilyl)amino, di(hydrocarbyl)amino, hydrocarbadiylamino, hydrocarbylimino, di(hydrocarbyl)phosphino, hydrocarbadiylphosphino, hydrocarbylsulfido, halo-substituted hydrocarbyl, hydrocarbyloxy-substituted hydrocarbyl, trihydrocarbylsilyl-substituted hydrocarbyl, trihydrocarbylsiloxy-substituted hydrocarbyl, bis(trihydrocarbylsilyl)amino-substituted hydrocarbyl, di(hydrocarbyl)amino-substituted hydrocarbyl, hydrocarbyleneamino-substituted hydrocarbyl, di(hydrocarbyl)phosphino-substituted hydrocarbyl, hydrocarbylenephosphino-substituted hydrocarbyl, or hydrocarbylsulfido-substituted hydrocarbyl, said R group having up to 40 atoms not counting hydrogen atoms, and optionally two adjacent $R^4$ groups may be joined together forming a polycyclic fused ring group;

M is titanium;

X' is $SiR^6_2$, $CR^6_2$, $SiR^6_2SiR^6_2$, $CR^6_2CR^6_2$, $CR^6$=$CR^6$, $CR^6_2SiR^6_2$, $BR^6$, $BR^6L''$, or $GeR^6_2$;

Y is —O—, —S—, —$NR^5$—, —$PR^5$—; —$NR^5_2$, or —$PR^5_2$;

$R^5$, independently each occurrence, is hydrocarbyl, trihydrocarbylsilyl, or trihydrocarbylsilylhydrocarbyl, said $R^5$ having up to 20 atoms other than hydrogen, and optionally two $R^5$ groups or $R^5$ together with Y or Z form a ring system;

$R^6$, independently each occurrence, is hydrogen, or a member selected from hydrocarbyl, hydrocarbyloxy, silyl, halogenated alkyl, halogenated aryl, —$NR^5_2$, and combinations thereof, said $R^6$ having up to 20 non-hydrogen atoms, and optionally, two $R^6$ groups or $R^6$ together with Z forms a ring system;

Z is a neutral diene or a monodentate or polydentate Lewis base optionally bonded to $R^5$, $R^6$, or X;

X is hydrogen, a monovalent anionic ligand group having up to 60 atoms not counting hydrogen, or two X groups are joined together thereby forming a divalent ligand group;

x is 1 or 2; and z is 0, 1 or 2.

Preferred examples of the foregoing metal complexes are substituted at both the 3- and 4-positions of a cyclopentadienyl or indenyl group with an Ar group.

Examples of the foregoing metal complexes include:
(3-phenylcyclopentadien-1-yl)dimethyl(t-butylamido)silanetitanium dichloride,
(3-phenylcyclopentadien-1-yl)dimethyl(t-butylamido)silanetitanium dimethyl,
(3-phenylcyclopentadien-1-yl)dimethyl(t-butylamido)silanetitanium (II) 1,3-diphenyl-1,3-butadiene;
(3-(pyrrol-1-yl)cyclopentadien-1-yl)dimethyl(t-butylamido)silanetitanium dichloride,
(3-(pyrrol-1-yl)cyclopentadien-1-yl)dimethyl(t-butylamido)silanetitanium dimethyl,
(3-(pyrrol-1-yl)cyclopentadien-1-yl)dimethyl(t-butylamido)silanetitanium (II) 1,4-diphenyl-1,3-butadiene;
(3-(1-methylpyrrol-3-yl)cyclopentadien-1-yl)dimethyl(t-butylamido)silanetitanium dichloride,
(3-(1-methylpyrrol-3-yl)cyclopentadien-1-yl)dimethyl(t-butylamido)silanetitanium dimethyl,
(3-(1-methylpyrrol-3-yl)cyclopentadien-1-yl)dimethyl(t-butylamido)silanetitanium (II) 1,4-diphenyl-1,3-butadiene;
(3,4-diphenylcyclopentadien-1-yl)dimethyl(t-butylamido)silanetitanium dichloride,
(3,4-diphenylcyclopentadien-1-yl)dimethyl(t-butylamido)silanetitanium dimethyl, (3,4-diphenylcyclopentadien-1-yl)dimethyl(t-butylamido) silanetitanium (II) 1,3-pentadiene;
(3-(3-N,N-dimethylamino)phenyl)cyclopentadien-1-yl)dimethyl(t-butylamido)silanetitanium dichloride,
(3-(3-N,N-dimethylamino)phenylcyclopentadien-1-yl)dimethyl(t-butylamido)silanetitanium dimethyl,
(3-(3-N,N-dimethylamino)phenylcyclopentadien-1-yl)dimethyl(t-butylamido)silanetitanium (II) 1,4-diphenyl-1,3-butadiene;
(3-(4-methoxyphenyl)-4-methylcyclopentadien-1-yl)dimethyl(t-butylamido)silanetitanium dichloride,
(3-(4-methoxyphenyl)-4-phenylcyclopentadien-1-yl)dimethyl(t-butylamido)silanetitanium dimethyl,
(3-4-methoxyphenyl)-4-phenylcyclopentadien-1-yl)dimethyl(t-butylamido)silanetitanium (II) 1,4-diphenyl-1,3-butadiene;
(3-phenyl-4-methoxycyclopentadien-1-yl)dimethyl(t-butylamido)silanetitanium dichloride,
(3-phenyl-4-methoxycyclopentadien-1-yl)dimethyl(t-butylamido)silanetitanium dimethyl,
(3-phenyl-4-methoxycyclopentadien-1-yl)dimethyl(t-butylamido)silanetitanium (II) 1,4-diphenyl-1,3-butadiene;
(3-phenyl-4-(N,N-dimethylamino)cyclopentadien-1-yl)dimethyl(t-butylamido)silanetitanium dichloride,
(3-phenyl-4-(N,N-dimethylamino)cyclopentadien-1-yl)dimethyl(t-butylamido)silanetitanium dimethyl,
(3-phenyl-4-(N,N-dimethylamino)cyclopentadien-1-yl)dimethyl(t-butylamido)silanetitanium (II) 1,4-diphenyl-1,3-butadiene;
2-methyl-(3,4-di(4-methylphenyl)cyclopentadien-1-yl)dimethyl(t-butylamido)silanetitanium dichloride,
2-methyl-(3,4-di(4-methylphenyl)cyclopentadien-1-yl)dimethyl(t-butylamido)silanetitanium dimethyl,
2-methyl-(3,4-di(4-methylphenyl)cyclopentadien-1-yl)dimethyl(t-butylamido)silanetitanium (II) 1,4-diphenyl-1,3-butadiene;
((2,3-diphenyl)-4-(N,N-dimethylamino)cyclopentadien-1-yl)dimethyl(t-butylamido)silane titanium dichloride,
((2,3-diphenyl)-4-(N,N-dimethylamino)cyclopentadien-1-yl)dimethyl(t-butylamido)silane titanium dimethyl,
((2,3-diphenyl)-4-(N,N-dimethylamino)cyclopentadien-1-yl)dimethyl(t-butylamido)silanetitanium (II) 1,4-diphenyl-1,3-butadiene;
(2,3,4-triphenyl-5-methylcyclopentadien-1-yl)dimethyl(t-butylamido)silanetitanium dichloride,
(2,3,4-triphenyl-5-methylcyclopentadien-1-yl)dimethyl(t-butylamido)silanetitanium dimethyl,
(2,3,4-triphenyl-5-methylcyclopentadien-1-yl)dimethyl(t-butylamido)silanetitanium (II) 1,4-diphenyl-1,3-butadiene;
(3-phenyl-4-methoxycyclopentadien-1-yl)dimethyl(t-butylamido)silanetitanium dichloride,
(3-phenyl-4-methoxycyclopentadien-1-yl)dimethyl(t-butylamido)silanetitanium dimethyl,
(3-phenyl-4-methoxycyclopentadien-1-yl)dimethyl(t-butylamido)silanetitanium (II) 1,4-diphenyl-1,3-butadiene;
(2,3-diphenyl-4-(n-butyl)cyclopentadien-1-yl)dimethyl(t-butylamido)silanetitanium dichloride,
(2,3-diphenyl-4-(n-butyl)cyclopentadien-1-yl)dimethyl(t-butylamido)silanetitanium dimethyl,
(2,3-diphenyl-4-(n-butyl)cyclopentadien-1-yl)dimethyl(t-butylamido)silanetitanium (II) 1,4-diphenyl-1,3-butadiene;
(2,3,4,5-tetraphenylcyclopentadien-1-yl)dimethyl(t-butylamido)silanetitanium dichloride,
(2,3,4,5-tetraphenylcyclopentadien-1-yl)dimethyl(t-butylamido)silanetitanium dimethyl, and
(2,3,4,5-tetraphenylcyclopentadien-1-yl)dimethyl(t-butylamido)silanetitanium (II) 1,4-diphenyl-1,3-butadiene.

Additional examples of suitable metal complexes for use as addition polymerization catalysts are polycyclic complexes corresponding to the formula:

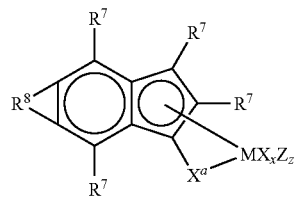

where M is titanium in the +2, +3 or +4 formal oxidation state;

$R^7$ independently each occurrence is hydride, hydrocarbyl, silyl, germyl, halide, hydrocarbyloxy, hydrocarbylsiloxy, hydrocarbylsilylamino, di(hydrocarbyl)amino, hydrocarbyleneamino, di(hydrocarbyl)phosphino, hydrocarbylenephosphine, hydrocarbylsulfido, halo-substituted hydrocarbyl, hydrocarbyloxy-substituted hydrocarbyl, silyl-substituted hydrocarbyl, hydrocarbylsiloxy-substituted hydrocarbyl, hydrocarbylsilylamino-substituted hydrocarbyl, di(hydrocarbyl)amino-substituted hydrocarbyl, hydrocarbyleneamino-substituted hydrocarbyl, di(hydrocarbyl) phosphino-substituted hydrocarbyl, hydrocarbylenephosphino-substituted hydrocarbyl, or hydrocarbylsulfido-substituted hydrocarbyl, said $R^7$ group having up to 40 atoms not counting hydrogen, and optionally two or more of the foregoing groups may together form a divalent derivative;

$R^8$ is a divalent hydrocarbylene- or substituted hydrocarbylene group forming a fused system with the remainder of the metal complex, said $R^8$ containing from 1 to 30 atoms not counting hydrogen;

$X^a$ is a divalent moiety, or a moiety comprising one σ-bond and a neutral two electron pair able to form a coordinate-covalent bond to M, said $X^a$ comprising boron, or a member of Group 14 of the Periodic Table of the Elements, and also comprising nitrogen, phosphorus, sulfur or oxygen;

X is a monovalent anionic ligand group having up to 60 atoms exclusive of the class of ligands that are cyclic, delocalized, π-bound ligand groups and optionally two X groups together form a divalent ligand group;

Z independently each occurrence is a neutral ligating compound having up to 20 atoms;

x is 0, 1 or 2; and z is zero or 1.

Preferred examples of such complexes are 3-phenyl-substituted s-indecenyl complexes corresponding to the formula:

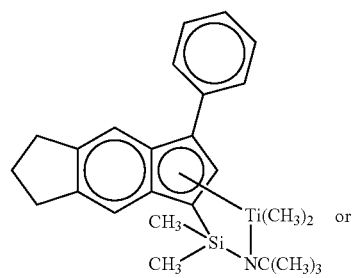

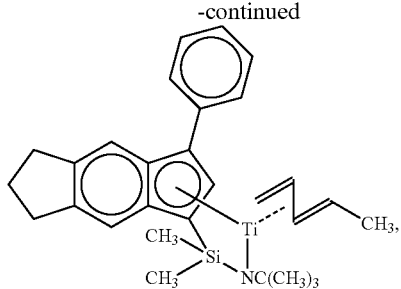

2,3-dimethyl-substituted s-indecenyl complexes corresponding to the formulas:

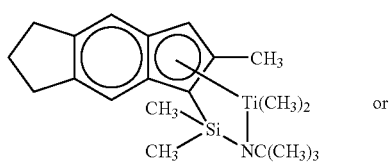

or

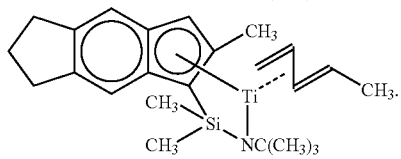

or 2-methyl-substituted s-indecenyl complexes corresponding to the formulas:

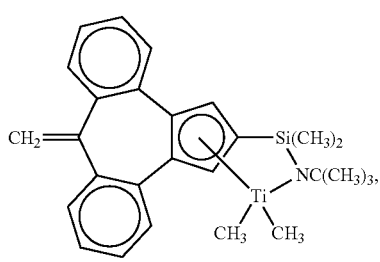

Additional examples of such metal complexes include those of the formula:

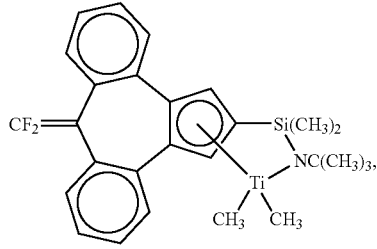

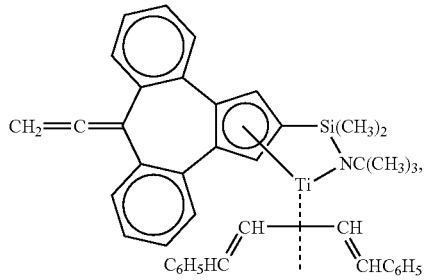

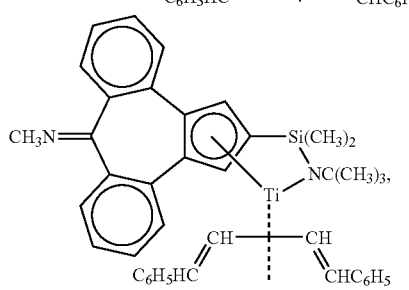

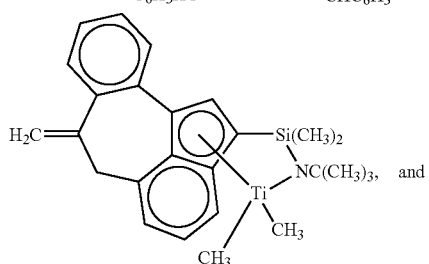

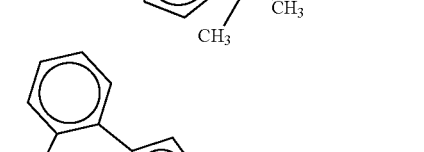

Specific metal complexes include:
(8-methylene-1,8-dihydrodibenzo[e,h]azulen-1-yl)-N-(1,1-dimethylethyl)dimethylsilanamide titanium (II) 1,4-diphenyl-1,3-butadiene,
(8-methylene-1,8-dihydrodibenzo[e,h]azulen-1-yl)-N-(1,1-dimethylethyl)dimethylsilanamide titanium (II) 1,3-pentadiene,
(8-methylene-1,8-dihydrodibenzo[e,h]azulen-1-yl)-N-(1,1-dimethylethyl)dimethylsilanamide titanium (III) 2-(N,N-dimethylamino)benzyl,
(8-methylene-1,8-dihydrodibenzo[e,h]azulen-1-yl)-N-(1,1-dimethylethyl)dimethylsilanamide titanium (IV) dichloride, (8-methylene-1,8-dihydrodibenzo[e,h]azulen-1-yl)-N-(1,1-dimethylethyl)dimethylsilanamide titanium (IV) dimethyl, (8-methylene-1,8-dihydrodibenzo[e,h]azulen-1-yl)-N-(1,1-dimethylethyl)dimethylsilanamide titanium (IV) dibenzyl, (8-difluoromethylene-1,8-dihydrodibenzo[e,h]azulen-1-yl)-N-(1,1-dimethylethyl)dimethylsilanamide titanium (II) 1,4-diphenyl-1,3-butadiene, (8-difluoromethylene-1,8-dihydrodibenzo[e,h]azulen-1-yl)-N-(1,1-dimethylethyl)dimethylsilanamide titanium (II) 1,3-pentadiene, (8-difluoromethylene-1,8-dihydrodibenzo[e,h]azulen-1-yl)-N-(1,1-dimethylethyl)dimethylsilanamide titanium (III) 2-(N,N-dimethylamino)benzyl, (8-difluoromethylene-1,8-dihydrodibenzo[e,h]azulen-1-yl)-N-(1,1-dimethylethyl)dimethylsilanamide titanium (IV) dichloride, (8-difluoromethylene-1,8-dihydrodibenzo[e,h]azulen-1-yl)-N-(1,1-dimethylethyl)dimethylsilanamide titanium (IV) dimethyl, (8-difluoromethylene-1,8-dihydrodibenzo[e,h]azulen-1-yl)-N-(1,1-dimethylethyl)dimethylsilanamide titanium (IV) dibenzyl, (8-methylene-1,8-dihydrodibenzo[e,h]azulen-2-yl)-N-(1,1-dimethylethyl)dimethylsilanamide titanium (II) 1,4-diphenyl-1,3-butadiene, (8-methylene-1,8-dihydrodibenzo[e,h]azulen-2-yl)-N-(1,1-dimethylethyl)dimethylsilanamide titanium (II) 1,3-pentadiene, (8-methylene-1,8-dihydrodibenzo[e,h]azulen-2-yl)-N-(1,1-dimethylethyl)dimethylsilanamide titanium (III) 2-(N,N-dimethylamino)benzyl, (8-methylene-1,8-dihydrodibenzo[e,h]azulen-2-yl)-N-(1,1-dimethylethyl)dimethylsilanamide titanium (IV) dichloride, (8-methylene-1,8-dihydrodibenzo[e,h]azulen-2-yl)-N-(1,1-dimethylethyl)dimethylsilanamide titanium (IV) dimethyl, (8-methylene-1,8-dihydrodibenzo[e,h]azulen-2-yl)-N-(1,1-dimethylethyl)dimethylsilanamide titanium (IV) dibenzyl, (8-difluoromethylene-1,8-dihydrodibenzo[e,h]azulen-2-yl)-N-(1,1-dimethylethyl)dimethylsilanamide titanium (II) 1,4-diphenyl-1,3-butadiene, (8-difluoromethylene-1,8-dihydrodibenzo[e,h]azulen-2-yl)-N-(1,1-dimethylethyl)dimethylsilanamide titanium (II) 1,3-pentadiene, (8-difluoromethylene-1,8-dihydrodibenzo[e,h]azulen-2-yl)-N-(1,1-dimethylethyl)dimethylsilanamide titanium (III) 2-(N,N-dimethylamino)benzyl, (8-difluoromethylene-1,8-dihydrodibenzo[e,h]azulen-2-yl)-N-(1,1-dimethylethyl)dimethylsilanamide titanium (IV) dichloride, (8-difluoromethylene-1,8-dihydrodibenzo[e,h]azulen-2-yl)-N-(1,1-dimethylethyl)dimethylsilanamide titanium (IV) dimethyl, (8-difluoromethylene-1,8-dihydrodibenzo[e,h]azulen-2-yl)-N-(1,1-dimethylethyl)dimethylsilanamide titanium (IV) dibenzyl, and mixtures thereof, especially mixtures of positional isomers.

Further illustrative examples of metal complexes for use in addition polymerization processes correspond to the formula:

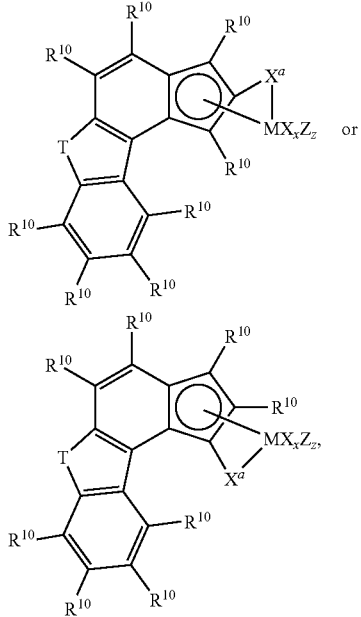

where M is titanium in the +2, +3 or +4 formal oxidation state;

T is $-NR^9-$ or $-O-$;

$R^9$ is hydrocarbyl, silyl, germyl, dihydrocarbylboryl, or halohydrocarbyl or up to 10 atoms not counting hydrogen;

$R^{10}$ independently each occurrence is hydrogen, hydrocarbyl, trihydrocarbylsilyl, trihydrocarbylsilylhydrocarbyl, germyl, halide, hydrocarbyloxy, hydrocarbylsiloxy, hydrocarbylsilylamino, di(hydrocarbyl)amino, hydrocarbyleneamino, di(hydrocarbyl)phosphino, hydrocarbylene-phosphino, hydrocarbylsulfido, halo-substituted hydrocarbyl, hydrocarbyloxy-substituted hydrocarbyl, silyl-substituted hydrocarbyl, hydrocarbylsiloxy-substituted hydrocarbyl, hydrocarbylsilylamino-substituted hydrocarbyl, di(hydrocarbyl)amino-substituted hydrocarbyl, hydrocarbyleneamino-substituted hydrocarbyl, di(hydrocarbyl)phosphino-substituted hydrocarbyl, hydrocarbylenephosphino-substituted hydrocarbyl, or hydrocarbylsulfido-substituted hydrocarbyl, said $R^{10}$ group having up to 40 atoms not counting hydrogen atoms, and optionally two or more of the foregoing adjacent $R^{10}$ groups may together form a divalent derivative thereby forming a saturated or unsaturated fused ring;

$X^a$ is a divalent moiety lacking in delocalized π-electrons, or such a moiety comprising one σ-bond and a neutral two electron pair able to form a coordinate-covalent bond to M, said X' comprising boron, or a member of Group 14 of the Periodic Table of the Elements, and also comprising nitrogen, phosphorus, sulfur or oxygen;

X is a monovalent anionic ligand group having up to 60 atoms exclusive of the class of ligands that are cyclic ligand groups bound to M through delocalized π-electrons or two X groups together are a divalent anionic ligand group;

Z independently each occurrence is a neutral ligating compound having up to 20 atoms;

x is 0, 1, 2, or 3; and z is 0 or 1.

Highly preferably T is $=N(CH_3)$, X is halo or hydrocarbyl, x is 2, X' is dimethylsilane, z is 0, and $R^{10}$ each occurrence is hydrogen, a hydrocarbyl, hydrocarbyloxy, dihydrocarbylamino, hydrocarbyleneamino, dihydrocarbylamino-substituted hydrocarbyl group, or hydrocarbyleneamino-substituted hydrocarbyl group of up to 20 atoms not counting hydrogen, and optionally two $R^{10}$ groups may be joined together.

Illustrative metal complexes of the foregoing formulas include the following compounds:

(t-butylamido)dimethyl-[6,7]benzo-[4,5:2',3'](1-methylisoindol)-(3H)-indene-2-yl)silanetitanium (II) 1,4-diphenyl-1,3-butadiene, (t-butylamido)dimethyl-[6,7]benzo-[4,5:2',3'](1-methylisoindol)-(3H)-indene-2-yl)silanetitanium (II) 1,3-pentadiene, (t-butylamido)dimethyl-[6,7]benzo-[4,5:2',3'](1-methylisoindol)-(3H)-indene-2-yl)silanetitanium (III) 2-(N,N-dimethylamino)benzyl, (t-butylamido)dimethyl-[6,7]benzo-[4,5:2',3'](1-methylisoindol)-(3H)-indene-2-yl)silanetitanium (IV) dichloride, (t-butylamido)dimethyl-[6,7]benzo-[4,5:2',3'](1-methylisoindol)-(3H)-indene-2-yl)silanetitanium (IV) dimethyl, (t-butylamido)dimethyl-[6,7]benzo-[4,5:2',3'](1-methylisoindol)-(3H)-indene-2-yl)silanetitanium (IV) dibenzyl, (t-butylamido)dimethyl-[6,7]benzo-[4,5:2',3'](1-methylisoindol)-(3H)-indene-2-yl)silanetitanium (IV) bis(trimethylsilyl), (cyclohexylamido)dimethyl-[6,7]benzo-[4,5:2',3'](1-methylisoindol)-(3H)-indene-2-yl)silanetitanium (II) 1,4-diphenyl-1,3-butadiene, (cyclohexylamido)dimethyl-[6,7]benzo-[4,5:2',3'](1-methylisoindol)-(3H)-indene-2-yl)silanetitanium (II) 1,3-pentadiene, (cyclohexylamido)dimethyl-[6,7]benzo-[4,5:2',3'](1-methylisoindol)-(3H)-indene-2-yl)silanetitanium (III) 2-(N,N-dimethylamino)benzyl, (cyclohexylamido)dimethyl-[6,7]benzo-[4,5:2',3'](1-methylisoindol)-(3H)-indene-2-yl)silanetitanium (IV) dichloride, (cyclohexylamido)dimethyl-[6,7]benzo-[4,5:2',3'](1-methylisoindol)-(3H)-indene-2-yl)silanetitanium (IV) dimethyl, (cyclohexylamido)dimethyl-[6,7]benzo-[4,5:2',3'](1-methyl isoindol)-(3H)-indene-2-yl)silanetitanium (IV) dibenzyl, (cyclohexylamido)dimethyl-[6,7]benzo-[4,5:2',3'](1-methylisoindol)-(3H)-indene-2-yl)silanetitanium (IV) bis(trimethylsilyl), (t-butylamido)di(p-methylphenyl)-[6,7]benzo-[4,5:2',3'](1-methylisoindol)-(3H)-indene-2-yl)silanetitanium (II) 1,4-diphenyl-1,3-butadiene, (t-butylamido)di(p-methylphenyl)-[6,7]benzo-[4,5:2',3'](1-methylisoindol)-(3H)-indene-2-yl)silanetitanium (II) 1,3-pentadiene, (t-butylamido)di(p-methylphenyl)-[6,7]benzo-[4,5:2',3'](1-methylisoindol)-(3H)-indene-2-yl)silanetitanium (III) 2-(N,N-dimethylamino)benzyl, (t-butylamido)di(p-methylphenyl)-[6,7]benzo-[4,5:2',3'](1-methylisoindol)-(3H)-indene-2-yl)silanetitanium (IV) dichloride, (t-butylamido)di(p-methylphenyl)-[6,7]benzo-[4,5:2',3'](1-methylisoindol)-(3H)-indene-2-yl)silanetitanium (IV) dimethyl, (t-butylamido)di(p-methylphenyl)-[6,7]benzo-[4,5:2',3'](1-methylisoindol)-(3H)-indene-2-yl)silanetitanium (IV) dibenzyl, (t-butylamido)di(p-methylphenyl)-[6,7]benzo-[4,5:2',3'](1-methylisoindol)-(3H)-indene-2-yl)silanetitanium (IV) bis(trimethylsilyl), (cyclohexylamido)di(p-methylphenyl)-[6,7]benzo-[4,5:2',3'](1-methylisoindol)-(3H)-indene-2-yl)silanetitanium (II) 1,4-diphenyl-1,3-butadiene, (cyclohexylamido)di(p-methylphenyl)-[6,7]benzo-[4,5:2',3'](1-methylisoindol)-(3H)-indene-2-yl)silanetitanium (II) 1,3-pentadiene, (cyclohexylamido)di(p-methylphenyl)-[6,7]benzo-[4,5:2',3'](1-methylisoindol)-(3H)-indene-2-yl)silanetitanium (III) 2-(N,N-dimethylamino)benzyl, (cyclohexylamido)di(p-methylphenyl)-[6,7]-benzo-[4,5:2',3'](1-methylisoindol)-(3H)-indene-2-yl)silanetitanium (IV) dichloride, (cyclohexylamido)di(p-methylphenyl)-[6,7]benzo-[4,5:2',3'](1-methylisoindol)-(3H)-indene-2-yl)silanetitanium (IV) dimethyl, (cyclohexylamido)di(p-methylphenyl)-[6,7]-benzo-[4,5:2',3'](1-methylisoindol)-(3H)-indene-2-yl)silanetitanium (IV) dibenzyl; and (cyclohexylamido)di(p-methylphenyl)-[6,7]benzo-[4,5:2',3'](1-methylisoindol)-(3H)-indene-2-yl)silanetitanium (IV) bis(trimethylsilyl).

Illustrative Group 4 metal complexes that may be employed in the practice of the present invention further include:

(tert-butylamido)(1,1-dimethyl-2,3,4,9,10-η-1,4,5,6,7,8-hexahydronaphthalenyl)dimethylsilanetitaniumdimethyl, (tert-butylamido)(1,1,2,3-tetramethyl-2,3,4,9,10-η-1,4,5,6,7,8-hexahydronaphthalenyl)dimethylsilanetitaniumdimethyl, (tert-butylamido)(tetramethyl-$\eta^5$-cyclopentadienyl)dimethylsilanetitanium dibenzyl, (tert-butylamido)(tetramethyl-$\eta^5$-cyclopentadienyl)dimethylsilanetitanium dimethyl, (tert-butylamido)(tetramethyl-$\eta^5$-cyclopentadienyl)-1,2-ethanediyltitanium dimethyl, (tert-butylamido)(tetramethyl-$\eta^5$-indenyl)dimethylsilanetitanium dimethyl, (tert-butylamido)(tetramethyl-$\eta^5$-cyclopentadienyl)dimethylsilane titanium (III) 2-(dimethylamino)benzyl;

(tert-butylamido)(tetramethyl-$\eta^5$-cyclopentadienyl)dimethylsilanetitanium (III) allyl, (tert-butylamido)(tetramethyl-$\eta^5$-cyclopentadienyl)dimethylsilanetitanium (III) 2,4-dimethylpentadienyl, (tert-butylamido)(tetramethyl-$\eta^5$-cyclopentadienyl)dimethylsilanetitanium (II) 1,4-diphenyl-1,3-butadiene, (tert-butylamido)(tetramethyl-$\eta^5$-cyclopentadienyl)dimethylsilanetitanium (II) 1,3-pentadiene, (tert-butylamido)(2-methylindenyl)dimethylsilanetitanium (II) 1,4-diphenyl-1,3-butadiene, (tert-butylamido)(2-methylindenyl)dimethylsilanetitanium 2,4-hexadiene, (tert-butylamido)(2-methylindenyl)dimethylsilanetitanium (IV) 2,3-dimethyl-1,3-butadiene, (tert-butylamido)(2-methylindenyl)dimethylsilanetitanium (IV) isoprene, (tert-butylamido)(2-methylindenyl)dimethylsilanetitanium (IV) 1,3-butadiene, (tert-butylamido)(2,3-dimethylindenyl)dimethylsilanetitanium (IV) 2,3-dimethyl-1,3-butadiene, (tert-butylamido)(2,3-dimethylindenyl)dimethylsilanetitanium (IV) isoprene (tert-butylamido)(2,3-dimethylindenyl)dimethylsilanetitanium (IV) dimethyl (tert-butylamido)(2,3-dimethylindenyl)dimethylsilanetitanium (IV) dibenzyl (tert-butylamido)(2,3-dimethylindenyl)dimethylsilanetitanium (IV) 1,3-butadiene, (tert-butylamido)(2,3-dimethylindenyl)dimethylsilanetitanium (II) 1,3-pentadiene,
(tert-butylamido)(2,3-dimethylindenyl)dimethylsilanetitanium (II) 1,4-diphenyl-1,3-butadiene,
(tert-butylamido)(2-methylindenyl)dimethylsilanetitanium (II) 1,3-pentadiene,
(tert-butylamido)(2-methylindenyl)dimethylsilanetitanium (IV) dimethyl,
(tert-butylamido)(2-methylindenyl)dimethylsilanetitanium (IV) dibenzyl,
(tert-butylamido)(2-methyl-4-phenylindenyl)dimethylsilanetitanium (II) 1,4-diphenyl-1,3-butadiene,
(tert-butylamido)(2-methyl-4-phenylindenyl)dimethylsilanetitanium (II) 1,3-pentadiene,
(tert-butylamido)(2-methyl-4-phenylindenyl)dimethylsilanetitanium (II) 2,4-hexadiene,
(tert-butylamido)(tetramethyl-$\eta^5$-cyclopentadienyl)dimethyl-silanetitanium (IV) 1,3-butadiene,
(tert-butylamido)(tetramethyl-$\eta^5$-cyclopentadienyl)dimethylsilanetitanium (IV) 2,3-dimethyl-1,3-butadiene,
(tert-butylamido)(tetramethyl-$\eta^5$-cyclopentadienyl)dimethylsilanetitanium (IV) isoprene,
(tert-butylamido)(tetramethyl-$\eta^5$-cyclopentadienyl)dimethyl-silanetitanium (II) 1,4-dibenzyl-1,3-butadiene,
(tert-butylamido)(tetramethyl-$\eta^5$-cyclopentadienyl)dimethylsilanetitanium (II) 2,4-hexadiene,
(tert-butylamido)(tetramethyl-$\eta^5$-cyclopentadienyl)dimethyl-silanetitanium (II) 3-methyl-1,3-pentadiene,
(tert-butylamido)(2,4-dimethylpentadien-3-yl)dimethylsilanetitaniumdimethyl,
(tert-butylamido)(6,6-dimethylcyclohexadienyl)dimethylsilanetitaniumdimethyl,
(tert-butylamido)(1,1-dimethyl-2,3,4,9,10-$\eta$-1,4,5,6,7,8-hexahydronaphthalen-4-yl)dimethylsilanetitaniumdimethyl,
(tert-butylamido)(1,1,2,3-tetramethyl-2,3,4,9,10-$\eta$-1,4,5,6,7,8-hexahydronaphthalen-4-yl)dimethylsilanetitaniumdimethyl
(tert-butylamido)(tetramethyl-$\eta^5$-cyclopentadienyl methylphenylsilanetitanium (IV) dimethyl,
(tert-butylamido)(tetramethyl-$\eta^5$-cyclopentadienyl methylphenylsilanetitanium (II) 1,4-diphenyl-1,3-butadiene,
1-(tert-butylamido)-2-(tetramethyl-$\eta^5$-cyclopentadienyl) ethanediyltitanium (N) dimethyl, and
1-(tert-butylamido)-2-(tetramethyl-$\eta^5$-cyclopentadienyl) ethanediyl-titanium (II) 1,4-diphenyl-1,3-butadiene.

Other delocalized, π-bonded complexes, especially those containing other Group 4 metals, will, of course, be apparent to those skilled in the art, and are disclosed among other places in: WO 03/78480, WO 03/78483, WO 02/92610, WO 02/02577, US 2003/0004286 and U.S. Pat. Nos. 6,515,155, 6,555,634, 6,150,297, 6,034,022, 6,268,444, 6,015,868, 5,866,704, and 5,470,993.

Additional examples of metal complexes that are usefully employed are metal complexes of polyvalent Lewis bases, such as compounds of the formulas:

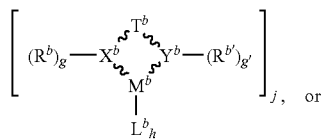

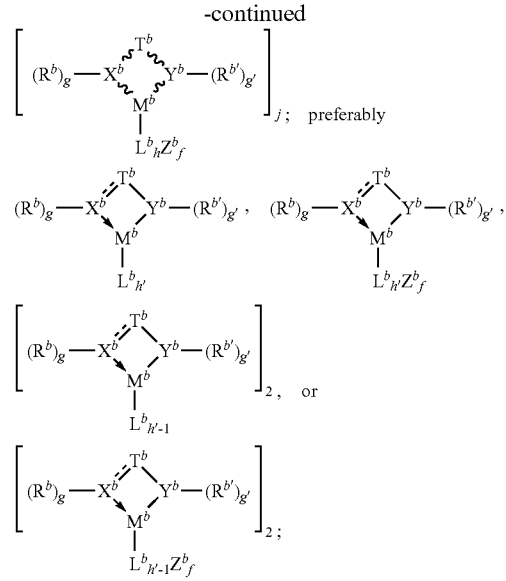

wherein $T^b$ is a bridging group, preferably containing 2 or more atoms other than hydrogen, $X^b$ and $Y^b$ are each independently selected from the group consisting of nitrogen, sulfur, oxygen and phosphorus; more preferably both $X^b$ and $Y^b$ are nitrogen, $R^b$ and $R^{b\prime}$ independently each occurrence are hydrogen or $C_{1-50}$ hydrocarbyl groups optionally containing one or more heteroatoms or inertly substituted derivative thereof. Non-limiting examples of suitable $R^b$ and $R^{b\prime}$ groups include alkyl, alkenyl, aryl, aralkyl, (poly)alkylaryl and cycloalkyl groups, as well as nitrogen, phosphorus, oxygen and halogen substituted derivatives thereof. Specific examples of suitable $R^b$ and $R^{b\prime}$ groups include methyl, ethyl, isopropyl, octyl, phenyl, 2,6-dimethylphenyl, 2,6-di(isopropyl)phenyl, 2,4,6-trimethylphenyl, pentafluorophenyl, 3,5-trifluoromethylphenyl, and benzyl;

g is 0 or 1;

$M^b$ is a metallic element selected from Groups 3 to 15, or the Lanthanide series of the Periodic Table of the Elements. Preferably, $M^b$ is a Group 3-13 metal, more preferably $M^b$ is a Group 4-10 metal;

$L^b$ is a monovalent, divalent, or trivalent anionic ligand containing from 1 to 50 atoms, not counting hydrogen. Examples of suitable $L^b$ groups include halide; hydride; hydrocarbyl, hydrocarbyloxy; di(hydrocarbyl)amido, hydrocarbyleneamido, di(hydrocarbyl)phosphido; hydrocarbylsulfido; hydrocarbyloxy, tri(hydrocarbylsilyl)alkyl; and carboxylates. More preferred $L^b$ groups are $C_{1-20}$ alkyl, $C_{7-20}$ aralkyl, and chloride;

h is an integer from 1 to 6, preferably from 1 to 4, more preferably from 1 to 3, and j is 1 or 2, with the value h x j selected to provide charge balance;

$Z^b$ is a neutral ligand group coordinated to $M^b$, and containing up to 50 atoms not counting hydrogen Preferred $Z^b$ groups include aliphatic and aromatic amines, phosphines, and ethers, alkenes, alkadienes, and inertly substituted derivatives thereof. Suitable inert substituents include halogen, alkoxy, aryloxy, alkoxycarbonyl, aryloxycarbonyl, di(hydrocarbyl)amine, tri(hydrocarbyl)silyl, and nitrile groups. Preferred $Z^b$ groups include triphenylphosphine, tetrahydrofuran, pyridine, and 1,4-diphenylbutadiene;

f is an integer from 1 to 3;

two or three of $T^b$, $R^b$ and $R^{b\prime}$ may be joined together to form a single or multiple ring structure;

h is an integer from 1 to 6, preferably from 1 to 4, more preferably from 1 to 3;

∼∼∼ indicates any form of electronic interaction, especially coordinate or covalent bonds, including multiple bonds, arrows signify coordinate bonds, and dotted lines indicate optional double bonds.

In one embodiment, it is preferred that $R^b$ have relatively low steric hindrance with respect to $X^b$. In this embodiment, most preferred $R^b$ groups are straight chain alkyl groups, straight chain alkenyl groups, branched chain alkyl groups wherein the closest branching point is at least 3 atoms removed from $X^b$, and halo, dihydrocarbylamino, alkoxy or trihydrocarbylsilyl substituted derivatives thereof. Highly preferred $R^b$ groups in this embodiment are $C_{1-8}$ straight chain alkyl groups.

At the same time, in this embodiment $R^{b'}$ preferably has relatively high steric hindrance with respect to $Y^b$. Non-limiting examples of suitable $R^{b'}$ groups for this embodiment include alkyl or alkenyl groups containing one or more secondary or tertiary carbon centers, cycloalkyl, aryl, alkaryl, aliphatic or aromatic heterocyclic groups, organic or inorganic oligomeric, polymeric or cyclic groups, and halo, dihydrocarbylamino, alkoxy or trihydrocarbylsilyl substituted derivatives thereof. Preferred $R^{b'}$ groups in this embodiment contain from 3 to 40, more preferably from 3 to 30, and most preferably from 4 to 20 atoms not counting hydrogen and are branched or cyclic.

Examples of preferred $T^b$ groups are structures corresponding to the following formulas:

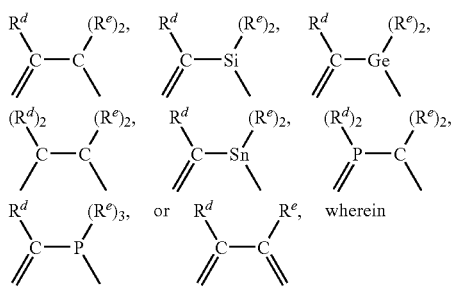

Each $R^d$ is $C_{1-10}$ hydrocarbyl group, preferably methyl, ethyl, n-propyl, i-propyl, t-butyl, phenyl, 2,6-dimethylphenyl, benzyl, or tolyl. Each $R^e$ is $C_{1-10}$ hydrocarbyl, preferably methyl, ethyl, n-propyl, i-propyl, t-butyl, phenyl, 2,6-dimethylphenyl, benzyl, or tolyl. In addition, two or more $R^d$ or $R^e$ groups, or mixtures of Rd and Re groups may together form a polyvalent derivative of a hydrocarbyl group, such as, 1,4-butylene, 1,5-pentylene, or a multicyclic, fused ring, polyvalent hydrocarbyl- or heterohydrocarbyl-group, such as naphthalene-1,8-diyl.

Preferred examples of the foregoing polyvalent Lewis base complexes include:

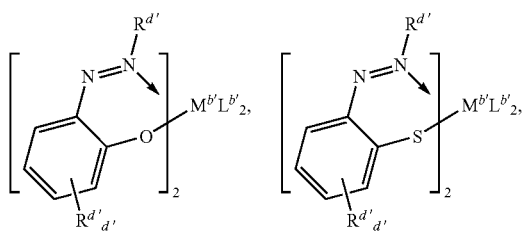

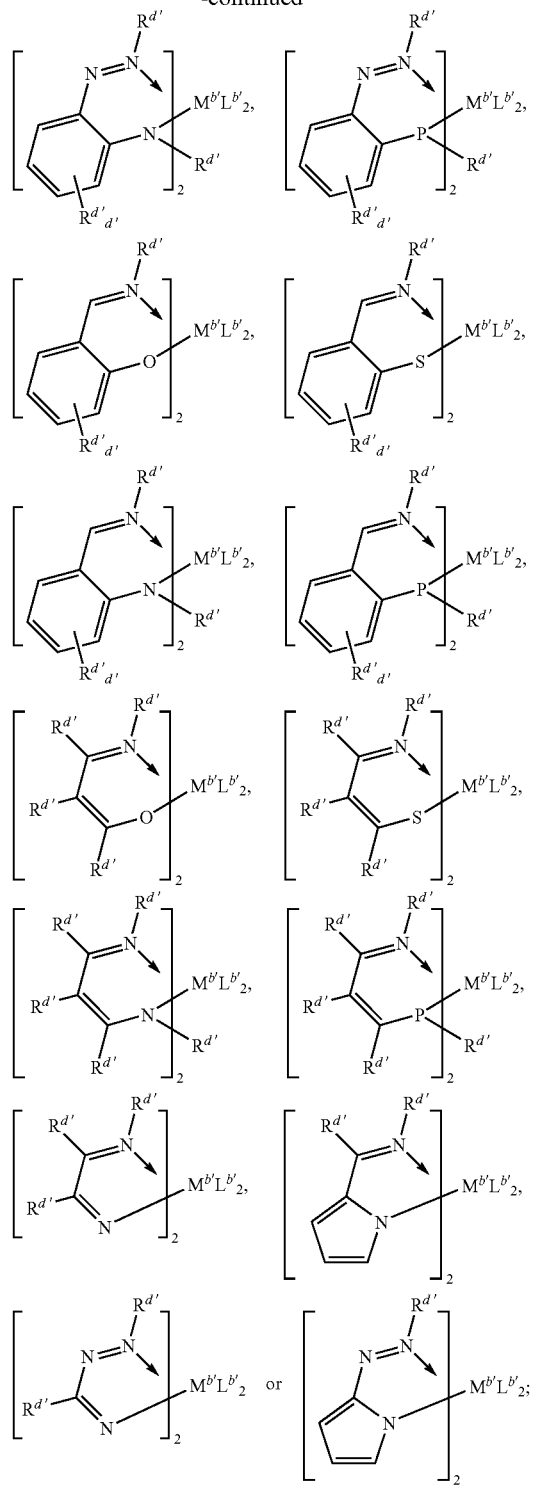

wherein $R^{d'}$ each occurrence is independently selected from the group consisting of hydrogen and $C_{1-50}$ hydrocarbyl groups optionally containing one or more heteroatoms, or inertly substituted derivative thereof, or further optionally, two adjacent $R^{d'}$ groups may together form a divalent bridging group;

d' is 4;

$M^{b'}$ is a Group 4 metal, preferably titanium or hafnium, or a Group 10 metal, preferably Ni or Pd;

$L^{b'}$ is a monovalent ligand of up to 50 atoms not counting hydrogen, preferably halide or hydrocarbyl, or two $L^{b'}$ groups together are a divalent or neutral ligand group, preferably a $C_{2-50}$ hydrocarbylene, hydrocarbadiyl or diene group.

The polyvalent Lewis base complexes additionally include Group 4 metal derivatives, especially hafnium derivatives of hydrocarbylamine substituted heteroaryl compounds corresponding to the formula:

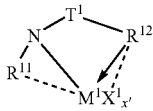

wherein:

$R^{11}$ is selected from alkyl, cycloalkyl, heteroalkyl, cycloheteroalkyl, aryl, and inertly substituted derivatives thereof containing from 1 to 30 atoms not counting hydrogen or a divalent derivative thereof;

$T^1$ is a divalent bridging group of from 1 to 41 atoms other than hydrogen, preferably 1 to 20 atoms other than hydrogen, and most preferably a mono- or di-$C_{1-20}$ hydrocarbyl substituted methylene or silane group; and $R^{12}$ is a $C_{5-20}$ heteroaryl group containing Lewis base functionality, especially a pyridin-2-yl- or substituted pyridin-2-yl group or a divalent derivative thereof;

$M^1$ is a Group 4 metal, preferably zirconium or hafnium;

$X^1$ is an anionic, neutral or dianionic ligand group;

x' is a number from 0 to 5 indicating the number of such $X^1$ groups; and bonds, optional bonds and electron donative interactions are represented by lines, dotted lines and arrows respectively.

Preferred complexes are those wherein ligand formation results from hydrogen elimination from the amine group and optionally from the loss of one or more additional groups, especially from $R^{12}$. In addition, electron donation from the Lewis base functionality, preferably an electron pair, provides additional stability to the metal center. Preferred metal complexes correspond to the formula:

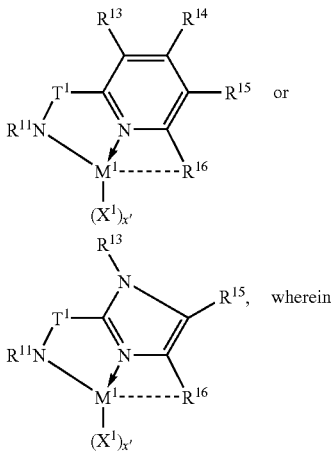

$M^1$, $X^1$, x', $R^{11}$ and $T^1$ are as previously defined, $R^{13}$, $R^{14}$, $R^{15}$ and $R^{16}$ are hydrogen, halo, or an alkyl, cycloalkyl, heteroalkyl, heterocycloalkyl, aryl, or silyl group of up to 20 atoms not counting hydrogen, or adjacent $R^{13}$, $R^{14}$, $R^{15}$ or $R^{16}$ groups may be joined together thereby forming fused ring derivatives, and bonds, optional bonds and electron pair donative interactions are represented by lines, dotted lines and arrows respectively.

More preferred examples of the foregoing metal complexes correspond to the formula:

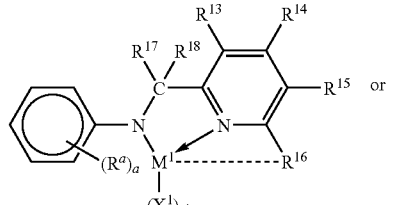

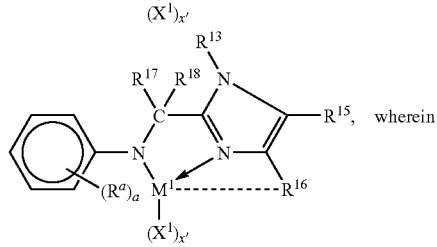

$M^1$, $X^1$, and x' are as previously defined, $R^{13}$, $R^{14}$, $R^{15}$, and $R^{16}$ are as previously defined, preferably $R^{13}$, $R^{14}$, and $R^{15}$ are hydrogen, or $C_{1-4}$ alkyl, and $R^{16}$ is $C_{6-20}$ aryl, most preferably naphthalenyl;

$R^a$ independently each occurrence is $C_{1-4}$ alkyl, and a is 1-5, most preferably $R^a$ in two ortho-positions to the nitrogen is isopropyl or t-butyl;

$R^{17}$ and $R^{18}$ independently each occurrence are hydrogen, halogen, or a $C_{1-20}$ alkyl or aryl group, most preferably one of $R^{17}$ and $R^{18}$ is hydrogen and the other is a $C_{6-20}$ aryl group, especially 2-isopropyl, phenyl or a fused polycyclic aryl group, most preferably an anthracenyl group, and bonds, optional bonds and electron pair donative interactions are represented by lines, dotted lines and arrows respectively.

Highly preferred metal complexes correspond to the formula:

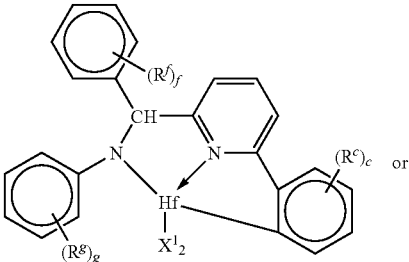

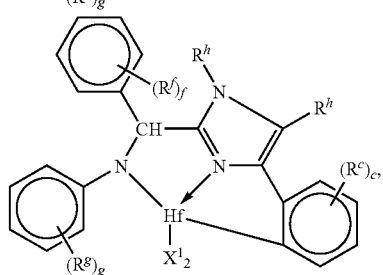

wherein $X^1$ each occurrence is halide, N,N-dimethylamido, or $C_{1-4}$ alkyl, and preferably each occurrence $X^1$ is methyl;

$R^c$, $R^f$ and $R^g$ independently each occurrence are halogen, $C_{1-20}$ alkyl, or $C_{6-20}$ aryl, or two adjacent $R^c$, $R^f$ or $R^g$ groups are joined together thereby forming a ring, c is and integer from 1 to 4, and f and g, independently is integers from 1-5; and $R^h$ independently each occurrence is hydrogen or $C_{1-6}$ alkyl.

Additional examples of metal complexes are complexes of the following formulas:

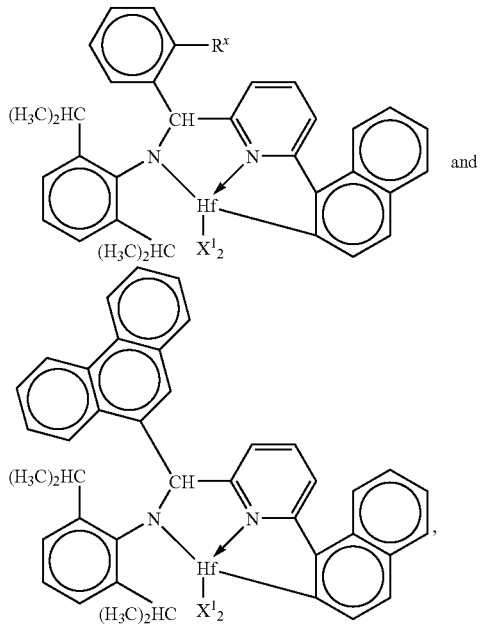

and wherein $R^x$ is $C_{1-4}$ alkyl or cycloalkyl, preferably methyl, isopropyl, t-butyl or cyclohexyl; and $X^1$ each occurrence is halide, N,N-dimethylamido, or $C_{1-4}$ alkyl, preferably methyl.

Examples of such metal complexes include:

[N-(2,6-di(1-methylethyl)phenyl)amido)(o-tolyl)(α-naphthalen-2-diyl(6-pyridin-2-diyl)methane)]hafnium dimethyl;

[N-(2,6-di(1-methylethyl)phenyl)amido)(o-tolyl)(α-naphthalen-2-diyl(6-pyridin-2-diyl)methane)]hafnium di(N,N-dimethylamido);

[N-(2,6-di(1-methylethyl)phenyl)amido) o-tolyl)(α-naphthalen-2-diyl(6-pyridin-2-diyl)methane)]hafnium dichloride;

[N-(2,6-di(1-methylethyl)phenyl)amido)(2-isopropylphenyl)(α-naphthalen-2-diyl(6-pyridin-2-diyl)methane)] hafnium dimethyl;

[N-(2,6-di(1-methylethyl)phenyl)amido)(2-isopropylphenyl)(α-naphthalen-2-diyl(6-pyridin-2-diyl)methane)] hafnium di(N,N-dimethylamido);

[N-(2,6-di(1-methylethyl)phenyl)amido)(2-isopropylphenyl)(α-naphthalen-2-diyl(6-pyridin-2-diyl)methane)] hafnium dichloride;

[N-(2,6-di(1-methylethyl)phenyl)amido)(phenanthren-5-yl)(α-naphthalen-2-diyl(6-pyridin-2-diyl)methane)]hafnium dimethyl;

[N-(2,6-di(1-methylethyl)phenyl)amido)(phenanthren-5-yl)(α-naphthalen-2-diyl(6-pyridin-2-diyl)methane)]hafnium di(N,N-dimethylamido);

[N-(2,6-di(1-methylethyl)phenyl)amido)(phenanthren-5-yl)(α-naphthalen-2-diyl(6-pyridin-2-diyl)methane)]hafnium dichloride;

[N-[2,6-bis(1-methylethyl)phenyl]-α[2-(1-methylethyl)phenyl]-6-(1,2-naphthalendiyl-κ-$C^2$)-2-pyridinemethanaminato (2-)-κ$N^1$, κ$N^2$]hafnium dimethyl,

[N-[2,6-bis(1-methylethyl)phenyl]-α[2-(1-methylethyl)phenyl]-6-(1,2-naphthalenyl-κ-$C^2$)-2-pyridinemethanaminato (2-)-κ$N^1$, κ$N^2$]hafnium di(n-butyl);

[N-[2,6-bis(1-methylethyl)phenyl]-α-[2,6-bis(1-methylethyl)phenyl]-6-(1,2-naphthalendiyl κ-$C^2$)-2-pyridinemethanaminato (2-)-κ$N^1$, κ$N^2$]hafnium dimethyl,

[N-[2,6-bis(1-methylethyl)phenyl]-α-[2,6-bis(1-methylethyl)phenyl]-6-(1,2-naphthalenyl-κ-$C^2$)-2-pyridinemethanaminato (2-)-κ$N^1$, κ$N^2$]hafnium di(n-butyl)

[N-[2,6-bis(1-methylethyl)phenyl]-α-[2,6-di(1-methylethyl)phenyl]-5-(2-ethylbenzofuran-3-yl-κ-$C^4$)-2-(N'-methyl)imidazol-2-yl)methanaminato (2-)-κ$N^1$, κ$N^2$] hafnium dimethyl,

[N-[2,6-bis(1-methylethyl)phenyl]-α-[2,6-di(1-methylethyl)phenyl]-5-(2-ethylbenzofuran-3-yl-κ-$C^4$)-2-(N'-methyl)imidazol-2-yl)methanaminato (2-)-κ$N^1$, κ$N^2$] hafnium di(n-butyl),

[N-[2,4,6-tris(1-methylethyl)phenyl]-α-[2,6-di(1-methylethyl)phenyl]-5-(2-ethylbenzofuran-3-yl-κ-$C^4$)-2-(N'-methyl)imidazol-2-yl)methanaminato (2-)κ$N^1$, κ$N^2$] hafnium di(methyl), and

[N-[2,4,6-tris(1-methylethyl)phenyl]-α-[2,6-bis(1-methylethyl)phenyl]-6-(1,2-naphthalenyl-κ-$C^2$)-2-pyridinemethanaminato (2-)-κ$N^1$, κ$N^2$]hafnium di(n-butyl).

Examples of suitable metal complexes of polyvalent Lewis bases include polyether compounds corresponding to the formula:

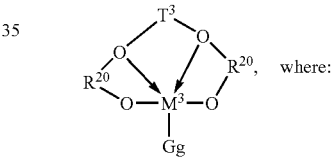 where:

$R^{20}$ is an aromatic or inertly substituted aromatic group containing from 5 to 20 atoms not counting hydrogen, or a polyvalent derivative thereof;

$T^3$ is a hydrocarbylene or silane group having from 1 to 20 atoms not counting hydrogen, or an inertly substituted derivative thereof;

$M^3$ is a Group 4 metal, preferably zirconium or hafnium;

G is an anionic, neutral or dianionic ligand group; preferably a halide, hydrocarbyl or dihydrocarbylamide group having up to 20 atoms not counting hydrogen;

g is a number from 1 to 5 indicating the number of such G groups; and bonds and electron donative interactions are represented by lines and arrows respectively.

Preferably, such complexes correspond to the formula:

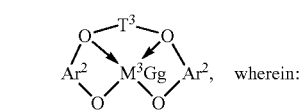 wherein:

$T^3$ is a divalent bridging group of from 2 to 20 atoms not counting hydrogen, preferably a substituted or unsubstituted, $C_{3-6}$ alkylene group; and $Ar^2$ independently each occurrence is an arylene or an alkyl- or aryl-substituted arylene group of from 6 to 20 atoms not counting hydrogen;

$M^3$ is a Group 4 metal, preferably hafnium or zirconium;

G independently each occurrence is an anionic, neutral or dianionic ligand group;

g is a number from 1 to 5 indicating the number of such X groups; and electron donative interactions are represented by arrows.

Examples of metal complexes of foregoing formula include the following compounds:

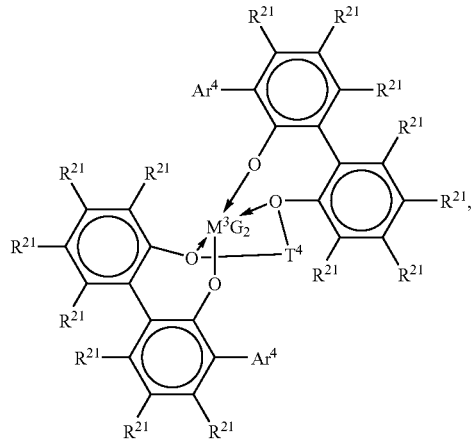

where $M^3$ is Hf or Zr;

$Ar^4$ is $C_{6-20}$ aryl or inertly substituted derivatives thereof, especially 3,5-di(isopropyl)phenyl, 3,5-di(isobutyl)phenyl, dibenzo-1H-pyrrole-1-yl, or anthracen-5-yl, and $T^4$ independently each occurrence comprises a $C_{3-6}$ alkylene group, a $C_{3-6}$ cycloalkylene group, or an inertly substituted derivative thereof;

$R^{21}$ independently each occurrence is hydrogen, halo, hydrocarbyl, trihydrocarbylsilyl, or trihydrocarbylsilylhydrocarbyl of up to 50 atoms not counting hydrogen; and G, independently each occurrence is halo or a hydrocarbyl or trihydrocarbylsilyl group of up to 20 atoms not counting hydrogen, or 2 G groups together are a divalent derivative of the foregoing hydrocarbyl or trihydrocarbylsilyl groups.

Especially preferred are compounds of the formula:

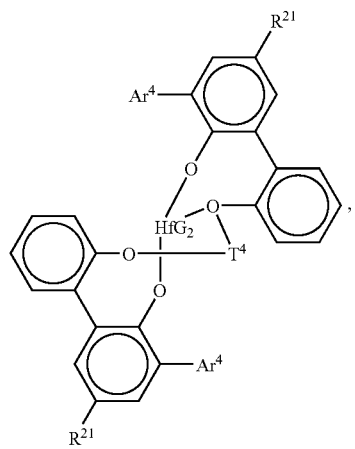

wherein $Ar^4$ is 3,5-di(isopropyl)phenyl, 3,5-di(isobutyl)phenyl, dibenzo-1H-pyrrole-1-yl, or anthracen-5-yl, $R^{21}$ is hydrogen, halo, or $C_{1-4}$ alkyl, especially methyl $T^4$ is propan-1,3-diyl or butan-1,4-diyl, and G is chloro, methyl or benzyl.

A most highly preferred metal complex of the foregoing formula is:

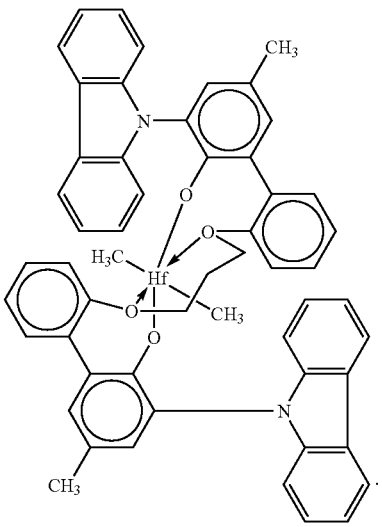

The foregoing polyvalent Lewis base complexes are conveniently prepared by standard metallation and ligand exchange procedures involving a source of the transition metal and the neutral polyfunctional ligand source. In addition, the complexes may also be prepared by means of an amide elimination and hydrocarbylation process starting from the corresponding Group 4 metal tetraamide and a hydrocarbylating agent, such as trimethylaluminum. Other techniques may be used as well. These complexes are known from the disclosures of, among others, U.S. Pat. Nos. 6,320,005, 6,103,657, WO 02/38628, WO 03/40195, and US04/0220050.

Cocatalysts for Unsaturated Polymer Reagent Synthesis

Generally the foregoing metal complexes are rendered active for olefin polymerization by contact with an activating cocatalyst. Suitable cocatalysts include those compounds previously known in the art for use with Group 4 metal olefin polymerization complexes. Examples of suitable activating cocatalysts include neutral Lewis acids, such as $C_{1-30}$ hydrocarbyl substituted Group 13 compounds, especially tri(hydrocarbyl)aluminum- or tri(hydrocarbyl)boron compounds and halogenated (including perhalogenated) derivatives thereof, having from 1 to 10 carbons in each hydrocarbyl or halogenated hydrocarbyl group, more especially perfluorinated tri(aryl)boron compounds, and most especially tris(pentafluorophenyl)borane; nonpolymeric, compatible, non-coordinating, ion forming compounds (including the use of such compounds under oxidizing conditions), especially the use of ammonium-, phosphonium-, oxonium-, carbonium-, silylium- or sulfonium-salts of compatible, noncoordinating anions, or ferrocenium-, lead- or silver salts of compatible, noncoordinating anions; and combinations of the foregoing cation forming cocatalysts and techniques. The foregoing activating cocatalysts and activating techniques have been previously taught with respect to different metal complexes for olefin polymerizations in the following references: EP-A-277,003, U.S. Pat. No. 5,153,157, U.S. Pat. No. 5,064,802, U.S. Pat. No. 5,321,106, U.S. Pat. No. 5,721,185, U.S. Pat. No. 5,350,723, U.S. Pat. No. 5,425,872, U.S. Pat. No. 5,625,087, U.S. Pat. No. 5,883,204, U.S. Pat. No. 5,919,983, U.S. Pat. No. 5,783,512, WO 99/15534, and WO99/42467.

Combinations of neutral Lewis acids, especially the combination of a trialkyl aluminum compound having from 1 to 4 carbons in each alkyl group and a halogenated tri(hydrocarbyl)boron compound having from 1 to 20 carbons in each hydrocarbyl group, especially tris(pentafluorophenyl)borane, further combinations of such neutral Lewis acid mixtures with a polymeric or oligomeric alumoxane, and combinations of a single neutral Lewis acid, especially tris (pentafluorophenyl)borane with a polymeric or oligomeric alumoxane may be used as activating cocatalysts. Preferred molar ratios of metal complex:tris(pentafluorophenyl-borane:alumoxane are from 1:1:1 to 1:5:20, more preferably from 1:1:1.5 to 1:5:10.

Suitable cation forming compounds useful as cocatalysts in one embodiment of the present invention comprise a cation which is a Bronsted acid capable of donating a proton and a compatible, noncoordinating anion, $A^-$. As used herein, the term "noncoordinating" means an anion or substance which either does not coordinate to the Group 4 metal containing precursor complex and the catalytic derivative derived there from, or which is only weakly coordinated to such complexes thereby remaining sufficiently labile to be displaced by a neutral Lewis base. A noncoordinating anion specifically refers to an anion which when functioning as a charge balancing anion in a cationic metal complex does not transfer an anionic substituent or fragment thereof to said cation thereby forming neutral complexes. "Compatible anions" are anions which are not degraded to neutrality when the initially formed complex decomposes and are noninterfering with desired subsequent polymerization or other uses of the complex.

Preferred anions are those containing a single coordination complex comprising a charge-bearing metal or metalloid core which anion is capable of balancing the charge of the active catalyst species (the metal cation) which may be formed when the two components are combined. Also, said anion should be sufficiently labile to be displaced by olefinic, diolefinic and acetylenically unsaturated compounds or other neutral Lewis bases such as ethers or nitriles. Suitable metals include, but are not limited to, aluminum, gold and platinum. Suitable metalloids include, but are not limited to, boron, phosphorus, and silicon. Compounds containing anions which comprise coordination complexes containing a single metal or metalloid atom are, of course, well known and many, particularly such compounds containing a single boron atom in the anion portion, are available commercially.

Preferably such cocatalysts may be represented by the following general formula:

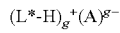

wherein:
L* is a neutral Lewis base;
(L*-H)⁺ is a conjugate Bronsted acid of L*;
$A^{g-}$ is a noncoordinating, compatible anion having a charge of g−, and
g is an integer from 1 to 3.

More preferably $A^{g-}$ corresponds to the formula: $[M'Q_4]^-$;
wherein:
M' is boron or aluminum in the +3 formal oxidation state; and
Q independently each occurrence is selected from hydride, dialkylamido, halide, hydrocarbyl, hydrocarbyloxide, halosubstituted-hydrocarbyl, halosubstituted hydrocarbyloxy, and halo-substituted silylhydrocarbyl radicals (including perhalogenated hydrocarbyl-perhalogenated hydrocarbyloxy- and perhalogenated silylhydrocarbyl radicals), said Q having up to 20 carbons with the proviso that in not more than one occurrence is Q halide. Examples of suitable hydrocarbyloxide Q groups are disclosed in U.S. Pat. No. 5,296,433.

In a more preferred embodiment, d is one, that is, the counter ion has a single negative charge and is $A^-$. Activating cocatalysts comprising boron which are particularly useful in addition polymerizations may be represented by the following general formula:

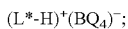

wherein:
L* is as previously defined;
B is boron in a formal oxidation state of 3; and
Q is a hydrocarbyl-, hydrocarbyloxy-, fluorinated hydrocarbyl-, fluorinated hydrocarbyloxy-, or fluorinated silylhydrocarbyl-group of up to 20 nonhydrogen atoms, with the proviso that in not more than one occasion is Q hydrocarbyl.

Preferred Lewis base salts are ammonium salts, more preferably trialkylammonium salts containing one or more $C_{12-40}$ alkyl groups. Most preferably, Q is each occurrence a fluorinated aryl group, especially, a pentafluorophenyl group.

Illustrative, but not limiting, examples of boron compounds which may be used as an activating cocatalyst in addition polymerizations are tri-substituted ammonium salts such as:

trimethylammonium tetrakis(pentafluorophenyl) borate, triethylammonium tetrakis(pentafluorophenyl) borate, tripropylammonium tetrakis(pentafluorophenyl) borate, tri (n-butyl)ammonium tetrakis(pentafluorophenyl) borate, tri (sec-butyl)ammonium tetrakis(pentafluorophenyl) borate, N,N-dimethylanilinium tetrakis(pentafluorophenyl) borate, N,N-dimethylanilinium n-butyltris(pentafluorophenyl) borate, N,N-dimethylanilinium benzyltris(pentafluorophenyl) borate, N,N-dimethylanilinium tetrakis(4-(t-butyldimethylsilyl)-2,3,5,6-tetrafluorophenyl) borate, N,N-dimethylanilinium tetrakis(4-(tri isopropylsilyl)-2,3,5,6-tetrafluorophenyl) borate, N,N-dimethylanilinium pentafluorophenoxytris(pentafluorophenyl) borate, N,N-diethylanilinium tetrakis(pentafluorophenyl) borate, N,N-dimethyl-2,4,6-trimethylanilinium tetrakis(pentafluorophenyl) borate, dimethyloctadecylammonium tetrakis(pentafluorophenyl) borate, methyldioctadecylammonium tetrakis (pentafluorophenyl) borate, dialkyl ammonium salts such as:
di-(i-propyl)ammonium tetrakis(pentafluorophenyl) borate, methyloctadecylammonium tetrakis(pentafluorophenyl) borate, methyloctadodecylammonium tetrakis(pentafluorophenyl) borate, and dioctadecylammonium tetrakis (pentafluorophenyl) borate; tri-substituted phosphonium salts such as:

triphenylphosphonium tetrakis(pentafluorophenyl) borate, methyldioctadecylphosphonium tetrakis(pentafluorophenyl) borate, and tri(2,6-dimethylphenyl)phosphonium tetrakis (pentafluorophenyl) borate; di-substituted oxonium salts such as:

diphenyloxonium tetrakis(pentafluorophenyl) borate, di(o-tolyl)oxonium tetrakis(pentafluorophenyl) borate, and di(octadecyl)oxonium tetrakis(pentafluorophenyl) borate; di-substituted sulfonium salts such as:
di(o-tolyl)sulfonium tetrakis(pentafluorophenyl) borate, and methylcotadecylsulfonium tetrakis(pentafluorophenyl) borate.

Preferred (L*-H)⁺ cations are methyldioctadecylammonium cations, dimethyloctadecylammonium cations, and ammonium cations derived from mixtures of trialkyl amines containing one or 2 $C_{14-18}$ alkyl groups. A particularly preferred example of the latter compound is based on a commercially available long chain amine and is referred to as: bis(hydrogenated tallowalkyl)methylammonium tetrakis(pentafluorophenyl)borate.

Another suitable ion forming, activating cocatalyst comprises a salt of a cationic oxidizing agent and a noncoordinating, compatible anion represented by the formula:

$$(Ox^{h+})_g(A^{g-})_h,$$

wherein:
$Ox^{h+}$ is a cationic oxidizing agent having a charge of h+;
h is an integer from 1 to 3; and
$A^{g-}$ and g are as previously defined.

Examples of cationic oxidizing agents include: ferrocenium, hydrocarbyl-substituted ferrocenium, $Ag^{+}$ or $Pb^{+2}$. Preferred embodiments of $A^{g-}$ are those anions previously defined with respect to the Bronsted acid containing activating cocatalysts, especially tetrakis(pentafluorophenyl)borate.

Another suitable ion forming, activating cocatalyst comprises a compound which is a salt of a carbenium ion and a noncoordinating, compatible anion represented by the formula:

$$[C]^{+}A^{-}$$

wherein:
$[C]^{+}$ is a $C_{1-20}$ carbenium ion; and
$A^{-}$ is a noncoordinating, compatible anion having a charge of −1. A preferred carbenium ion is the trityl cation, that is triphenylmethylium.

A further suitable ion forming, activating cocatalyst comprises a compound which is a salt of a silylium ion and a noncoordinating, compatible anion represented by the formula:

$$(Q^{1}_{3}Si)^{+}A^{-}$$

wherein:
$Q^{1}$ is $C_{1-10}$ hydrocarbyl, and $A^{-}$ is as previously defined.

Preferred silylium salt activating cocatalysts are trimethylsilylium tetrakispentafluorophenylborate, triethylsilylium tetrakispentafluorophenylborate and ether substituted adducts thereof. Silylium salts have been previously generically disclosed in *J. Chem. Soc. Chem. Comm.*, 1993, 383-384, as well as Lambert, J. B., et al., *Organometallics*, 1994, 13, 2430-2443. The use of the above silylium salts as activating cocatalysts for addition polymerization catalysts is disclosed in U.S. Pat. No. 5,625,087.

Certain complexes of alcohols, mercaptans, silanols, and oximes with tris(pentafluorophenyl)borane are also effective catalyst activators. Such cocatalysts are disclosed in U.S. Pat. No. 5,296,433.

A class of cocatalysts comprising non-coordinating anions generically referred to as expanded anions, further disclosed in U.S. Pat. No. 6,395,671, may be suitably employed for olefin polymerizations. Generally, these cocatalysts (illustrated by those having imidazolide, substituted imidazolide, imidazolinide, substituted imidazolinide, benzimidazolide, or substituted benzimidazolide anions) may be depicted as follows:

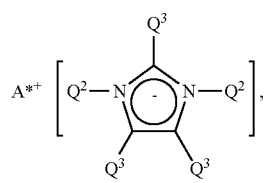

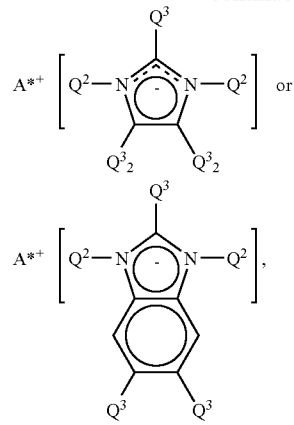

wherein:
$A^{*+}$ is a cation, especially a proton containing cation, and preferably is a trihydrocarbyl ammonium cation containing one or two $C_{10-40}$ alkyl groups, especially a methyldi($C_{14-20}$ alkyl)ammonium cation,
$Q^{3}$, independently each occurrence, is hydrogen or a halo, hydrocarbyl, halocarbyl, halohydrocarbyl, silylhydrocarbyl, or silyl, (including mono-, di- and tri(hydrocarbyl)silyl) group of up to 30 atoms not counting hydrogen, preferably $C_{1-20}$ alkyl, and
$Q^{2}$ is tris(pentafluorophenyl)borane or tris(pentafluorophenyl)alumane).

Examples of these catalyst activators include trihydrocarbylammonium-salts, especially, methyldi($C_{14-20}$ alkyl)ammonium-salts of:
bis(tris(pentafluorophenyl)borane)imidazolide, bis(tris(pentafluorophenyl)borane)-2-undecylimidazolide, bis(tris(pentafluorophenyl)borane)-2-heptadecyl imidazolide, bis(tris(pentafluorophenyl)borane)-4,5-bis(undecyl) imidazolide, bis(tris(pentafluorophenyl)borane)-4,5-bis(heptadecyl)imidazolide, bis(tris(pentafluorophenyl)borane) imidazolinide, bis(tris(pentafluorophenyl)borane)-2-undecylimidazolinide, bis(tris(pentafluorophenyl)borane)-2-heptadecyl imidazolinide, bis(tris(pentafluorophenyl)borane)-4,5-bis(undecyl)imidazolinide, bis(tris(pentafluorophenyl)borane)-4,5-bis(heptadecyl) imidazolinide, bis(tris(pentafluorophenyl)borane)-5,6-dimethylbenzimidazolide, bis(tris(pentafluorophenyl)borane)-5,6-bis(undecyl)benzimidazolide, bis(tris(pentafluorophenyl)alumane)imidazolide, bis(tris(pentafluorophenyl)alumane)-2-undecylimidazolide, bis(tris(pentafluorophenyl)alumane)-2-heptadecylimidazolide, bis(tris(pentafluorophenyl)alumane)-4,5-bis(undecyl) imidazolide, bis(tris(pentafluorophenyl)alumane)-4,5-bis(heptadecyl)imidazolide, bis(tris(pentafluorophenyl) alumane)imidazolinide, bis(tris(pentafluorophenyl) alumane)-2-undecylimidazolinide, bis(tris(pentafluorophenyl)alumane)-2-heptadecylimidazolinide, bis(tris(pentafluorophenyl)alumane)-4,5-bis(undecyl)imidazolinide, bis(tris(pentafluorophenyl)alumane)-4,5-bis(heptadecyl)imidazolinide, bis(tris(pentafluorophenyl)alumane)-5,6-dimethylbenzimidazolide, and bis(tris(pentafluorophenyl)alumane)-5,6-bis(undecyl) benzimidazolide.

Other activators include those described in PCT publication WO 98/07515 such as tris(2,2',2"-nonafluorobiphenyl)fluoroaluminate. Combinations of activators are also suitable, for example, alumoxanes and ionizing activators in combinations, see for example, EP-A-0 573120, PCT publications WO 94/07928 and WO 95/14044 and U.S. Pat. Nos. 5,153,157 and 5,453,410. WO 98/09996 describes activating catalyst compounds with perchlorates, periodates and iodates, including their hydrates. WO 99/18135 describes the use of organoboroaluminum activators. WO 03/10171 discloses catalyst activators that are adducts of Bronsted acids with Lewis acids. Other activators or methods for activating a catalyst compound are described in for example, U.S. Pat. Nos. 5,849,852, 5,859,653, 5,869,723, EP-A-615981, and PCT publication WO 98/32775.

As previously mentioned, suitable activating cocatalysts include polymeric or oligomeric alumoxanes, especially methylalumoxane (MAO), triisobutyl aluminum modified methylalumoxane (MMAO), or isobutylalumoxane; Lewis acid modified alumoxanes, especially perhalogenated tri(hydrocarbyl)aluminum- or perhalogenated tri(hydrocarbyl)boron modified alumoxanes, having from 1 to 10 carbons in each hydrocarbyl or halogenated hydrocarbyl group, and most especially tris(pentafluorophenyl)borane modified alumoxanes. Such cocatalysts are previously disclosed in U.S. Pat. Nos. 6,214,760, 6,160,146, 6,140,521, and 6,696,379.

The molar ratio of catalyst/cocatalyst employed preferably ranges from 1:10,000 to 100:1, more preferably from 1:5000 to 10:1, most preferably from 1:1000 to 1:1. Alumoxane, when used by itself as an activating cocatalyst, may be employed in lower quantity (<100:1) than the predominant catalyst literature, which is generally at least 100 times the quantity of metal complex on a molar basis, and more often around 1000 times this quantity. Tris(pentafluorophenyl)borane, where used as an activating cocatalyst is employed in a molar ratio to the metal complex of from 0.5:1 to 10:1, more preferably from 1:1 to 6:1 most preferably from 1:1 to 5:1. The remaining activating cocatalysts are generally employed in approximately equimolar quantity with the metal complex.

Metathesis Conditions

Once prepared, the unsaturated polymers are contacted with the metathesis catalyst under conditions to cause olefin cleavage and rearrangement of the cleavage products. The various catalyst compositions that have been found to be effective in promoting olefin metathesis reactions or ring-opening polymerizations of unsaturated alicyclic monomers are also effective catalyst compositions for promoting the processes of the present invention. These catalyst compositions may be either heterogeneous or homogeneous with the former having the advantage of being more readily removable from the reaction products while the latter are generally more efficient from the standpoint of catalytic activity.

Examples of suitable catalyst compositions include organic or inorganic derivatives of transition metals selected from Groups 5-10, preferably molybdenum, tantalum, tungsten, ruthenium, or rhenium, either in the form of solids, dispersions, suspensions, solutions, or neat. In the solid form, the catalyst or the individual components thereof may be supported on the surface of an inert carrier or support, such as a high surface area metal oxide, metalloid oxide, metal carbide, metal boride, metal nitride, zeolite or clay. Preferred compounds include ruthenium, molybdenum or tungsten compounds or complexes, especially halides, oxyhalides, tetraorganoammonium tungstates, tetraorganoammonium molybdenates, Lewis base derivatives thereof, and mixtures of the foregoing.

Examples of suitable homogeneous catalyst compositions employed in the practice of this invention include those previously disclosed in U.S. Pat. No. 4,010,224, especially compositions comprising: (A) at least one organometallic compound wherein the metal is selected from Groups 1, 2, 12 or 13 of the Periodic Table of Elements, (B) at least one metal derivative wherein the metal is selected from the group consisting of metals of Groups 5, 6, or 7, especially molybdenum or tungsten and, optionally, (C) at least one chelating- or Lewis base-material. Examples of the latter compounds include ethers, carboxylic acid esters, ketones, aldehydes, carbonates, nitriles, alcohols, thiols, water, and mixtures thereof.

Representative examples of organometallic compounds from which component (A) may be selected include lithium, sodium, potassium, rubidium, cesium, beryllium, magnesium, calcium, strontium, barium, zinc, cadmium, aluminum, gallium, indium, and thallium compounds, with lithium, sodium, magnesium, aluminum, zinc and cadmium compounds being preferred and with aluminum compounds being most preferred.

Representative examples of organometallic compounds useful as catalyst component (A) are organoaluminum compounds having at least one aluminum-to-carbon bond. Representative of such compounds are tri($C_{1-10}$)hydrocarbylaluminum compounds such as trimethylaluminum, triethylaluminum, tri-n-propylaluminum, tri-n-butylaluminum, triisopropylaluminum, triisobutylaluminum, trihexylaluminum, trioctylaluminum, tritolylaluminum, tribenzylaluminum, and triphenylaluminum; organoaluminum halides such as diethylaluminum chloride, di-n-propylaluminum chloride, diisobutylaluminum chloride, diethylaluminum bromide, diethylaluminum iodide and diethylaluminum fluoride, ethylaluminum dichloride, ethylaluminum sesquichloride, ethylaluminum dibromide, propylaluminum dichloride, isobutylaluminum dichloride, ethylaluminum diiodide, phenylaluminum dibromide, tolylaluminum dibromide, benzylaluminum dibromide, phenylaluminum diiodide, tolylaluminum diiodide, benzylaluminum diiodide, diphenylaluminum chloride, ditolylalumium chloride, and dibenzylaluminum bromide; organoaluminum hydride compounds such as diphenylaluminum hydride and phenylaluminum dihydride; and mixtures of the foregoing.

Additional suitable organometallic compounds are alkali metal compounds such as ethyl lithium, n-butyllithium, t-butyllithium, amylsodium, butylpotassium, phenylpotassium, phenylsodium, phenyl lithium, lithium-aluminum tetrabutyl, lithium-aluminum tetraethyl, lithium-aluminum triethyl chloride, and sodium aluminum tetraethyl; alkaline earth metal compounds such as diphenylmagnesium, diethylmagnesium, ethylmagnesium chloride, phenylmagnesium chloride, butylmagnesium bromide, butyl calcium chloride, and diethylbarium; Group 12 organometal compounds such as diethylzinc, diphenylzinc, ethylzinc chloride, diethylcadmium, and dibutyl-cadmium; phenylmagnesium bromide, butylmagnesium chloride, butylmagnesium bromide, and ethylmagnesium chloride; and mixtures of the foregoing compounds. Preferred compounds for use as component (A) are trialkylaluminums, dialkylaluminum halides, alkylaluminum dihalides and aluminumsesquihalides, containing up to 4 carbons in each alkyl group.

Suitable derivatives of molybdenum and tungsten useful as component (B) of the metathesis catalyst include the corresponding halides-, acetylacetonates-, sulphates-, phosphates-, nitrates-, and alcoholates. Examples include: chlorides, bromides, iodides and fluorides, such as molybdenum pentachloride, tungsten hexachloride, molybdenum pentabromide, tungsten hexabromide, molybdenum pentaiodide, molybdenum pentafluoride, molybdenum hexafluoride and tungsten hexafluoride. Other examples include molybdenum phosphate, tungsten phosphate, molybdenum nitrate, tungsten nitrate, molybdenum acetylacetonate, tungsten acetylacetonate, molybdenum sulphate, and tungsten sulphate. Mixtures of these compounds may also be employed. The tungsten- and molybdenum halides, representative of which are tungsten hexachloride and molybdenum pentachloride, are especially preferred.

Suitable compounds for use as component (C) of the catalyst composition are compounds of the general formula R—Y—H wherein Y is selected from the group of oxygen and sulfur and wherein R is hydrogen, or a hydrocarbyl or substituted hydrocarbyl group having up to 20 carbons total, and wherein the substituent(s) on the hydrocarbyl group are selected from the group consisting of hydroxy, thio, hydrocarbyloxy, hydrocarbylthio, oxy- and sulfo-. Examples include water, hydrogen sulfide, alkanols, aromatic alcohols, mercaptans, hydrocarbylperoxides, polyalcohols, polymercaptans, hydroxy mercaptans, alkanolethers, alkanolthioethers, mercaptoethers and mercaptothioethers. Representative examples of the materials for use as component (C) include alcohols such as methanol, ethanol, isopropanol, tertiarybutyl alcohol, amyl alcohol, benzyl alcohol, allyl alcohol, 1,1-dimethyl benzyl alcohol, phenol, tertiarybutyl catechol, cresol, alpha and beta naphthyl alcohol; mercaptans such as methyl-, ethyl-, propyl-, isopropyl-, butyl-, amyl- or allylmercaptan, thiophenol, 4-methylthiophenol, or 4-mercaptophenol; hydroperoxides, such as, cumyl hydroperoxide, tertiarybutyl hydroperoxide; hydrodisulfides such as cumyl hydrodisulfide, and s-butyl hydrodisulfide; polyalcohols, such as ethylene glycol, glycerol, polyethyleneglycol, catechol, resorcinol, hydroquinone, pyrogallol; polymercaptans, such as 1,3-propane dithiol, 1,4-dithiobenzene; and hydroxymercaptans, such as, 1-hydroxy-2-thioethane or 1-hydroxy-4-thiobenzene.

The quantity of component (C) employed in the foregoing catalyst composition is adjusted to control the activity of the catalyst composition. Generally, the catalyst composition exhibits higher activity when the quantity of component (C) employed is relatively small, including none.

Generally the quantities of the respective catalyst components are adjusted to be within a molar ratio of (B)/(C) ranging from 0.3/1 to 20/1 and the molar ratio of (A)/(B) is within the range of 0.5/1 to 15/1. More preferred ratios of (B)/(C) are from 0.5/1 to 5/1 and (A)/(B) from 0.5/1 to 8/1. Still more preferred ratios of (B)/(C) are 1/1 to 2/1 and (A)/(B) are 0.75/1 to 5/1.

The foregoing catalyst compositions may be prepared by mixing the components by known techniques, either prior to combination with the olefin containing polymer or "in situ". By the "preformed" method the catalyst components are mixed together prior to exposure of any of the catalyst components to the olefin containing polymer to be used in the process of this invention. In the "in situ" method the catalyst components are added separately to the reaction mixture containing the unsaturated polymer to be subjected to metathesis. The catalyst components may be mixed either as pure compounds or as suspensions or solutions in liquids which do not adversely affect the catalyst activity of the olefin metathesis reaction. Representative of such liquids are saturated hydrocarbons such as hexane, pentane, benzene, toluene or mixtures thereof.

The order of addition of the three catalyst components to each other may be varied. All of the following practices may suitably be employed:
 1. simultaneous addition of components (A), (B) and (C);
 2. sequential addition of components (A), (B) and (C) in any order;
 3. contacting of any two components, optionally with recovery or purification of the reaction product, followed by addition of the binary product to the remaining component; or
 4. contacting of mixtures of any two components with subsequent contact of the resulting binary mixtures or reaction products, whether purified or unpurified.

In one preferred embodiment, the catalyst composition comprises at least one organoaluminum halide and at least one tungsten derivative. Preferred organoaluminum halides are dialkylaluminum chloride, di-n-propylaluminum chloride, diisobutylolaluminum chloride, diethylaluminum bromide, diethylaluminum iodide, diethylaluminum fluoride, ethylaluminum sesquichloride, ethylaluminum sesquibromide, ethylaluminum dichloride, ethylaluminum dibromide, propylaluminum dichloride, isobutylaluminum dichloride, ethylaluminum diiodide, phenylaluminum dibromide, tolylaluminum dibromide, benzylaluminum dibromide, phenylaluminum diiodide, tolylaluminum diiodide, benzylaluminum diiodide, diphenylaluminum chloride, ditolylaluminum chloride, dibenzylaluminum bromide, and mixtures of the foregoing.

Preferred tungsten derivatives include halides-, sulfates-, phosphates-, nitrates- and carboxylates- of tungsten in the +4 or +6 oxidation state, preferably tungsten hexachloride, tungsten hexabromide, tungsten hexaiodide, tungsten hexafluoride, tungsten diphosphate, tungsten hexanitrate, tungsten triacetylacetonate, tungsten oxychloride, and tungsten trisulphate. A most preferred tungsten derivative is tungsten hexachloride.

The molar relationship between the two catalyst components in this embodiment are generally from 0.5/1 to 15/1, more preferably from 0.7/1 to 8/1, and a still more preferably from 0.8/1 to 5/1. The catalyst components may be reacted together as pure compounds or in solutions or suspensions in inert, aliphatic or aromatic liquids. Representative of such liquids are pentane, hexane, benzene, and toluene.

A third catalyst composition that is effective in promoting the present metathesis process comprises an aluminum trihalide and an organic or inorganic derivative of a Group 5, 6 or 7 compound, preferably a tungsten compound, especially those wherein the tungsten is in an oxidation state from 4 to 6. The preferred aluminum trihalides are aluminum trichloride or aluminum tribromide. Preferred tungsten compounds are tetra-, penta- and hexa-chlorides, bromides, and iodides, tungsten hexafluoride and the tungsten oxychlorides. Optionally an organometallic compound may be present in the catalyst composition as an aid in the suppression of gel formation and in order to increase polymerization rates at lower catalyst levels. Examples of suitable optional organometallic compounds include alkyl-, aryl-, and alkaryl derivatives of lithium, sodium, magnesium, calcium, strontium and barium; alkylhalide-, arylhalide-, and alkarylhalide derivatives of magnesium, calcium, strontium or barium and alkyl-, aryl- or alkaryl derivatives of Group 12 metals such as dialkyl- and diarylzinc, said alkyl, aryl or alkaryl group having up to 10 carbons.

Other classes of catalysts which are effective in promoting the polymerizations of this invention are those disclosed in U.S. Pat. No. 4,994,535, and generally include an organometal derivative of a Group 13-14 metal, especially organo- or organohalo-derivatives of aluminum or tin, preferably tetraalkyl tin, trialkyl aluminum and dialkylaluminum halides, containing up to 10 carbons in each alkyl group; at least one derivative of a Group 5, 6, or 7 metal, especially molybdenum or tungsten; and optionally, a chelating agent, such as a Lewis base.

Additional suitable metathesis catalysts for use in the present invention are ruthenium or osmium complexes such as those disclosed in U.S. Pat. Nos. 6,838,489, 6,818,586, 6,806,325, 6,624,265, 6,313,332, 5,977,393, 5,917,071, 5,710,298, 5,750,815, 5,728,917, 5,312,940, and 5,342,909. Examples of the foregoing metathesis catalysts include ruthenium and osmium carbene complexes possessing metal centers that are formally in the +2 oxidation state, have an electron count of 16, and are penta-coordinated. These complexes are of the general formula:

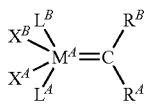

wherein:

$M^A$ is ruthenium or osmium;

$X^A$ and $X^B$ are the same or different anionic ligands, preferably chloride;

$L^A$ is a neutral electron donor ligand;

$L^B$ is a neutral electron donor ligand or a nitrogen containing heterocyclic carbene; and $R^A$ and $R^B$ are independently each occurrence hydrogen, or an alkyl, alkenyl, alkynyl, aryl, carboxylate, alkoxy, alkenyloxy, alkynyloxy, aryloxy, alkoxycarbonyl, alkylthio, alkylsulfonyl, alkylsulfinyl, or silyl group of up to 20 atoms not counting hydrogen, an alkyl, alkoxy, aryl, aralkyl, haloalkyl, haloalkoxy, haloaryl or haloalkaryl substituted derivative thereof; or a functionalized derivative of any of the foregoing wherein the functional group is hydroxyl, thiol, alcohol, sulfonic acid, phosphine, thioether, ketone, aldehyde, ester, ether, amine, imine, amide, imide, imido, nitro, carboxylic acid, disulfide, carbonate, isocyanate, carbodiimide, carboalkoxy, carbamate, acetal, ketal, boronate, cyano, cyanohydrin, hydrazine, oxime, hydrazide, enamine, sulfone, sulfide, sulfenyl, or halogen.

In a preferred embodiment, the metal complexes are ruthenium derivatives wherein $L^B$ is a tertiary phosphine, especially triphenylpsphine, and $L^A$ is either a tertiary phosphine or a nitrogen containing heterocyclic ligand, especially an imidazolidinyl- or triazolyl-ligand of the formula:

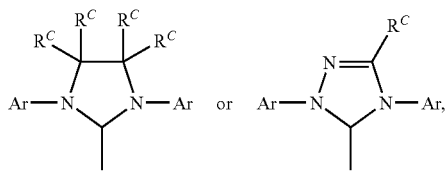

wherein Ar independently each occurrence is an aryl group, especially phenyl or 2,4,6-trimethylphenyl, and $R^C$ independently each occurrence is hydrogen or an anionic ligand group or multiple $R^C$ groups collectively may form one or more rings that are fused to the imidazolidine ring.

The inclusion of an imidazolidinyl or triazoyl ligand to the previously described ruthenium or osmium catalysts improves the properties of the complexes in olefin metathesis processes. In particular, the catalysts maintain the general functional group tolerance towards olefins of ruthenium-phosphine complexes while possessing enhanced metathesis activity comparable to tungsten- and molybdenum-salt ternary compositions. Such catalysts (referred to as Grubbs II catalysts) are particularly desired for metathesis of polar group containing polymers.

The operating conditions which are employed in the processes of this invention may vary. The reactions can be conveniently carried out in a liquid form, including in a melt, or even in the solid phase, such as the previously disclosed surface depolymerizing system. Thus, when a polymeric material is employed in any particular reaction, it is possible to carry out the reaction in solution, in a melt or as a "swollen" solid, employing solvent to enter the polymer matrix and/or partially dissolve the polymer or the depolymerized reaction products from the metathesis. Solvents which can be used when solution conditions are employed include any inert liquid that dissolves or swells the polymers employed. Convenient solvents are aliphatic, aromatic or cycloaliphatic hydrocarbons which do not themselves inhibit or interfere with the metathesis reaction, such as pentane, hexane, benzene, toluene, and cyclohexane. When one or more of the olefin reactants is a liquid, the reaction can be conducted in bulk, that is, in the absence of a separately added solvent.

A small quantity of ethylene may be included in the reaction mixture, as is known in the art, for purposes of reducing the molecular weight of one or more of the ethylenically unsaturated monomers prior to metathesis. Generally, the quantity of ethylene employed is from 0.5 to 10 moles, preferably from 0.5 to 2 moles, per mole of metathesis catalyst.

The amount of metathesis catalyst employed in the reactions of this invention may be varied over wide concentrations and has not been found to be critical. The optimum amount of catalyst composition employed depends upon a number of factors such as temperature, purity of reactants, and the desired reaction time. The catalyst is desirably employed in an amount (based on weight of transition metal component) from 0.01 to 1 percent based on weight of unsaturated polymer.

Metathesis process conditions may vary widely over any operable conditions suitable for preparing the polymer compositions of this invention. Any temperature below the decomposition temperatures of the reactant polymers, product polymer(s), and metathesis catalyst, and preferably below the normal boiling point of any solvent or diluent, if used, is generally suitable. When the metathesis is conducted in a neat polymer melt, the process temperature may broadly range from about 100° C. up to about 350° C., depending upon the decomposition temperatures as noted hereinbefore. Generally, a temperature of about 20° C. to 50° C. above the polymer melt or glass transition temperature is preferred. When the metathesis is conducted with the reactant polymers dissolved in a liquid diluent or solvent, the temperature may typically range from about 25° C. up to about 150° C. Preferred temperatures for use with the preferred Grubbs catalysts range from about 35° C. up to about 100° C., more preferably, up to about 85° C. Typically, a process pressure of about 1 atmosphere is suitable, but higher and lower pressures may be employed if desired. Metathesis processes reach an equilibrium, thus conversion of the reactant polymers is typically incomplete. Samples may be taken from the reaction mixture and analyzed via CRYSTAF or ATREF, for example, to determine when the equilibrium conversion is reached. The metathesis reaction can be stopped at any time prior to reaching equilibrium conversion to obtain different distributions of product polymers.

Once the metathesis has proceeded to the extent desired, the catalyst may be inactivated, and if desired, the resulting polymer may be hydrogenated to remove residual unsaturation fully or partially. Suitable methods of inactivating the metathesis catalyst include reaction with water; an alcohol; a carboxylic acid, or a metal salt or ester derivative thereof; or carbon monoxide. The resulting catalyst residue may be removed from the polymer by filtration, solvent extraction, or other suitable technique, or may be left in the polymer. Suitable hydrogenation catalysts include those previously known in the art, especially noble metal catalysts such as platinum or palladium containing compounds or complexes.

EXAMPLES

It is understood that the present invention is operable in the absence of any component which has not been specifically disclosed and may be combined with any other suitable reaction or process in a multistep system design. The following examples are provided in order to further illustrate the invention and are not to be construed as limiting. Unless stated to the contrary, all parts and percentages are expressed on a weight basis.

In the examples hereinafter, the term "Grubbs II catalyst" refers to a metathesis catalyst consisting of benzylidene[1,3-bis(2,4,6-trimethylphenyl)-2-imidazolidinylidene]dichloro(tricyclohexyl phosphine)ruthenium.

All metathesis reactions are conducted under an inert atmosphere of nitrogen gas.
Unsaturated Reagent Polymers In the following preparations, the unsaturation level of the reagent polymer is calculated from $^1$H NMR spectral data.
Polybutadiene (PBD)

(2 percent 1,2-vinyl, 98 percent cis 1,4-polymerization, approximate Mw=250,000 g/mol, available from Scientific Polymer Products). Ethylenic carbon content=42 percent.
Hydrogenated Polybutadiene (HPBD)

PBD is partially hydrogenated substantially according to the procedure described in *J. Polym. Sci. Polym. Chem.*, 1992, 30, 397-408. Accordingly, a 2 percent solution is prepared by dissolving PBD in o-xylene and heating to 95° C. followed by the addition of p-toluenesulfonyl hydrazide (TSH) and tri(n-propyl)amine TPA (1.1 moles per mole unsaturation for both TSH and TPA). After refluxing for 4 hours, the solution is cooled to room temperature and precipitated by addition to methanol. The dried filtered solid is re-precipitated by dissolving in warm toluene and adding to methanol. Hydrogenation level is 90 percent as determined by $^1$H NMR spectrographic analysis. Unsaturation level is 5.5 mole percent. $T_m$=109° C.
Hydrogenated Nitrile/Butadiene Rubber (HNBR)

A partially hydrogenated acrylonitrile/butadiene random copolymer (hydrogenation of ethylenic unsaturation approximately 90 percent), having acrylonitrile content of 33 percent and a Mooney-Viscosity UML (1+4)@100° C. of 61 (THERBAN™ 3467, available from Lanxess, Inc). Unsaturation level is 0.81 mole percent. Tg=−25° C.
Butadiene Copolymer Polymerizations Copolymerizations of ethylene or mixtures of ethylene and 1-octene with butadiene are conducted in a computer controlled 2 L Parr batch reactor, which is heated by an electrical heating mantle and cooled by an internal serpentine cooling coil with chilled water. The bottom of the reactor is fitted with a stainless steel ball valve which empties the reactor contents into a stainless steel vessel containing a toluene solution of a standard stabilizer and antioxidant. The polymer mixture is purged with nitrogen for 20 minutes after discharge into the collection vessel.

All chemicals and catalysts are manipulated in a nitrogen-filled drybox. The 1-octene, butadiene and mixed hexanes solvent (Isopar™ E, available from ExxonMobil Chemicals, Inc.) are purified by passage through alumna (8×14 A2 alumna, available from UOP Corporation) then a catalyst (Q5™ reactant, available from Engelhard Corporation). Ethylene is passed through a first column containing alumina (A204™ available from LaRouch, Inc.) followed by 0.4 nm molecular sieves and then through a second column containing Q5™ reactant. The nitrogen used for all transfers is passed through a single column containing A204 alumna, 0.4 nm molecular sieves and Q5™ reactant.

The reactor is charged from a shot tank containing a preweighed quantity of mixed alkanes and 1-octene (if used). The shot tank is filled to the desired level by use of a laboratory scale upon which the tank is mounted. Butadiene is loaded using a computer operated controller (Emerson Micro Motion™ controller). After solvent, butadiene and optional 1-octene addition, the reactor is heated to the polymerization temperature and ethylene is added to achieve the desired pressure of 3.4 MPa.

The catalyst ((t-butylamido)dimethyl(1H-cyclopenta[l]-phenanthrene-2-yl)silane titanium(IV) dimethyl, prepared according to U.S. Pat. No. 6,150,297), triethyl aluminum scavenger and activator (methyldi(octadecyl)ammonium tetrakis(pentafluorophenyl)borate) are combined in the stated order in toluene under nitrogen atmosphere. This mixture is drawn into a syringe and pressure transferred into the catalyst shot tank, followed by three 5 mL rinses of toluene. After charging the catalyst solution to the reactor, ethylene is supplied on demand at 3.4 MPa until the reaction is terminated.

Polymerizations are conducted for 10 minutes and then the reactor contents are discharged to the collection vessel. After purging with nitrogen, the polymer solution is poured into a tray and placed in a lab hood overnight to evaporate solvent. The trays are then transferred to a vacuum oven and heated at 145° C. under reduced pressure to remove any remaining solvent.

A poly(ethylene-co-butadiene) is so prepared having 2.1 mole percent unsaturation and a melting transition of 126° C.

A poly(ethylene-co-butadiene-co-octene) is so prepared having 0.38 mole percent internal unsaturation and a glass transition of −38° C.
Polyurethane A 24 percent solution is prepared by dissolving 13.77 grams 4,4'-methylenebis(phenyl isocyanate) (MDI), 5.33 grams 1,6-hexanediol (HDO) and 1.02 grams 2-butene-1,4-diol (BuDO) in 65 grams N,N-dimethylformamide (DMF), and the solution is heated to 90° C. for 6 hours. A precipitated polymer is obtained and dried with recovery of 15.5 grams of unsaturated polyurethane. Tg=94.7° C. Mw=68,000 g/mol, Mw/Mn=2.87 (vs. polystyrene standards). Unsaturation level is 2.2 mole percent.
Bisphenol-A Polycarbonate, Modified with Fumaryl Chloride Bisphenol-A polycarbonate modified with fumaryl chloride, such that a monomer/terminator ratio of 16/1, is prepared according to the following procedure.

A. Preparation of Solutions: Aqueous Alkaline Bisphenol-A Solution: Bisphenol-A (BisA) (6.5 g, 27 mmole) is weighed into a 100 ml glass bottle. The bottle is flushed with nitrogen. Then, 50 ml of 1.5 mole/l sodium hydroxide solution (75 mmole NaOH) are added. The bottle is flushed with nitrogen again. The bisphenol is dissolved under slight agitation by means of a magnetic stirrer.
Triethyl Amine (Coupling Catalyst Solution):
Triethylamine (2.0 g) is weighed into a 250 ml glass bottle. Dichloromethane (150 ml) is added and the resulting mixture is shaken to form a homogenous solution. The bottle is connected to a Schott automatic dispenser from which a burette is filled with the solution.

Terminator Solution:

para-Tertiary butylphenol (PTBP) (0.281 g; 1.87 mmole) is weighed into a 100 ml glass bottle. Dichloromethane (50 ml) is added. After the terminator is dissolved by slightly shaking, the bottle is connected to a Schott automatic dispenser from which a burette is filled with the solution.

Triphosgene Solution:

Bis(trichloromethyl)carbonate (triphosgene; 4.5 g) is weighed into a 250 ml glass bottle, filled up with 45 ml dichloromethane, and completely dissolved by slightly shaking the bottle. The glass bottle with the triphosgene solution is connected to a Schott automatic dispenser from which a burette is filled with the solution.

B. Synthesis: A jacketed reactor is temperature controlled by a water bath at the desired temperature of 35° C. The reactor is flushed with nitrogen. The bisphenol-A solution is filled into the reactor. The agitator is started and kept at 300 rpm. The cooling water of the condenser is turned on. Dichloromethane (20 ml) is added. The pH is adjusted at 13 (+/−0.1) by addition of 32 wt percent aqueous HCl. The triphosgene solution (27 ml) is added within 2 minutes. The resulting mixture is reacted for 30 minutes. The pH is adjusted to a value of 9 by addition of 15 wt percent aqueous HCl. Fumaryl chloride (0.23 g) is added by syringe. The mixture is reacted for 10 minutes. The pH is increased to a value of 12.5 by addition of 20 wt percent aqueous NaOH. Terminator solution (10 ml) is added all at once. Triphosgene solution (11 ml) is added over 2 minutes. The resulting mixture is reacted for 30 minutes. Triethylamine solution (30 ml) is added. NaOH solution (3 ml 30 wt %) is added. The resulting mixture is reacted for another 10 min during which time the pH is kept at 12.5 by addition of further 20 wt percent NaOH.

C. Polymer Purification: An emulsion of organic and aqueous phases obtained from the above synthesis is released into a 250 ml beaker, and then the liquid is filled into a 250 ml separating funnel. The lighter aqueous phase is removed by decantation. The heavier organic phase containing the polymer solution is filled back into the separating funnel and mixed thoroughly with 100 ml 2 molar aqueous HCl. Next, the polymer phase is separated into a 250 ml beaker. The aqueous phase is removed. The polymer is filled into a separating funnel and the HCl wash is repeated. Then, the polymer is washed four times with 100 ml deionized water, each time in a manner similar to the acid washes. The resulting pure polymer solution is filled into an aluminum pan, which is warmed on an electrical heating disk to remove dichloromethane by evaporation. The resulting solid polymer, an unsaturated polycarbonate, is dried at 100° C. and 10 mbar for 12 hours. The modified polycarbonate has the following properties: Mw, 27.5 g/mol (vs PS standards); PDI, 3.89; 10.5 mole percent (4 wt percent) fumaryl incorporated; Unsaturation level is 1.5 mole percent. Tg, 144° C.

Poly(ethylene oxide)

A stirred mixture of 50.0 grams poly(ethylene glycol) (average Mn 380-420 g/mol), 8.82 grams dimethyl maleate and 10.3 grams isophthalic acid is added to a flask and flushed with nitrogen. The mixture is heated to 165° C. and 1500 ppm monobutyltin oxide catalyst is added. After 2 hours, the flask is placed under vacuum for 2 additional hours and cooled to yield an unsaturated poly(ethylene oxide) polymer. Tg=−54.3° C. Mw=7,570 g/mol, Mw/Mn=4.33 (vs. polystyrene standards). Unsaturation level is 4.9 mole percent.

Polyester

A mixture of 73.5 grams 1,4-cyclohexanedimethanol and 36.0 grams dimethyl maleate is added to a flask and flushed with nitrogen. The stirred mixture is heated to 150° C. and 41.5 grams isophthalic acid and catalyst are added. After 4 hours at 210° C., an unsaturated polyester polymer is poured out and cooled. Tg=22° C. Mw=3990 g/mol, Mw/Mn=2.73 (vs. polystyrene standards). Unsaturation level is 4.7 mole percent.

Polystyrene-polybutadiene-polystyrene (SBS)

Anionic polymerization of styrene is carried out in a heavy-walled, glass cylindrical polymerization reactor with an internal volume of 2200 mL. The reactor is fitted with a screw-type agitator with a hollow core to facilitate top to bottom solution turnover. The reactor is initially cleaned with solvent that was used in the previous polymerization, and then cleaned again with solvent intended to be used in the current polymerization. The cleaning solvents are heated and stirred for 1 h and discarded; and the reactor is evacuated for at least 30 min while cooling to 25° C. The reactor is always retained under a positive pressure of nitrogen. A typical polymerization proceeded as follows: Cyclohexane is anaerobically added to the reactor and warmed to 45° C. through the reactor using a circulating water bath. sec-Butyllithium is anaerobically collected into an appropriately-sized graduated cylinder equipped with a flushing adapter. The weight and volume of the butyllithium are recorded. The butyllithium is then added as an initiator to the reactor using a cannula from the graduated cylinder to a septum port on the reactor. The desired amount of styrene monomer (10-11 wt %) is also anaerobically collected into a graduated cylinder fitted with a flushing adapter. The styrene is then added to the reactor in the same manner; both the volume and the mass of the styrene are documented. Upon styrene addition, a characteristic orange color of the reaction mixture is observed. The styrene is allowed to polymerize at 45° C. with stirring for at least 1 hour at 30 psig nitrogen pressure. The butadiene (BD) is collected into a shot tank from a BD transfer tank, the BD mass recorded, and then the BD added to the reactor through a quick-connect port. After BD is polymerized at 45° C. for 45 minutes, an additional amount of styrene monomer is added using the aforementioned procedure. Argon-purged methanol is collected (about 5:1 MeOH:s-BuLi) and added to the reaction mixture through the reactor septum port to terminate chain ends. SBS polymer is dumped from the reactor, and precipitated by adding portions of the polymer solution to methanol (1:3 polymer:methanol). The precipitated polymer is placed into an evaporating dish and slowly dried in a vacuum oven at 60° C. Overall polymer Mn=39,000 g/mole (vs. PS standards); PS block 1 Mn=14,500 g/mole; PBD block 2 Mn=1400 g/mole; PS block 3 Mn=22,600 g/mole; calculated wt % Styrene=95.6%; calculate wt % butadiene=4.4%; Unsaturation level is 2.2 mole percent. Tg=76° C.

Analytical

In the foregoing characterizing disclosure and the examples that follow, the following analytical techniques may be employed:

SAXS

Small angle x-ray scattering (SAXS) experiments are conducted at the Advanced Photon Source (APS), DND-CAT, 5-ID-D beamline. The standard APS Undulator A was used as the x-ray source, with the x-ray energy set at 15 keV ($\lambda$=0.82656 Å). Two-dimensional scattering patterns are collected on a MARUSA, Inc. CCD camera with a collection data acquisition time set at 1 sec. Angular calibration of the detectors is achieved using silver behenate standards. The sample to detector distance is set at 531.9 cm. Two dimensional scattering patterns are reduced to one dimensional data sets of scattering intensity versus scattering angle by radial integration of the 2-D images, using a data visualization and analysis software package on the PV-WAVE platform. Reduction and analysis of the one dimensional patterns is performed JADE™ analysis software. DSC analysis is conducted on approximately 20 mg of sample loaded into aluminum DSC pans. Sample pans are sealed with an aluminum lid. DSC experiments are performed using a Linkam™ DSC cell. Samples are heated from 20 to 300° C. at 10° C./minute, then cooled to 20° C. at a cooling rate of 10° C./min. SAXS patterns are collected during the thermal cycle at 2° C. intervals.

CRYSTAF

Branching distributions are determined by crystallization analysis fractionation (CRYSTAF) using a CRYSTAF 200 unit commercially available from PolymerChar, Valencia, Spain. The samples are dissolved in 1,2,4 trichlorobenzene at 160° C. (0.66 mg/mL) for 1 hr and stabilized at 95° C. for 45 minutes. The sampling temperatures range from 95 to 30° C. at a cooling rate of 0.2° C./min. An infrared detector is used to measure the polymer solution concentrations. The cumulative soluble concentration is measured as the polymer crystallizes while the temperature is decreased. The analytical derivative of the cumulative profile reflects the short chain branching distribution of the polymer.

The CRYSTAF peak temperature and area are identified by the peak analysis module included in the CRYSTAF Software (Version 2001.b, PolymerChar, Valencia, Spain). The CRYSTAF peak finding routine identifies a peak temperature as a maximum in the dW/dT and the area between the largest positive inflections on either side of the identified peak in the derivative curve. To calculate the CRYSTAF curve, the preferred processing parameters are with a temperature limit of 70° C. and with smoothing parameters above the temperature limit of 0.1, and below the temperature limit of 0.3.

DSC Standard Method

Differential Scanning Calorimetry results are determined using a TAI model Q1000 DSC equipped with an RCS cooling accessory and an autosampler. A nitrogen purge gas flow of 50 ml/min is used. The sample is pressed into a thin film and melted in the press at about 175° C. and then air-cooled to room temperature (25° C.). 3-10 mg Of material is then cut into a 6 mm diameter disk, accurately weighed, placed in a light aluminum pan (ca 50 mg), and then crimped shut. The thermal behavior of the sample is investigated with the following temperature profile. The sample is rapidly heated to 180° C. and held isothermal for 3 minutes in order to remove any previous thermal history. The sample is then cooled to −40° C. at 10° C./min cooling rate and held at −40° C. for 3 minutes. The sample is then heated to 150° C. at 10° C./min. heating rate. The cooling and second heating curves are recorded.

The DSC melting peak is measured as the maximum in heat flow rate (W/g) with respect to the linear baseline drawn between −30° C. and end of melting. The heat of fusion is measured as the area under the melting curve between −30° C. and the end of melting using a linear baseline.

Abrasion Resistance

Abrasion resistance is measured on compression molded plaques according to ISO 4649. The average value of 3 measurements is reported. Plaques for the test are 6.4 mm thick and compression molded using a hot press (Carver Model #4095-4PR1001R). The pellets are placed between polytetrafluoroethylene sheets, heated at 190° C. at 55 psi (380 kPa) for 3 minutes, followed by 1.3 MPa for 3 minutes, and then 2.6 MPa for 3 minutes. Next the plaques are cooled in the press with running cold water at 1.3 MPa for 1 minute and removed for testing.

GPC

The gel permeation chromatographic system consists of either a Polymer Laboratories Model PL-210 or a Polymer Laboratories Model PL-220 instrument. The column and carousel compartments are operated at 140° C. Three Polymer Laboratories 10-micron Mixed-B columns are used. The solvent is 1,2,4 trichlorobenzene. The samples are prepared at a concentration of 0.1 grams of polymer in 50 milliliters of solvent containing 200 ppm of butylated hydroxytoluene (BHT). Samples are prepared by agitating lightly for 2 hours at 160° C. The injection volume used is 100 microliters and the flow rate is 1.0 ml/minute.

Calibration of the GPC column set is performed with 21 narrow molecular weight distribution polystyrene standards with molecular weights ranging from 580 to 8,400,000, arranged in 6 "cocktail" mixtures with at least a decade of separation between individual molecular weights. The standards are purchased from Polymer Laboratories (Shropshire, UK). The polystyrene standards are prepared at 0.025 grams in 50 milliliters of solvent for molecular weights equal to or greater than 1,000,000, and 0.05 grams in 50 milliliters of solvent for molecular weights less than 1,000,000. The polystyrene standards are dissolved at 80° C. with gentle agitation for 30 minutes. The narrow standards mixtures are run first and in order of decreasing highest molecular weight component to minimize degradation. The polystyrene standard peak molecular weights are converted to polyethylene molecular weights using the following equation (as described in Williams and Ward, *J. Polym. Sci., Polym. Let.*, 6, 621 (1968)): $M_{polyethylene}=0.431(M_{polystyrene})$.

Polyethylene equivalent molecular weight calculations are performed using Viscotek TriSEC software Version 3.0.

Compression Set

Compression set is measured according to ASTM D 395. The sample is prepared by stacking 25.4 mm diameter round discs of 3.2 mm, 2.0 mm, and 0.25 mm thickness until a total thickness of 12.7 mm is reached. The discs are cut from 12.7 cm×12.7 cm compression molded plaques molded with a hot press under the following conditions: zero pressure for 3 min at 190° C., followed by 86 MPa for 2 min at 190° C., followed by cooling inside the press with cold running water at 86 MPa.

Density

Samples for density measurement are prepared according to ASTM D 1928. Measurements are made within one hour of sample pressing using ASTM D792, Method B.

Flexural/Secant Modulus/Storage Modulus

Samples are compression molded using ASTM D 1928. Flexural and 2 percent secant moduli are measured according to ASTM D-790. Storage modulus is measured according to ASTM D 5026-01 or equivalent technique.

Optical Properties

Films of 0.4 mm thickness are compression molded using a hot press (Carver Model #4095-4PR1001R). The pellets are placed between polytetrafluoroethylene sheets, heated at 190° C. at 55 psi (380 kPa) for 3 min, followed by 1.3 MPa for 3 min, and then 2.6 MPa for 3 min. The film is then cooled in the press with running cold water at 1.3 MPa for 1 min. The compression molded films are used for optical measurements, tensile behavior, recovery, and stress relaxation.

Clarity is measured using BYK Gardner Haze-gard as specified in ASTM D 1746.

45° gloss is measured using BYK Gardner Glossmeter Microgloss 45° as specified in ASTM D-2457

Internal haze is measured using BYK Gardner Haze-gard based on ASTM D 1003 Procedure A. Mineral oil is applied to the film surface to remove surface scratches.

Mechanical Properties—Tensile, Hysteresis, and Tear

Stress-strain behavior in uniaxial tension is measured using ASTM D 1708 microtensile specimens. Samples are stretched with an Instron at 500% min$^{-1}$ at 21° C. Tensile strength and elongation at break are reported from an average of 5 specimens.

100% and 300% Hysteresis is determined from cyclic loading to 100% and 300% strains using ASTM D 1708 microtensile specimens with an Instron™ instrument. The sample is loaded and unloaded at 267% min$^{-1}$ for 3 cycles at 21° C. Cyclic experiments at 300% and 80° C. are conducted using an environmental chamber. In the 80° C. experiment, the sample is allowed to equilibrate for 45 minutes at the test temperature before testing. In the 21° C., 300% strain cyclic experiment, the retractive stress at 150% strain from the first unloading cycle is recorded. Percent recovery for all experiments are calculated from the first unloading cycle using the strain at which the load returned to the base line. The percent recovery is defined as:

$$\% \text{ Recovery} = \frac{\varepsilon_f - \varepsilon_s}{\varepsilon_f} \times 100$$

where $\varepsilon_f$ is the strain taken for cyclic loading and $\varepsilon_s$ is the strain where the load returns to the baseline during the 1$^{st}$ unloading cycle.

Stress relaxation is measured at 50 percent strain and 37° C. for 12 hours using an Instron™ instrument equipped with an environmental chamber. The gauge geometry was 76 mm×25 mm×0.4 mm. After equilibrating at 37° C. for 45 min in the environmental chamber, the sample was stretched to 50% strain at 333% min$^{-1}$. Stress was recorded as a function of time for 12 hours. The percent stress relaxation after 12 hours was calculated using the formula:

$$\% \text{ Stress Relaxation} = \frac{L_0 - L_{12}}{L_0} \times 100$$

where $L_0$ is the load at 50% strain at 0 time and $L_{12}$ is the load at 50 percent strain after 12 hours.

Tensile notched tear experiments are carried out on samples having a density of 0.88 g/cc or less using an Instron™ instrument. The geometry consists of a gauge section of 76 mm×13 mm×0.4 mm with a 2 mm notch cut into the sample at half the specimen length. The sample is stretched at 508 mm min$^{-1}$ at 21° C. until it breaks. The tear energy is calculated as the area under the stress-elongation curve up to strain at maximum load. An average of at least 3 specimens are reported.

TMA

Thermal Mechanical Analysis (Penetration Temperature) is conducted on 30 mm diameter×3.3 mm thick, compression molded discs, formed at 180° C. and 10 MPa molding pressure for 5 minutes and then air quenched. The instrument used is a TMA 7, brand available from Perkin-Elmer. In the test, a probe with 1.5 mm radius tip (PN N519-0416) is applied to the surface of the sample disc with 1N force. The temperature is raised at 5° C./min from 25° C. The probe penetration distance is measured as a function of temperature. The experiment ends when the probe has penetrated 1 mm into the sample.

DMA

Dynamic Mechanical Analysis (DMA) is measured on compression molded disks formed in a hot press at 180° C. at 10 MPa pressure for 5 minutes and then water cooled in the press at 90° C./min. Testing is conducted using an ARES controlled strain rheometer (TA instruments) equipped with dual cantilever fixtures for torsion testing.

A 1.5 mm plaque is pressed and cut in a bar of dimensions 32×12 mm. The sample is clamped at both ends between fixtures separated by 10 mm (grip separation ΔL) and subjected to successive temperature steps from −100° C. to 200° C. (5° C. per step). At each temperature the torsion modulus G' is measured at an angular frequency of 10 rad/s, the strain amplitude being maintained between 0.1 percent and 4 percent to ensure that the torque is sufficient and that the measurement remains in the linear regime.

An initial static force of 10 g is maintained (auto-tension mode) to prevent slack in the sample when thermal expansion occurs. As a consequence, the grip separation ΔL increases with the temperature, particularly above the melting or softening point of the polymer sample. The test stops at the maximum temperature or when the gap between the fixtures reaches 65 mm.

Pellet Blocking Strength

Pellets (150 g) are loaded into a 2" (5 cm) diameter hollow cylinder that is made of two halves held together by a hose clamp. A 2.75 lb (1.25 kg) load is applied to the pellets in the cylinder at 45° C. for 3 days. After 3 days, the pellets loosely consolidate into a cylindrical shaped plug. The plug is removed from the form and the pellet blocking force measured by loading the cylinder of blocked pellets in compression using an Instron™ instrument to measure the compressive force needed to break the cylinder into pellets.

Melt Index

Melt index, or $I_2$, is measured in accordance with ASTM D 1238, Condition 190° C./2.16 kg. Melt index, or $I_{10}$ is also measured in accordance with ASTM D 1238, Condition 190° C./10 kg.

ATREF

Analytical temperature rising elution fractionation (ATREF) analysis is conducted according to the method described in U.S. Pat. No. 4,798,081. The composition to be analyzed is dissolved in trichlorobenzene and allowed to crystallize in a column containing an inert support (stainless steel shot) by slowly reducing the temperature to 20° C. at a cooling rate of 0.1° C./min. The column is equipped with an infrared detector. An ATREF chromatogram curve is then generated by eluting the crystallized polymer sample from the column by slowly increasing the temperature of the eluting solvent (trichlorobenzene) from 20 to 120° C. at a rate of 1.5° C./min.

TREF

Large-scale TREF fractionation is carried by dissolving 15-20 g of polymer in 2 liters of 1,2,4-trichlorobenzene (TCB) by stirring for 4 hours at 160° C. The polymer solution is forced by 15 psig (100 kPa) nitrogen onto a 3 inch by 4 foot (7.6 cm×12 cm) steel column packed with a 60:40 (v:v) mix of 30-40 mesh (600-425 μm) spherical, technical quality glass beads (available from Potters Industries, HC 30 Box 20, Brownwood, Tex., 76801) and stainless steel, 0.028" (0.7 mm) diameter cut wire shot (available form Pellets, Inc. 63 Industrial Drive, North Tonawanda, N.Y., 14120). The column is immersed in a thermally controlled oil jacket, set initially to 160° C. The column is first cooled ballistically to 125° C., then slow cooled to 20° C. at 0.04° C. per minute and held for one hour. Fresh TCB is introduced at about 65 ml/min while the temperature is increased at 0.167° C. per minute.

Approximately 2000 ml portions of eluant from the preparative TREF column are collected in a 16 station, heated fraction collector. The polymer is concentrated in each fraction using a rotary evaporator until about 50 to 100 ml of the polymer solution remains. The concentrated solutions are allowed to stand overnight before adding excess methanol, filtering, and rinsing (approx. 300-500 ml of methanol including the final rinse). The filtration step is performed on a 3 position vacuum assisted filtering station using 5.0 µm polytetrafluoroethylene coated filter paper (available from Osmonics Inc., Cat# Z50WP04750). The filtrated fractions are dried overnight in a vacuum oven at 60° C. and weighed on an analytical balance before further testing.

$^{13}$C NMR Analysis

Samples are prepared by adding approximately 3 g of a 50/50 mixture of tetrachloroethane-$d^2$/orthodichlorobenzene to 0.4 g sample in a 10 mm NMR tube. The samples are dissolved and homogenized by heating the tube and its contents to 150° C. The data is collected using a JEOL Eclipse™ 400 MHz spectrometer or a Varian Unity Plus™ 400 MHz spectrometer, corresponding to a $^{13}$C resonance frequency of 100.5 MHz. The data is acquired using 4000 transients per data file with a 6 second pulse repetition delay. To achieve minimum signal-to-noise for quantitative analysis, multiple data files are added together. The spectral width is 25,000 Hz with a minimum file size of 32K data points. The samples are analyzed at 130° C. in a 10 mm broad band probe. The comonomer incorporation is determined using the Randall method.

$^1$H NMR Analysis

Samples for Proton Nuclear Magnetic Resonance ($^1$H NMR) spectroscopy are prepared by adding approximately 3 g of d-1,1,2,2-tetrachloroethane (TCE) to 0.4 g sample in a 10 mm NMR tube. The samples are dissolved and homogenized by heating the tube and its contents to 120° C. Complete dissolution requires about 15 minutes. Occasionally, heating the samples with a heat gun is required for thorough homogenization. The sample tubes are visually inspected to ensure complete dissolution of the polymer. Data are collected using a 300 MHz Varian INOVA Spectrometer. Thirty-two scans are collected at 120° C. The proton chemical shifts are referenced against a residual proton signal from the TCE solvent at 7.26 ppm.

FTIR

Fourier transform infrared spectroscopy (FTIR) is performed using a PerkinElmer Spectrum One spectrometer equipped with a Universal Attenuated Total Reflectance (ATR) Sampling Accessory. A background spectrum is obtained before each sample spectrum, and the crystal surface sampling area is cleaned after each analysis. Each solid sample is pressed against the crystal (internal reflectance element), and data are collected using the following instrument parameters: 32 scans from 650 to 4000 cm$^{-1}$ at 4 cm$^{-1}$ resolution. The data are analyzed using Spectrum v5.0 software.

TEM

Samples for Transmission Electron Microscopy (TEM) are polished with a diamond knife using a Leica UC6:FC6 cryo-ultramicrotome at −100° C. and then stained with $RuO_4$ vapors for 3 hours at room temperature. Thin-sections of approximately 90 nm thickness are collected at room temperature and examined with a JEOL JEM-1230 TEM running at an accelerating voltage of 120 kV. Images are recorded digitally using a Gatan Multiscan CCD camera, Model 749, and post processed with Adobe Photoshop CS2.

Atomic Force Microscopy (AFM)

Sections are collected from the sample material using a Leica UCT™ microtome with a FC cryo-chamber operated at −80° C. A diamond knife is used to section all sample material to a thickness of 120 nm. Sections are placed on freshly cleaved mica surfaces, and mounted on standard AFM specimen metal support disks with a double carbon tape. The sections are examined with a DI NanoScope IV™ MultiMode AFM, in tapping mode with phase detection. Nanosensor tips are used in all experiments.

General Procedure In the examples and comparative experiments that follow, unless otherwise noted, the reagent polymers employed are prepared as described hereinabove.

Example 1

A toluene solution containing 0.25 g each of a partially-hydrogenated polybutadiene (HPBD) and a partially-hydrogenated nitrile/butadiene rubber (HNBR) is warmed to 95° C. and stirred at that temperature until the polymers are completely dissolved. To this stirred solution is added 8 mg of Grubbs II metathesis catalyst. After 1 hour a polymer product is precipitated from the cooled solution by addition of methanol and recovered by filtration. Removing volatile components from the isolated solids under reduced pressure gives 0.45 g of recovered product. SAXS analysis of the recovered polymer shows both HPBD crystalline lamellae and microphase separation indicative of a meta-block copolymer. The microphase separation is evident only at temperatures above the crystalline melting point of the crystalline polymer phase. A graph showing results at three temperatures within the range of the test is shown in FIG. 1. The peak that is observed at 300° C. is evidence of the ordered microphase morphology present in the polymer liquid phase of the meta-block copolymer produced.

Comparative Experiment A

Figure 2:
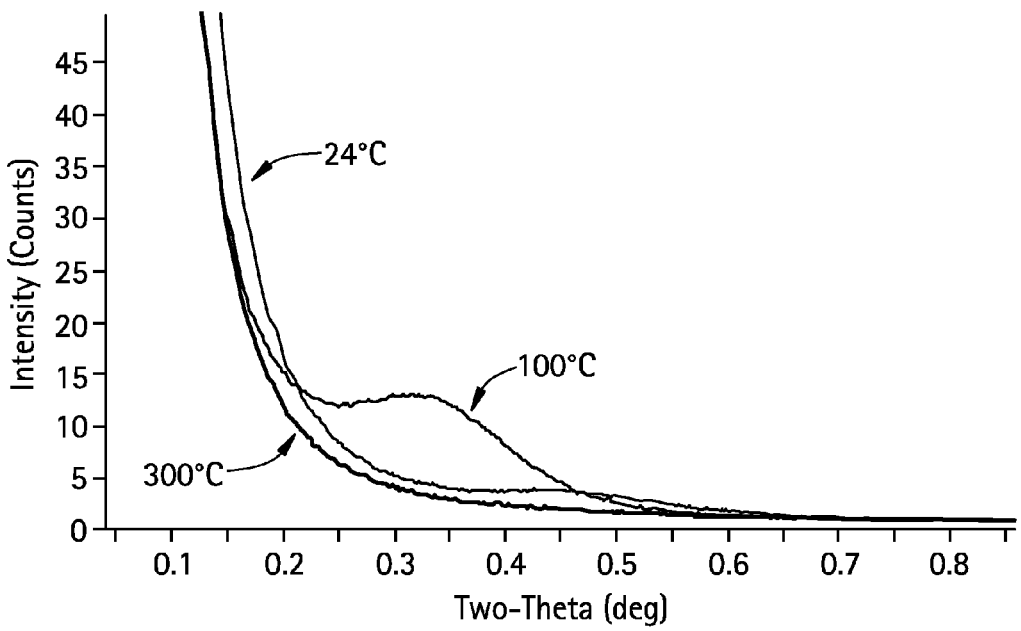
FIG. 2 illustrates SAXS plots at three temperatures of a control composition prepared as described in Comparative Experiment A.

Example 1 is repeated using HPBD and HNBR reagent polymers, with the exception that no metathesis catalyst is used. Analysis of the recovered product by SAXS shows it to be an isolated blend of the original polymers due to the fact that HPBD crystalline lamellae scattering contributions are evident at all temperatures less than the Tm of the crystalline polymer within the range of 20 to 300° C. A graph of the SAXS curve at three temperatures within the range of the test is shown in FIG. 2. In FIG. 2, the product of Comparative Experiment A fails to exhibit a peak at 300° C. Failure to observe a peak at 300° C. indicates that the product of Comparative Experiment A shows no microphase order in the liquid phase, and thus the product of Comparative Experiment A is consistent with a simple polymeric blend.

The SAXS results of FIGS. 1 and 2 indicate that meta-block copolymers are prepared in the metathesized reaction mixture of Example 1, due to the fact that for the product of Example 1 scattering peaks for microphase separations of the incompatible polymer blocks, comprising chemically distinguishable polymer segments from the original unsaturated polymers, are observed at temperatures above the Tm of the crystalline polymer phase, notably, in the scattering pattern at 300° C. in FIG. 1. In the comparative product of FIG. 2, the characteristic crystal X-ray pattern of the unaltered crystalline polymer (HPBD) is apparent below the Tm, and no microphase separation scattering peaks are detectable, demonstrating that the product is merely a blend of the original polymers.

Example 2

A tetrachloroethane solution containing 0.25 grams each of unsaturated polyurethane and 0.25 grams poly(ethylene-co-butadiene) is warmed to 105° C. and stirred at that temperature until the polymers are dissolved. To this stirred solution are added 9 milligrams of Grubbs II metathesis catalyst.

Figure 3:
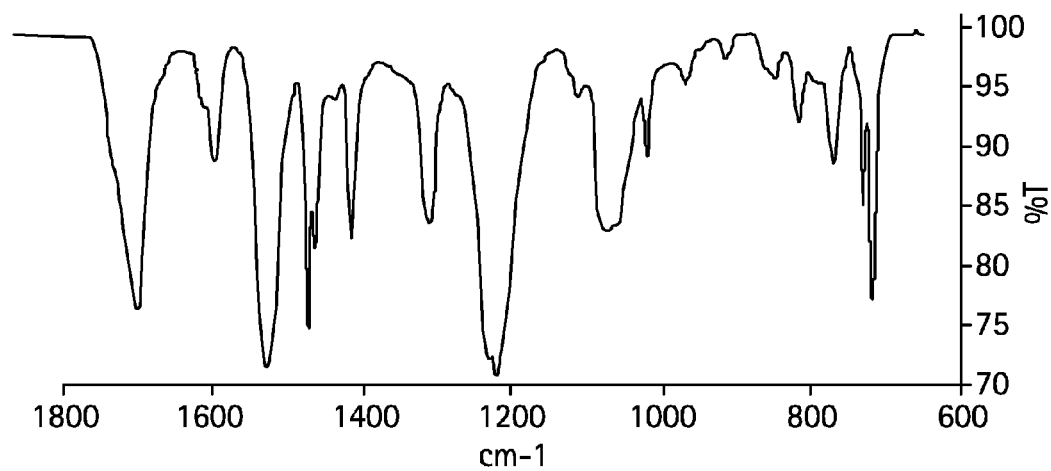
FIG. 3 illustrates an infrared spectrum of a composition of this invention prepared as described in Example 2.

After 1 hour, a polymer product is precipitated from the cooled solution by addition of methanol and recovered by filtration. Removing volatile components under reduced pressure gives 0.47 grams of recovered product. To the recovered product are added 30 ml tetrahydrofuran, and the resulting mixture is placed on a shaker overnight to extract out non-metathesized unsaturated polyurethane. The polymer remaining after extraction is filtered, dried, and analyzed by FTIR spectroscopy with the results shown in FIG. 3. Intense peaks in the ranges from 1500-1800 cm$^{-1}$ and 900-1400 cm$^{-1}$ are indicative of a segment interchange reaction having occurred to form a meta-block copolymer. The IR peaks in FIG. 3 are consistent with the presence of both polyurethane and polyethylene functionality, indicating that the material of Example 2 is a meta-block copolymer as claimed herein.

Comparative Experiment B

Figure 4:
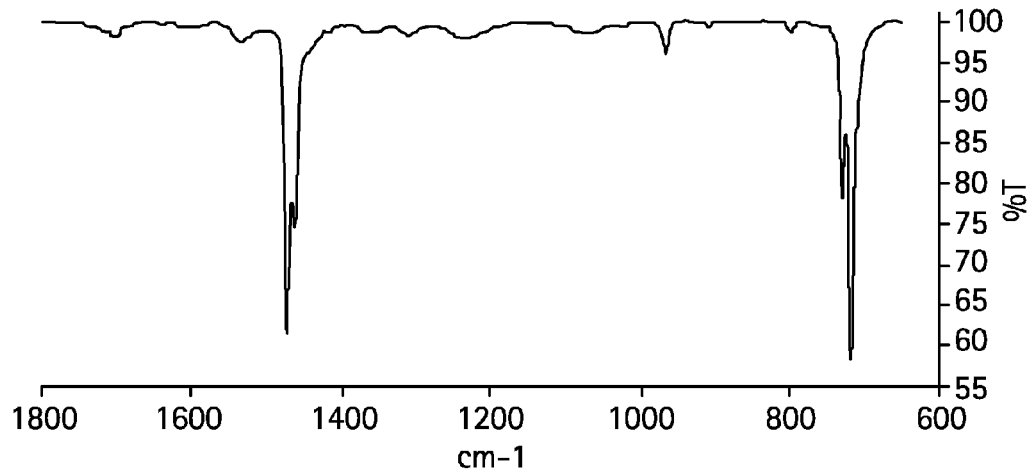
FIG. 4 illustrates an infrared spectrum of a control composition prepared as described in Comparative Experiment B.

The process of Example 2 is repeated, with the exception that no metathesis catalyst is used. After similar extraction to remove non-metathesized unsaturated polyurethane, a polymer composition is recovered having the FTIR spectrum shown in FIG. 4. Two sharp peaks are seen at about 720 cm$^{-1}$ and 1460 cm$^{-1}$ indicative of the starting PE polymer; however, no IR peaks are seen indicative of polyurethane functionality. When FIG. 3 is compared with FIG. 4, it is seen that a segment interchange reaction occurs in the metathesis reaction of Example 2 resulting in a meta-block copolymer with characteristic urethane and polyethylene peaks. Since urethane peaks are absent in comparative sample B, it is concluded that the comparative sample does not undergo a segment interchange reaction to form a meta-block copolymer.

Example 3

Figure 5:
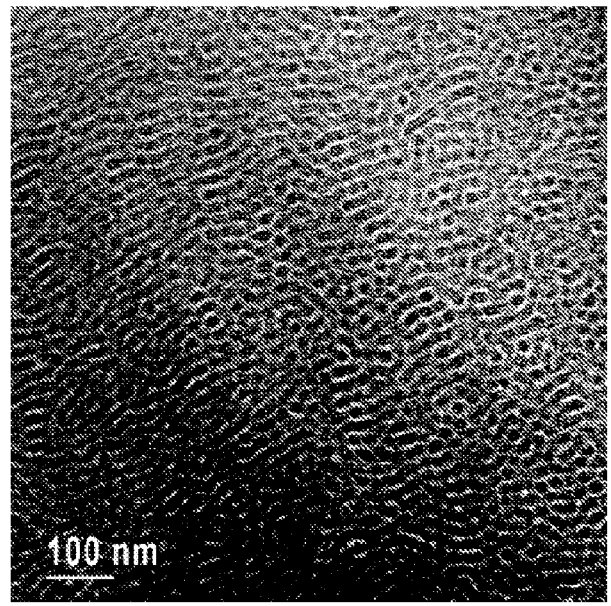
FIG. 5 illustrates a TEM scan of a composition of this invention prepared as described in Example 3.
Figure 6:
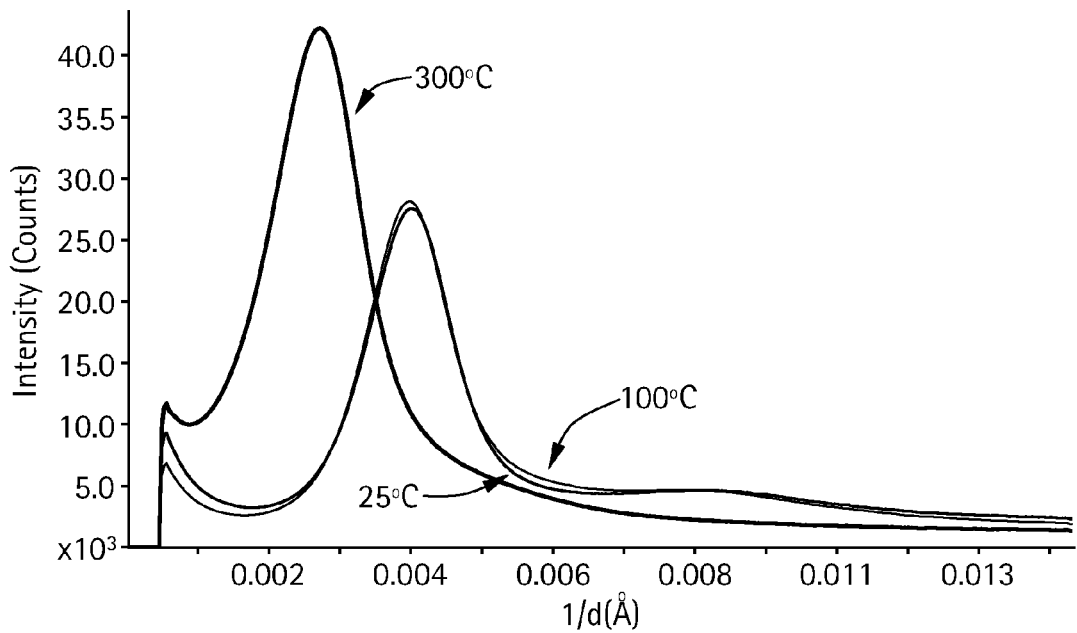
FIG. 6 illustrates SAXS plots at three temperatures of a composition of this invention prepared as described in Example 3.

A toluene solution containing 1.05 grams fumaryl-modified polycarbonate and 0.45 grams poly(ethylene-co-butadiene) is warmed to 105° C. and stirred at that temperature until the polymers are completely dissolved. To this stirred solution are added 9 mg of Grubbs II metathesis catalyst. After 1 hour, a polymer product is precipitated from the cooled solution by addition of methanol and recovered by filtration. Removing volatile components from the precipitated product under reduced pressure yields 1.37 grams of polymer, TEM analysis of which is shown in FIG. 5 and SAXS data of which are shown in FIG. 6. The TEM of FIG. 5 shows an ordered microphase morphology. The SAXS data of FIG. 5 show a peak at three different temperatures ranging from 25° C. to 300° C. The peak at 300° C. is indicative of ordering in the liquid phase as well as in the non-liquid phases at 25° C. and 100° C. The data support the formation of a meta-block copolymer through a segment interchange reaction.

Example 4

Figure 7:
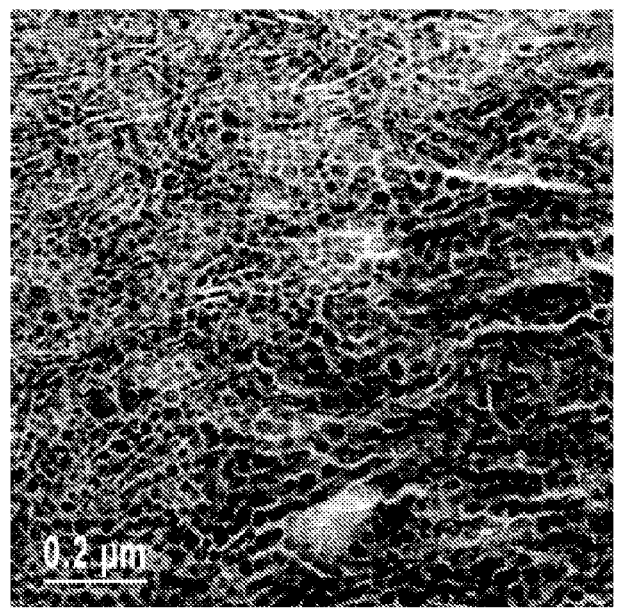
FIG. 7 illustrates a TEM scan of a composition of this invention prepared as described in Example 4.
Figure 8:
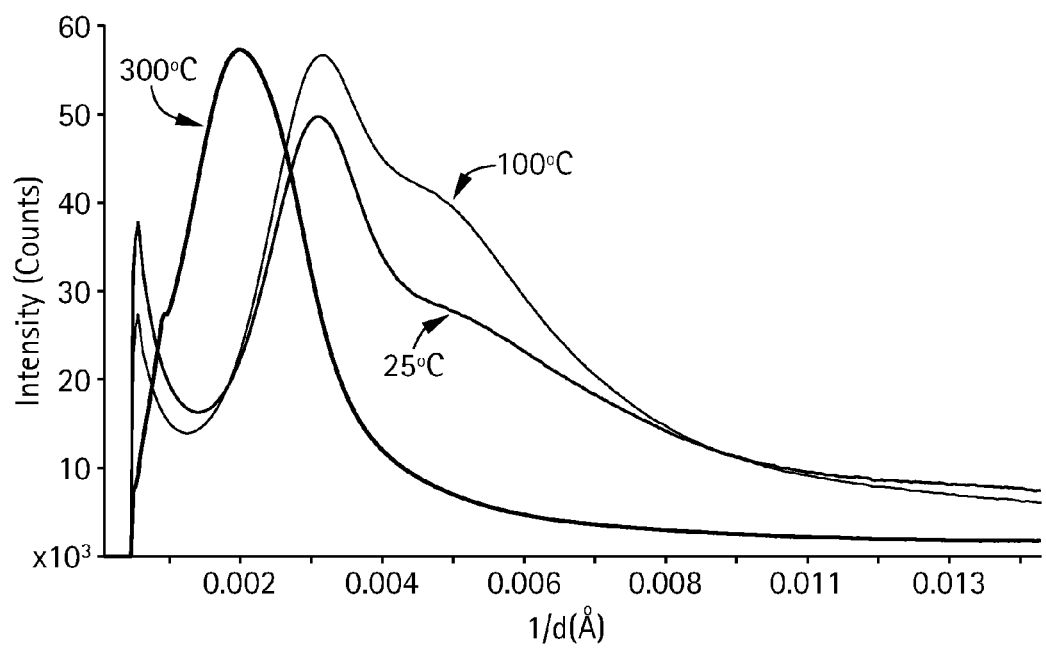
FIG. 8 illustrates SAXS plots at three temperatures of a composition of this invention prepared as described in Example 4.

A toluene solution containing 0.25 grams fumaryl-modified polycarbonate and 0.25 grams poly(ethylene-co-butadiene) is warmed to 105° C. and stirred at that temperature until the polymers are completely dissolved. To this stirred solution are added 9 mg of Grubbs II metathesis catalyst. After 1 hour, a polymer product is precipitated from the cooled solution by the addition of methanol and recovered by filtration. Removing volatile components under reduced pressure gives 0.47 grams of polymer product, TEM analysis of which is shown in FIG. 7 and SAXS data of which is shown in FIG. 8. FIG. 7 shows an ordered microphase morphology. FIG. 8 shows SAXS data at three different temperatures. The peak at 300° C. demonstrates order in the liquid phase of this material, as well as the non-liquid phases at 25° C. and 100° C. The data are consistent with the formation of a meta-block copolymer through a segment interchange reaction.

Comparative Experiment C

Figure 9:
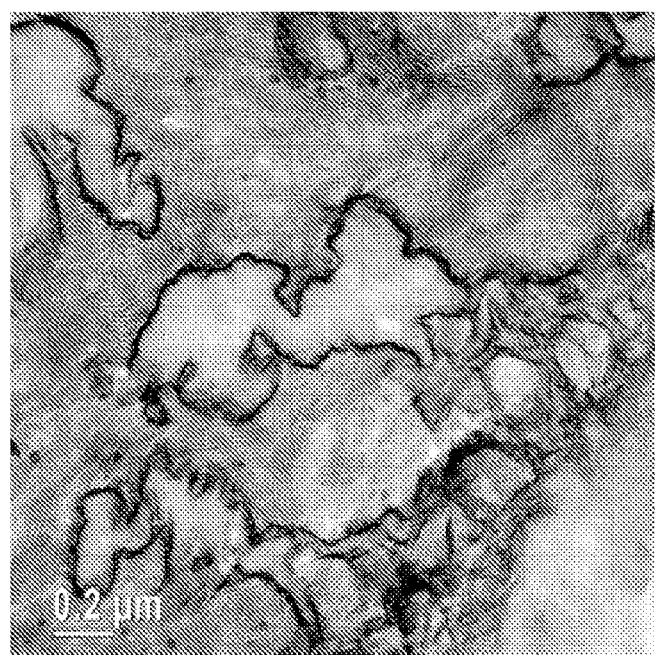
FIG. 9 illustrates a TEM scan of a control composition prepared as described in Comparative Experiment C.

The procedure of Example 4 is repeated, with exception that no metathesis catalyst is used. Analysis of the resulting polymer product by TEM, as shown in FIG. 9, shows essentially no microphase morphology, but rather large domains indicative of a simple blend of the reactant polymers. When FIGS. 5 and 7 are compared with FIG. 9, a substantially different morphology is observed in the metathesized copolymer products of Examples 3 and 4, as compared with the non-metathesized control of Comparative Experiment C. In Examples 3 and 4, microphase separations on a nano scale are observed, indicative of the occurrences of segment interchange reactions. In contrast, Comparative Experiment C exhibits a morphology comparable to a simple blend of non-metathesized reactant polymers.

Example 5

A toluene solution containing 0.25 grams each of unsaturated poly(ethylene oxide) and 0.25 grams poly(ethylene-co-butadiene) is warmed to 105° C. and stirred at that temperature until the polymers are dissolved. To this stirred solution are added 9 milligrams of Grubbs II catalyst. After 1 hour, a polymer product is precipitated from the cooled solution by the addition of methanol and recovered by filtration. Removing volatile components from the isolated solids under reduced pressure gives 0.47 grams of recovered polymer product. Tetrahydrofuran (30 ml) is added to the recovered product, which is placed on a shaker overnight to extract out non-metathesized unsaturated poly(ethylene oxide). The polymer remaining after extraction is filtered, dried, and analyzed by $^1$H NMR spectroscopy as shown in FIG. 10 (lower spectrum).

Comparative Experiment D

Figure 10:
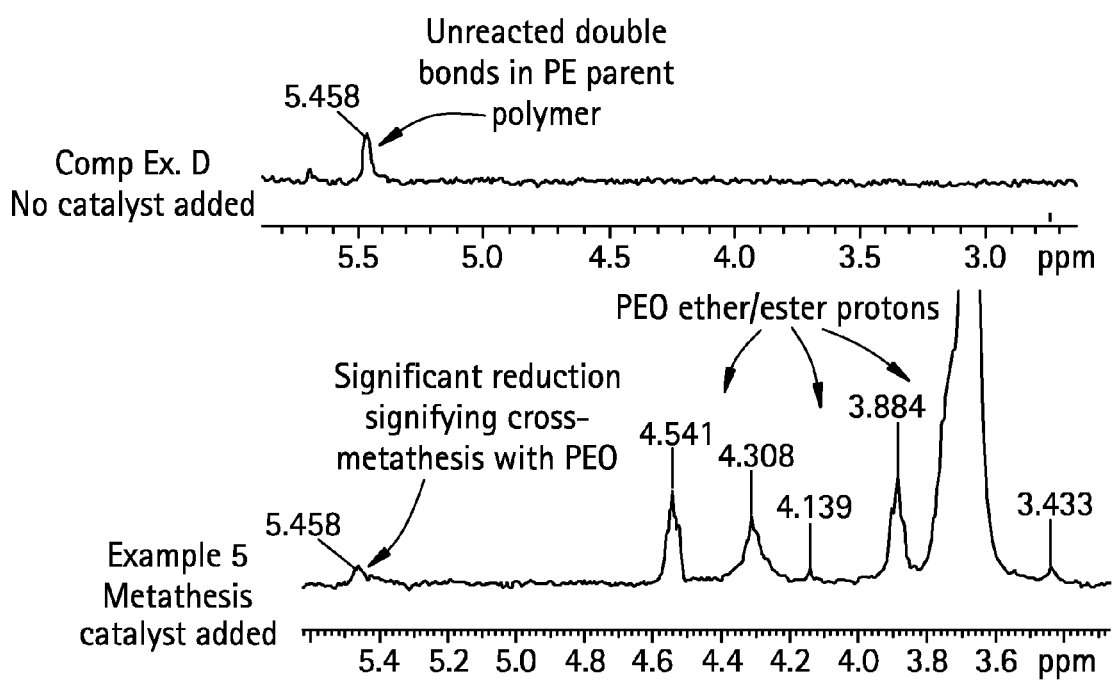
FIG. 10 (lower graph) illustrates an $^1$H NMR spectrum of a composition of this invention prepared as described in Example 5.

Example 5 is repeated, with the exception that no metathesis catalyst is used with the results shown in FIG. 10 (upper spectrum). A comparison of the upper and lower spectra of FIG. 10 indicates that poly(ethylene oxide) moieties are present in the polymer product of Example 5, but are absent in the product of Comparative Experiment D. These results provide evidence for formation of a meta-block copolymer in Example 5 through a metathesis segment interchange reaction, but the same does not occur in Comparative Experiment D.

Example 6

Figure 11:
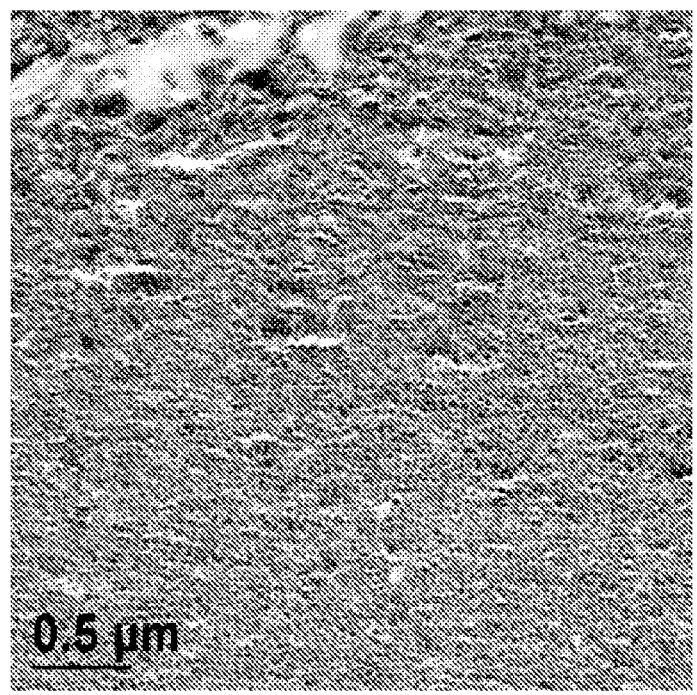
FIG. 11 illustrates a TEM scan of a composition of this invention prepared as described in Example 6.
Figure 12:
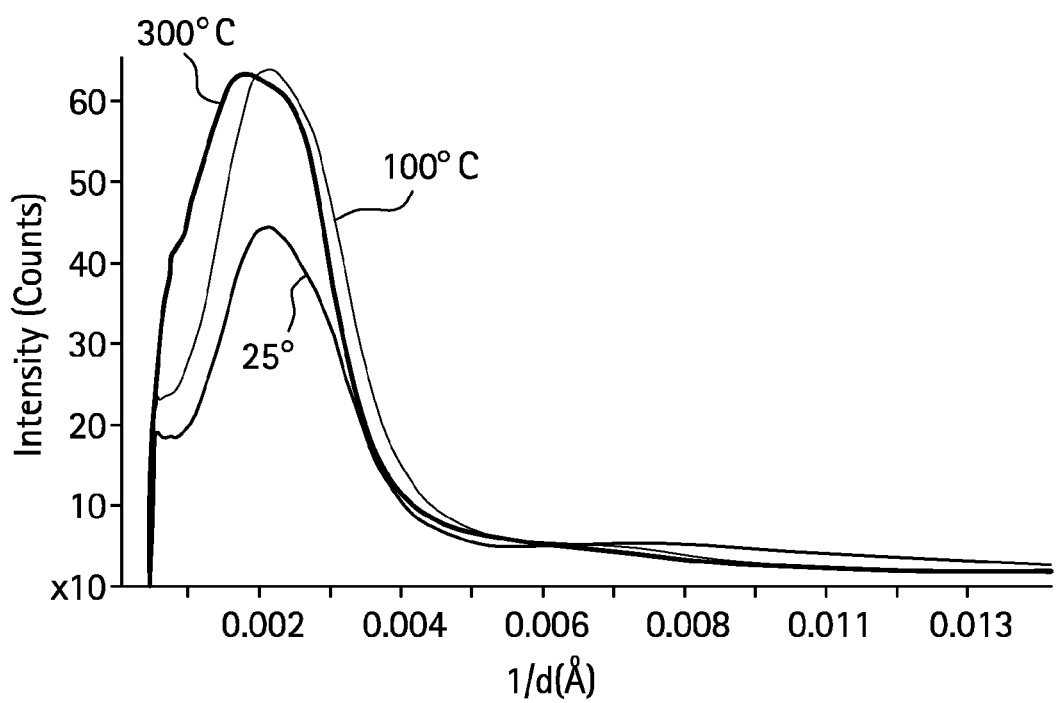
FIG. 12 illustrates SAXS plots at three temperatures of a composition of this invention prepared as described in Example 6.

A toluene solution containing 0.25 g fumaryl-modified polycarbonate and 0.25 g poly(ethylene-co-octene-co-butadiene) is warmed to 105° C. and stirred at that temperature until the polymers are completely dissolved. To this stirred solution are added 9 mg of Grubbs II metathesis catalyst. After 1 hour, a polymer product is precipitated from the cooled solution by the addition of methanol, and the product is recovered by filtration. Removing volatile components under reduced pressure gives 0.47 g of polymer product. Analysis by TEM, as shown in FIG. 11, indicates an ordered microphase morphology of the material. FIG. 12 shows SAXS data at three temperatures. A peak at 300° C. demonstrates microphase order in the liquid phase as well as in the non-liquid phases at 25° C. and 100° C. The data indicate formation of a meta-block copolymer through a segment interchange metathesis reaction.

Example 7

Figure 13:
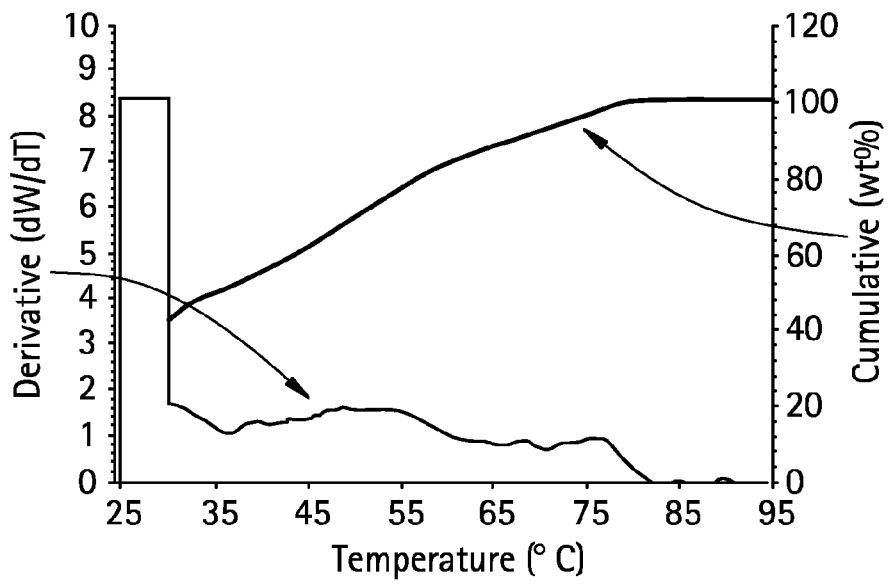
FIG. 13 illustrates a CRYSTAF graph for a composition of this invention prepared as described in Example 7.

A toluene solution containing 0.10 g poly(ethylene-co-butadiene) and 0.40 g poly(ethylene-co-octene-co-butadiene) is warmed to 105° C. and stirred at that temperature until the polymers are completely dissolved. To this stirred solution are added 8,000 ppm tungsten hexachloride catalyst and 13,000 ppm tri-n-butylmethyltin co-catalyst. After 1 hour, a polymer product is precipitated from the cooled solution by the addition of methanol and recovered by filtration. Removing volatile components from the filtered product under reduced pressure gives 0.47 g of recovered polymer product, which is analyzed by crystallization fractionation (CRYSTAF) as seen in FIG. 13.

Comparative Experiment E

Figure 14:
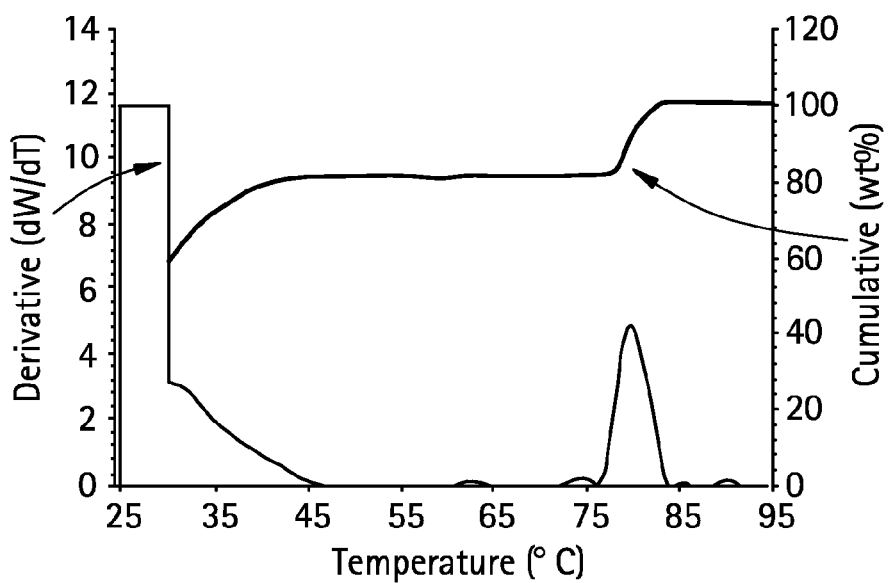
FIG. 14 illustrates a CRYSTAF graph for a control composition prepared as described in Comparative Experiment E.

Example 7 is repeated, with the exception that no metathesis catalyst is added. The product recovered is analyzed by CRYSTAF as seen in FIG. 14. Significantly, in FIG. 14 a peak is observed at 80° C., which is not observed in the CRYSTAF plot of FIG. 13. The peak at 80° C. is attributed to the presence of poly(ethylene-co-butadiene) polymer. The absence of a peak at 80° C. for the product of Example 7 (FIG. 13) indicates that the solubility of the polymer product is increased as a result of segment interchange, thereby providing evidence for formation of a meta-block copolymer. In contrast, the presence of a peak at 80° C. for the comparative product of Comparative Experiment E (FIG. 14) indicates that this product is a blend of non-metathesized crystalline polymer and poly(ethylene-co-octene-co-butadiene) and not a meta-block copolymer.

Example 8

Figure 15:
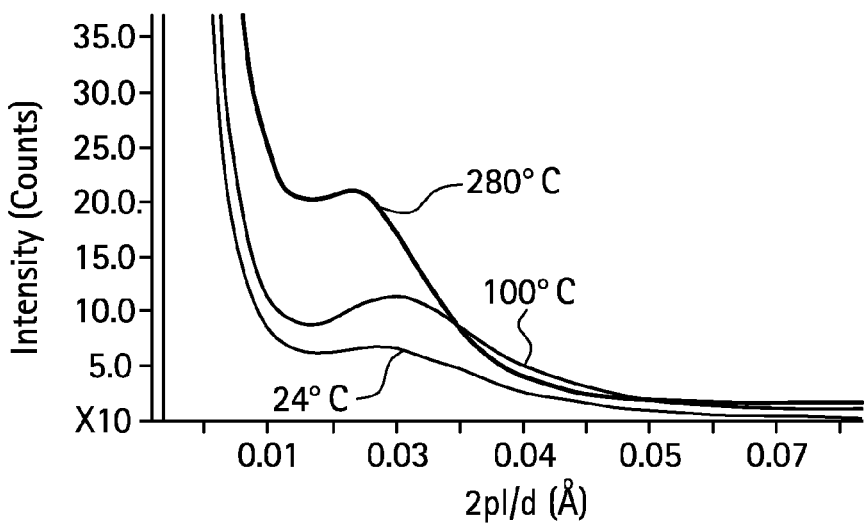
FIG. 15 illustrates SAXS plots at three temperatures of a composition of this invention prepared as described in Example 8.

A toluene solution containing 0.25 grams each of unsaturated polyester and 0.25 grams poly(ethylene-co-butadiene) warmed to 105° C. and stirred at that temperature until the polymers are dissolved. To this stirred solution are added 9 milligrams of Grubbs II catalyst. After 1 hour, a polymer product is precipitated from the cooled solution by the addition of methanol and recovered by filtration. Removing volatile components under reduced pressure gives 0.47 grams of recovered polymer product. To the recovered product are added 30 ml tetrahydrofuran and the mixture is shaken overnight to extract out non-metathesized unsaturated poly(ethylene oxide). The polymer remaining after extraction is filtered, dried, and analyzed by SAXS at three different temperatures as shown in FIG. 15. A peak at 280° C. demonstrates microphase order in the liquid phase of the recovered copolymer product, as well as the two non-liquid phases at 24° C. and 100° C.

Comparative Experiment F

Figure 16:
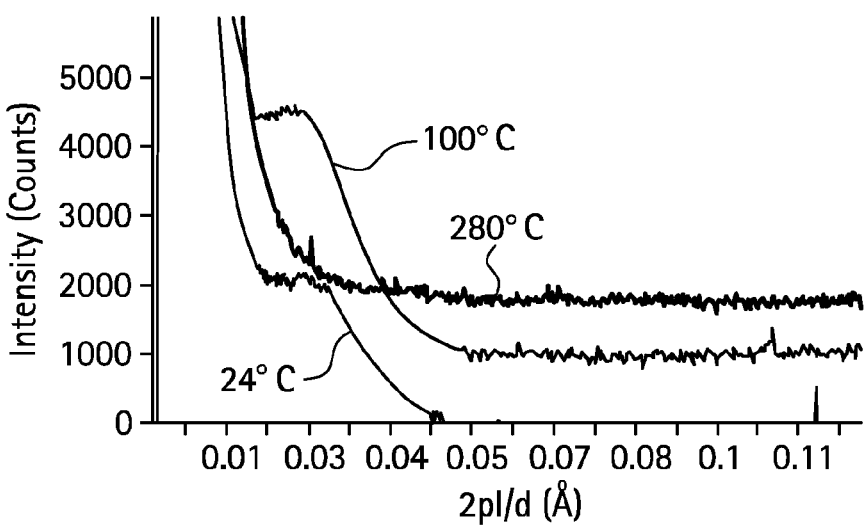
FIG. 16 illustrates SAXS plots at three temperatures of a control composition prepared as described in Comparative Experiment F.

Example 8 is repeated, with the exception that no metathesis catalyst is used. A recovered product is analyzed by SAXS at three different temperatures as shown in FIG. 16. The absence of a peak at 280° C. indicates that the product of Comparative Experiment F shows no microphase order in the liquid phase, which is consistent with the product of Comparative Experiment F being a simple polymeric blend. When FIG. 15 is compared with FIG. 16, it is seen that a meta-block copolymer is formed in the metathesized process of Example 8, due to the fact that scattering peaks for microphase separations of incompatible polymer blocks are observed at temperatures above the Tm of the crystalline polymer phase. By comparison in the comparative experiment, the characteristic X-ray pattern of the unaltered crystalline polymer (PE) is apparent below the Tm, and no microphase separation scattering peaks are detectable, thereby demonstrating that the comparative product is a blend of the original polymers.

Example 9

Figure 17:
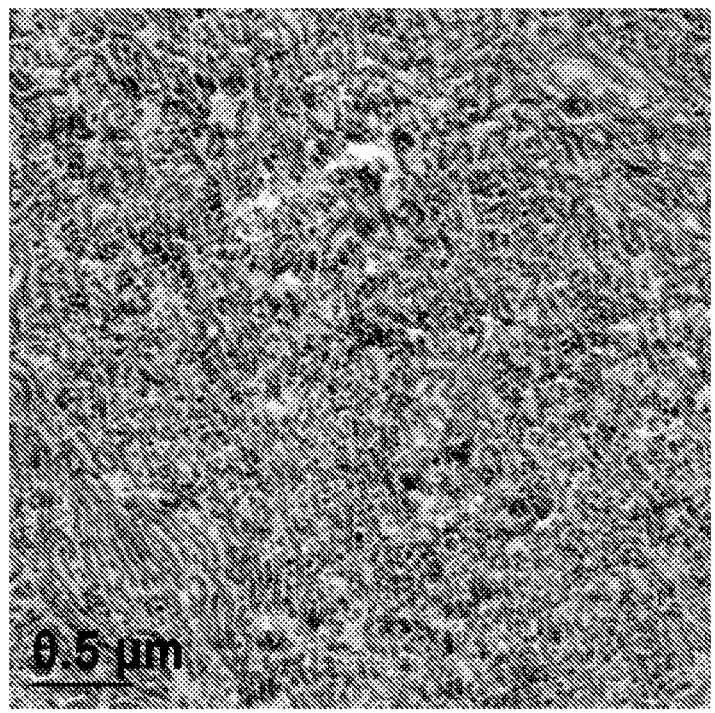
FIG. 17 illustrates a TEM scan of a composition of this invention prepared as described in Example 9.

A toluene solution containing 0.25 grams SBS and 0.25 grams poly(ethylene-co-butadiene) is warmed to 105° C. and stirred at that temperature until the polymers are completely dissolved. To this stirred solution is added tungsten hexachloride catalyst (8,000 ppm) and tri-n-butylmethyltin co-catalyst (13,000 ppm). After 1 hour, a polymer product is precipitated from the cooled solution by the addition of methanol and recovered by filtration. Removing volatile components from the filtered solids under reduced pressure gives 0.47 grams of recovered product. FIG. 17 shows a TEM of the product of Example 9, demonstrating an ordered microphase morphology consistent with a meta-block copolymer. The TEM of FIG. 17 indicates microphase separation on a nano scale characteristic of a segment interchange reaction via metathesis. A substantial change in morphology is observed, as compared with that of the reactant polymers.

Example 10

Figure 18:
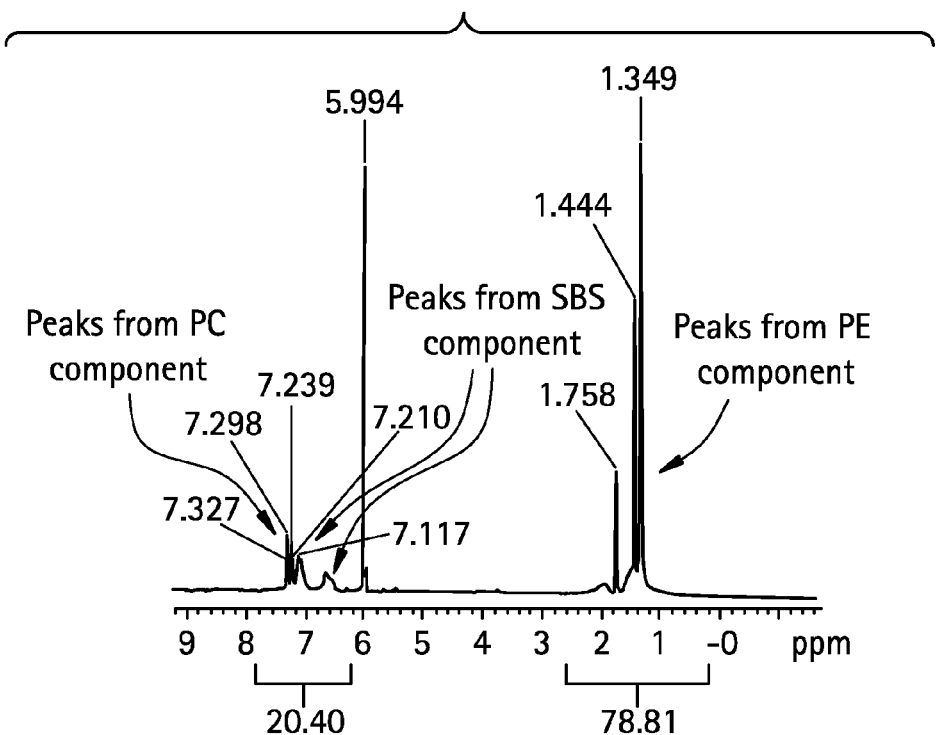
FIG. 18 (upper graph) illustrates an $^1$H NMR spectrum of a composition of this invention prepared as described in Example 10.
Figure 18:
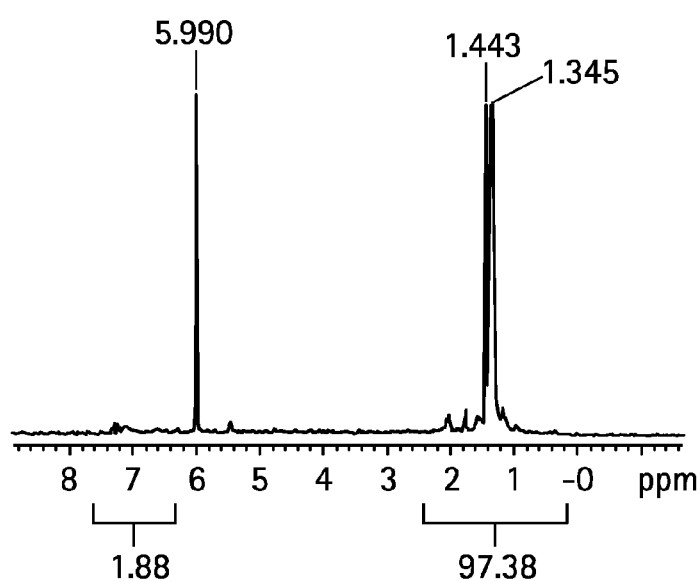
Figure 19:
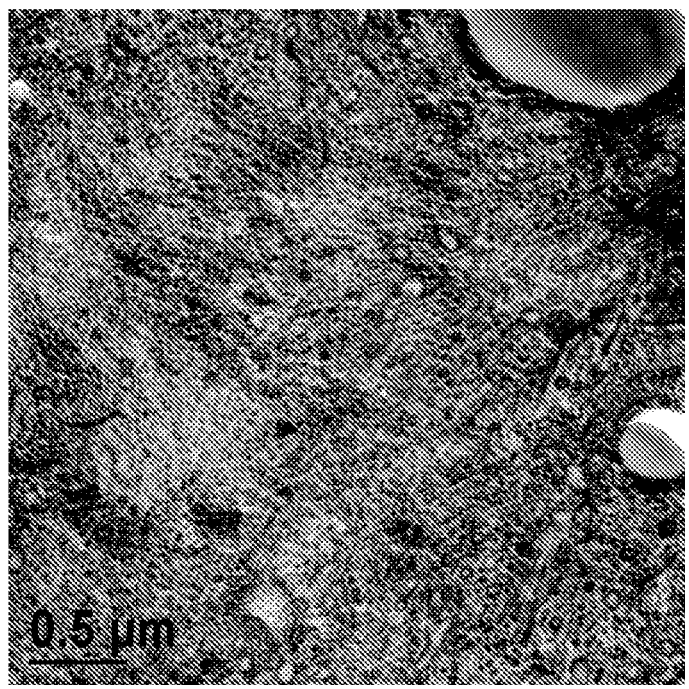
FIG. 19 illustrates a TEM of a composition of this invention prepared as described in Example 10.

A toluene solution containing 0.25 grams of unsaturated fumaryl-modified polycarbonate, 0.25 grams poly(styrene-co-butadiene-co-styrene) (SBS), and 0.25 grams poly(ethylene-co-butadiene) is warmed to 105° C. and stirred until the polymers are dissolved. To the stirred solution are added 9 milligrams of Grubbs II catalyst. After 1 hour, a polymer product is precipitated from the cooled solution by the addition of methanol and recovered by filtration. Removing volatile components under reduced pressure gives 0.71 g of recovered polymer product, to which are added 50 ml tetrahydrofuran; and then the mixture is shaken overnight to extract out non-metathesized unsaturated polycarbonate and SBS. The polymer remaining after extraction is filtered, dried, and analyzed by $^1$H NMR spectroscopy, as seen in FIG. 18 (upper spectrum). As seen in FIG. 19, a TEM of the product indicates an ordered microphase morphology on a nano-scale consistent with a meta block copolymer being formed via methathesis segment interchange reactions. SAXS analysis at three different temperatures supports formation of a meta-block copolymer through metathesis segment interchange reactions.

Comparative Experiment G

Example 10 is repeated, with the exception that no metathesis catalyst is used. $^1$H NMR of the resulting product is shown in FIG. 18 (lower spectrum). A comparison of the upper and lower spectra of FIG. 18 indicate that both polycarbonate and SBS moieties are present in the polymer product of Example 10, but are absent in the product of Comparative Experiment G. These results provide evidence for formation of a meta-block copolymer in Example 10, presumably a terpolymer through metathesis segment interchange reactions, but the same does not occur in Comparative Experiment G.

The invention claimed is:
1. A process for preparing a product mixture comprising meta-block copolymers by contacting a metathesis catalyst under metathesis conditions with a composition comprising two or more ethylenically unsaturated polymers, each polymer having a molecular weight of at least 1000 g/mole, said unsaturation defining one or more polymer blocks in each ethylenically unsaturated polymer, at least one polymer block in the ethylenically unsaturated polymers comprising internal unsaturation and being chemically distinguishable from at least one polymer block in at least one other ethylenically unsaturated polymer, wherein the ethylenic content of each of the two or more ethylenically unsaturated polymers is from 0.1 to 3 mole percent and distribution of the ethylenic content in the ethylenically unsaturated polymers is substantially random such that at least 99 percent of multiple unsaturations in the ethylenically unsaturated polymers are separated by at least 6 methylene or substituted methylene units, characterized in that each meta-block copolymer in the product mixture comprises a random distribution of said chemically distinguishable polymer blocks; wherein at least two of the chemically distinguishable blocks possess a difference in expected Tg of at least 40° C.; wherein at least two of the chemically distinguishable blocks have an expected solubility parameter difference of at least 1.0; and wherein the combination of the chemically distinguishable polymer blocks is a one of the following combinations (a) to (i):
 (a) a partially hydrogenated polybutadiene and a partially hydrogenated butadiene nitrile rubber;
 (b) an unsaturated polyurethane and a polyethylene-co-butadiene);
 c) an unsaturated polycarbonate and one of polyethylene-co-butadiene) and poly(ethylene-co-octene-co-butadiene);
 d) an unsaturated polycarbonate and a block selected from the group consisting of an unsaturated polysiloxane, a fluoropolymer, a chlorinated polyolefin, a polytetrahydrofuran and EPDM;
 (e) a poly(ethylene oxide) and a polyethylene-co-butadiene);
 (f) a poly(ethylene-co-butadiene) and a poly(ethylene-co-octene-co-butadiene);
 (g) an unsaturated polyester and a poly(ethylene-co-butadiene);
 (h) a poly(styrene-co-butadiene-styrene) and poly(ethylene-co-butadiene); and
 (i) an unsaturated polycarbonate, a poly(styrene-co-butadiene-co-styrene), and a third polymer block comprising poly(ethylene-co-butadiene); and wherein
the catalyst is of the formula:

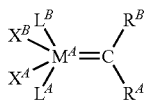

wherein:
$M^A$ is ruthenium or osmium;
$X^A$ and $X^B$ are the same or different anionic ligand;
$L^A$ is a neutral electron donor ligand;
$L^B$ is a neutral electron donor ligand or a nitrogen containing heterocyclic carbene; and
$R^A$ and $R^B$ are independently each occurrence hydrogen, or an alkyl, alkenyl, alkenyl, aryl, carboxylate, alkoxy, alkenyloxy, alkynyloxy, aryloxy, alkoxycarbonyl, alkylthio, alkylsulfonyl, alkylsulfinyl, or silyl group of up to 20 atoms not counting hydrogen, an alkyl, alkoxy, aryl, aralkyl, haloalkyl, haloalkoxy, haloaryl or haloalkaryl substituted derivative thereof; or a functionalized derivative of any of the foregoing wherein the functional group is hydroxyl, thiol, alcohol, sulfonic acid, phosphine, thioether, ketone, aldehyde, ester, ether, amine, imine, amide, imide, imido, nitro, carboxylic acid, disulfide, carbonate, isocyanate. carbodiimide, carboalkoxy, carbamate, acetal, ketal, boronate, cyano, cyanohydrin, hydrazine, oxime, hydrazide, enamine, sulfone, sulfide, sulfenyl, or halogen.

2. The product mixture of meta-block copolymers made according to the process of claim 1.

3. The product mixture of meta-block copolymers according to claim 2 wherein the blocks are separated by ethylenic unsaturated groups corresponding to the formula, —CH═CH—.

4. The partially hydrogenated derivative of the product mixture of meta-block copolymers according to claim 2.

5. The product mixture of meta-block copolymers according to claim 2 wherein the chemically distinguishable blocks possess a difference in Tm of at least 40° C.

6. The product mixture of meta-block copolymers according to claim 2 wherein at least one of the chemically distinguishable polymer blocks is amorphous and one other polymer block is crystallizable.

7. The product mixture of meta-block copolymers according to claim 6 wherein at least one of the chemically distinguishable amorphous polymer blocks has an expected $Tg=T_{LOW}$ and one of the crystallizable polymer blocks has $Tm=T_{HIGH}$, and the difference $T_{HIGH}-T_{LOW}$ is at least 40° C.

8. The product mixture of meta-block copolymers according to claim 2 wherein at least one of the chemically distinguishable polymer blocks has either a Tm or expected Tg value of at least 80° C.

9. The product mixture of meta-block copolymers according to claim 2 wherein the chemically distinguishable blocks phase separate in the absence of a compatibilizing additive when cooled from the melt to the solid phase.

10. The product mixture of meta-block copolymers produced according to the process of claim 1, further comprising a microphase separation of said chemically distinguishable polymer blocks as indicated by a small angle x-ray scattering (SAXS) peak that persists at temperatures above the glass transition temperature (Tg) of said meta-block copolymer, wherein if said meta-block copolymer contains a crystalline domain, the SAXS peak also persists at temperatures above the melt temperature (Tm) of said crystalline-domained meta-block copolymer.

11. The product mixture of meta-block copolymers according to claim 10, wherein the SAXS peak persists at temperatures at least 30° C. above the glass transition temperature (Tg) of said meta-block copolymer, wherein if said meta-block copolymer contains a crystalline domain, the SAXS peak also persists at temperature at least 30° C. above the melt temperature (Tm) of said crystalline-domained meta-block copolymer.

12. The product mixture of meta-block copolymers according to claim 10, wherein the chemically distinguishable blocks possess a difference in the expected solubility parameter ($\delta_2$) of at least 1.5.

* * * * *